United States Patent
Crabtree et al.

(10) Patent No.: US 11,792,229 B2
(45) Date of Patent: *Oct. 17, 2023

(54) AI-DRIVEN DEFENSIVE CYBERSECURITY STRATEGY ANALYSIS AND RECOMMENDATION SYSTEM

(71) Applicant: QOMPLX, Inc., Tysons, VA (US)

(72) Inventors: Jason Crabtree, Vienna, VA (US); Andrew Sellers, Monument, CO (US)

(73) Assignee: QOMPLX, INC., Tysons, VA (US)

( * ) Notice: Subject to any disclaimer, the term of this patent is extended or adjusted under 35 U.S.C. 154(b) by 221 days.

This patent is subject to a terminal disclaimer.

(21) Appl. No.: 17/389,863

(22) Filed: Jul. 30, 2021

(65) Prior Publication Data

US 2022/0060511 A1 Feb. 24, 2022

Related U.S. Application Data

(63) Continuation of application No. 16/792,754, filed on Feb. 17, 2020, now Pat. No. 11,184,401, which is a (Continued)

(51) Int. Cl.
*H04L 9/40* (2022.01)
*G06F 16/2458* (2019.01)
*G06F 16/951* (2019.01)

(52) U.S. Cl.
CPC .......... *H04L 63/20* (2013.01); *G06F 16/2477* (2019.01); *G06F 16/951* (2019.01); *H04L 63/1425* (2013.01); *H04L 63/1441* (2013.01)

(58) Field of Classification Search
CPC . H04L 63/20; H04L 63/1425; H04L 63/1441; G06F 16/2477; G06F 16/951
See application file for complete search history.

(56) References Cited

U.S. PATENT DOCUMENTS 6,256,544 B1 7/2001 Weissinger
7,818,797 B1* 10/2010 Fan ..................... H04L 63/1425
726/25
(Continued)

FOREIGN PATENT DOCUMENTS

WO 2014159150 A1 10/2014
WO 2017075543 A1 5/2017

OTHER PUBLICATIONS

Underbrink A, Potter A, Jaenisch H, Reifer DJ. Application stress testing Achieving cyber security by testing cyber attacks. In2012 IEEE Conference on Technologies for Homeland Security (HST) Nov. 13, 2012 (pp. 556-561). IEEE. (Year: 2012).*

(Continued)

*Primary Examiner* — Catherine Thiaw
(74) *Attorney, Agent, or Firm* — Galvin Patent Law LLC; Brian R. Galvin

(57) ABSTRACT

A system and method for automated cybersecurity defensive strategy analysis that predicts the evolution of new cybersecurity attack strategies and makes recommendations for cybersecurity improvements to networked systems based on a cost/benefit analysis. The system and method use machine learning algorithms to run simulated attack and defense strategies against a model of the networked system created using a directed graph. Recommendations are generated based on an analysis of the simulation results against a variety of cost/benefit indicators.

16 Claims, 40 Drawing Sheets

Related U.S. Application Data continuation-in-part of application No. 16/779,801, filed on Feb. 3, 2020, now Pat. No. 11,032,323, which is a continuation-in-part of application No. 16/777,270, filed on Jan. 30, 2020, now Pat. No. 11,025,674, which is a continuation-in-part of application No. 16/720,383, filed on Dec. 19, 2019, now Pat. No. 10,944,795, which is a continuation of application No. 15/823,363, filed on Nov. 27, 2017, now Pat. No. 10,560,483, which is a continuation-in-part of application No. 15/725,274, filed on Oct. 4, 2017, now Pat. No. 10,609,079, which is a continuation-in-part of application No. 15/655,113, filed on Jul. 20, 2017, now Pat. No. 10,735,456, which is a continuation-in-part of application No. 15/616,427, filed on Jun. 7, 2017, now abandoned, and a continuation-in-part of application No. 15/237,625, filed on Aug. 15, 2016, now Pat. No. 10,248,910, which is a continuation-in-part of application No. 15/206,195, filed on Jul. 8, 2016, now abandoned, which is a continuation-in-part of application No. 15/186,453, filed on Jun. 18, 2016, now abandoned, which is a continuation-in-part of application No. 15/166,158, filed on May 26, 2016, now abandoned, which is a continuation-in-part of application No. 15/141,752, filed on Apr. 28, 2016, now Pat. No. 10,860,962, which is a continuation-in-part of application No. 15/091,563, filed on Apr. 5, 2016, now Pat. No. 10,204,147, and a continuation-in-part of application No. 14/986,536, filed on Dec. 31, 2015, now Pat. No. 10,210,255, and a continuation-in-part of application No. 14/925,974, filed on Oct. 28, 2015, now abandoned, said application No. 15/616,427 is a continuation-in-part of application No. 14/925,974, filed on Oct. 28, 2015, now abandoned.

(56) References Cited

U.S. PATENT DOCUMENTS

| | | | |
|---|---|---|---|
| 8,281,121 B2 | 10/2012 | Nath et al. | |
| 8,615,800 B2 | 12/2013 | Baddour et al. | |
| 8,793,758 B2 | 7/2014 | Raleigh et al. | |
| 8,914,878 B2 | 12/2014 | Burns et al. | |
| 9,602,530 B2 | 3/2017 | Ellis et al. | |
| 9,654,495 B2 | 5/2017 | Hubbard et al. | |
| 9,762,443 B2 | 9/2017 | Dickey | |
| 9,887,933 B2 | 2/2018 | Lawrence, III | |
| 10,061,635 B2 | 8/2018 | Ellwein | |
| 10,248,910 B2 | 4/2019 | Crabtree et al. | |
| 10,367,829 B2 | 7/2019 | Huang et al. | |
| 2006/0015943 A1* | 1/2006 | Mahieu | G06F 30/20 726/25 |
| 2009/0007270 A1* | 1/2009 | Futoransky | H04L 63/1433 726/25 |
| 2011/0061104 A1* | 3/2011 | Sarraute Yamada | H04L 43/50 726/25 |
| 2013/0055404 A1* | 2/2013 | Khalili | G06Q 10/06375 726/25 |
| 2013/0304623 A1 | 11/2013 | Kumar et al. | |
| 2015/0106941 A1* | 4/2015 | Muller | G06F 21/577 726/25 |
| 2015/0295948 A1* | 10/2015 | Hassell | H04L 63/1441 726/25 |
| 2016/0028754 A1* | 1/2016 | Cruz Mota | H04L 63/1458 726/23 |
| 2016/0134653 A1* | 5/2016 | Vallone | H04L 41/046 726/25 |
| 2016/0140519 A1 | 5/2016 | Trepca et al. | |
| 2016/0156656 A1* | 6/2016 | Boggs | H04L 63/1416 726/25 |
| 2016/0275123 A1 | 9/2016 | Lin et al. | |

OTHER PUBLICATIONS

Kheir N, Cuppens-Boulahia N, Cuppens F, Debar H. A service dependency model for cost-sensitive intrusion response. InComputer Security—ESORICS 2010: 15th European Symposium on Research in Computer Security, Athens, Greece, Sep. 20-22, 2010. Proceedings 15 2010 (pp. 626-642). Springer Berlin (Year: 2010).*

* cited by examiner

AI-DRIVEN DEFENSIVE CYBERSECURITY STRATEGY ANALYSIS AND RECOMMENDATION SYSTEM

CROSS-REFERENCE TO RELATED APPLICATIONS

Priority is claimed in the application data sheet to the following patents or patent applications, the entire written description, including figures, of each of which is expressly incorporated herein by reference in its entirety:
U.S. Ser. No. 16/792,754
U.S. Ser. No. 16/779,801
U.S. Ser. No. 16/777,270
U.S. Ser. No. 16/720,383
U.S. Ser. No. 15/823,363
U.S. Ser. No. 15/725,274
U.S. Ser. No. 15/655,113
U.S. Ser. No. 15/616,427
U.S. Ser. No. 14/925,974
U.S. Ser. No. 15/237,625
U.S. Ser. No. 15/206,195
U.S. Ser. No. 15/186,453
U.S. Ser. No. 15/166,158
U.S. Ser. No. 15/141,752
U.S. Ser. No. 15/091,563
U.S. Ser. No. 14/986,536
U.S. Ser. No. 14/925,974

BACKGROUND OF THE INVENTION

Field of the Invention

The disclosure relates to the field of computer systems, and more particularly to the field of cybersecurity analysis and improvements.

Discussion of the State of the Art

Modern networked systems are highly complex and vulnerable to attack from a myriad of constantly-evolving attack strategies using sophisticated algorithms that target both known and unknown vulnerabilities in hardware and software. The complexity of defending such systems from attack increases exponentially with the size of the systems, not linearly, because each component of the organization's network connects to multiple other components resulting in a combinatorial explosion. Current methodologies for improving cybersecurity defenses are largely reactive, depending on discovery of new attack strategies and providing patches in response, which is slow and leaves networked systems vulnerable to new attack strategies until they are patched.

What is needed is a system and method for automated cybersecurity defensive strategy analysis that predicts the evolution of new cybersecurity attack strategies and makes recommendations for cybersecurity improvements to networked systems based on a business cost/benefit analysis tailored to the operations of each enterprise IT environment and informed by the role and criticality of the data and services provided.

SUMMARY OF THE INVENTION

Accordingly, the inventor has developed a system and method for automated cybersecurity defensive strategy analysis that predicts the evolution of new cybersecurity attack strategies and makes recommendations for cybersecurity improvements to networked systems based on a cost/benefit analysis. The system and method use machine learning algorithms to run simulated attack and defense strategies against a model of the networked system created using a directed graph. Recommendations are generated based on an analysis of the simulation results against a variety of cost/benefit indicators.

According to a preferred embodiment, a system for automated cybersecurity defensive strategy analysis and recommendations is disclosed, comprising: an attack implementation engine comprising a first plurality of programming instructions stored in a memory of, and operating on a processor of, a computing device, wherein the first plurality of programming instructions, when operating on the processor, cause the computing device to: receive test initiation instructions; implement a cyberattack on a network under test; and gather system information about the operation of the network under test during the cyberattack, the system information comprising information about the sequence of events and response of affected devices during the cyberattack; a simulator comprising a second plurality of programming instructions stored in the memory of, and operating on the processor of, the computing device, wherein the second plurality of programming instructions, when operating on the processor, cause the computing device to: receive the system information; use the system information to initiate an iterative simulation of a cyberattack strategy sequence, each iteration comprising a simulated attack on a model of the network under test and a simulated defense against the simulated attack, each simulated attack and each simulated defense being generated by a first machine learning algorithm; obtain a simulation result comprising the cyberattack strategy sequence and a probability of success of the attack and the defense in each iteration; a recommendation engine comprising a third plurality of programming instructions stored in the memory of, and operating on the processor of, the computing device, wherein the third plurality of programming instructions, when operating on the processor, cause the computing device to: receive the simulation result; receive one or more cost factors; receive one or more benefit factors; compare the simulation result against the cost factors and the benefit factors; and determine a cybersecurity improvement recommendation for the network under test based on the comparison According to another preferred embodiment, a method for automated cybersecurity defensive strategy analysis and recommendations is disclosed, comprising the steps of: receiving test initiation instructions; implementing a cyberattack on a network under test; gathering system information about the operation of the network under test during the cyberattack, the system information comprising information about the sequence of events and response of affected devices during the cyberattack; using the system information to initiate an iterative simulation of a cyberattack strategy sequence, each iteration comprising a simulated attack on a model of the network under test and a simulated defense against the simulated attack, each simulated attack and each simulated defense being generated by a first machine learning algorithm; obtaining a simulation result comprising the cyberattack strategy sequence and a probability of success of the attack and the defense in each iteration; receiving one or more cost factors; receiving one or more benefit factors; comparing the simulation result against the cost factors and the benefit factors; and determining a cybersecurity improvement recommendation for the network under test based on the comparison.

According to an aspect of an embodiment, the system information further comprises system logs of one or more of the affected devices.

According to an aspect of an embodiment, the machine learning algorithm is an evolutionary algorithm.

According to an aspect of an embodiment, the simulation is an online simulation and the evolutionary algorithm is a continual online evolutionary planning algorithm.

According to an aspect of an embodiment, a second machine learning algorithm is used, wherein each simulated attack is generated by the first machine learning algorithm and each simulated defense is generated by the second machine learning algorithm, such that the algorithms compete against each other in the simulation.

According to an aspect of an embodiment, the cybersecurity improvement recommendation is implemented on the network under test.

According to an aspect of an embodiment, process is run iteratively, with each iteration resulting in a new cybersecurity improvement recommendation, which is implemented on the network under test prior to the next iteration.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
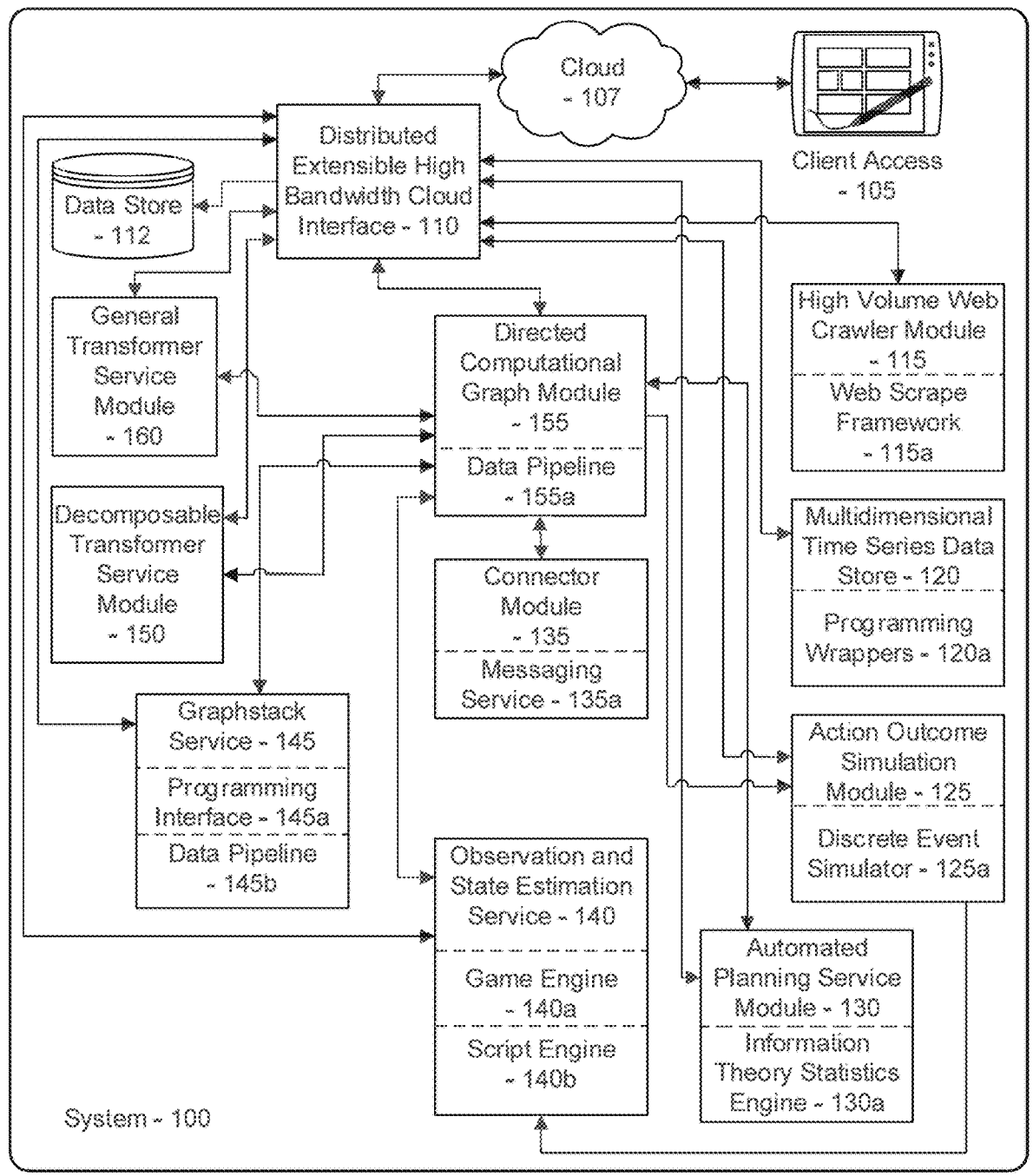
FIG. 1 is a block diagram of an exemplary system architecture for an advanced cyber decision platform for external network reconnaissance and cybersecurity rating.

The inventor has conceived, and reduced to practice, a system and method for automated cybersecurity defensive strategy analysis that predicts the evolution of new cybersecurity attack strategies and makes recommendations for cybersecurity improvements to networked systems based on a cost/benefit analysis. The system and method use machine learning algorithms to run simulated attack and defense strategies against a model of the networked system created using a directed graph. Recommendations are generated based on an analysis of the simulation results against a variety of cost/benefit indicators.

Modern networked systems are highly complex and vulnerable to attack from a myriad of constantly-evolving attack strategies using sophisticated automation and dedicated experts that target both known and unknown vulnerabilities in hardware and software. The complexity of defending such systems from attack increases exponentially with the size of the systems, not linearly, because each component of the organization's network connects to multiple other components resulting in a combinatorial explosion. Current methodologies for improving cybersecurity defenses are largely reactive, depending on discovery of new attack strategies and providing patches in response, which is slow and leaves networked systems vulnerable to new attack strategies until they are patched.

A major drawback of reactive cybersecurity defensive strategies is that they are unable to predict and counter evolving attack strategies. Even where attempts are made by humans to predict the next evolution in a strategy and anticipate a defense, such attempts are limited in that they are unable to account for the tremendous complexity and interactions of modern networked systems. However, machine learning algorithms, and particularly evolutionary algorithms such as genetic algorithms, can be used to simulate the impact of evolving attack and defense strategies on models of highly complex systems and provide simulation results indicating probabilities of evolution of attack and defense strategies in certain directions and the impact to a network's cybersecurity defenses if attack and defense strategies to evolve in a certain direction. In this way, likely attack strategies can be predicted and defense strategies can be developed or anticipated before an attack occurs, even if the attack has not yet been developed in the real world. Further, a cost/benefit analysis of the developed or anticipated defensive strategies can be performed to provide recommendations as to which of the developed or anticipated defensive strategies to implement on the real-world networked system being modeled in the simulation.

Cybersecurity defensive recommendations implemented on the real-world networked system can be reflected in the system model, and a new round of machine learning simulations can be run to identify new attack strategies that may be used on the changed system. This iterative machine learning process narrows the possible avenues of attack on a networked system, first identifying attack strategies with a high likelihood of success and large impacts, and in each subsequent iteration identifying attack strategies with lower and lower likelihoods of success. The recommendation engine provides the cost-benefit analysis to determine at what point it no longer makes economic sense to implement defensive strategies in certain directions.

A major benefit of this system is its automation. The system can be made to be entirely automated, running iteration after iteration and implementing recommended changes to the networked system through the use of changes in software configurations, access controls, etc., even including isolating certain hardware from the network through software controls. Implementation of recommendations to physically alter hardware components (e.g., physical removal of a server or physical disconnection of cables) would require manual input and a user interface for administrative control and operation is included.

The better and more detailed a model represents a real-world system, the better the predictive capability of the model (i.e., greater model accuracy reduces the level of uncertainty, which leads to better predictions). However, the more complex the model, the harder it is to run the model. More computing resources are required to account for an exponentially-increasing set of interactions. Some problems are essentially infeasible to model with current computing capabilities due to this combinatorial explosion, and therefore un-computable at the level of real-world detail.

The current algorithms for analyzing complex systems are limited and insufficient for this purpose. In order to make the problem tractable for computing, they either lack sufficient detail in the models about the systems being analyzed in order or limit the number of dimensions analyzed in the model, or both. One example of this limitation is modeling of rare-event simulations in complex systems that are caused by a confluence of factors. If the model is not sufficiently detailed, it will not capture low-level variables that impact the rare event, regardless of how complex the analysis is. Conversely, if the analysis is limited to selected dimensions, it will not capture complex interactions that combine to cause the rare event, even if the model is sufficiently detailed.

The solution is to allow for iterative, scalable parametric analysis, which allows for identification of critical components in the analysis and limiting of low-level analyses to key components while generalizing higher-level analyses for non-key components. This allows for creation of detailed and robust system models, yet still allows high-dimensionality analyses of the detailed models with finite computing resources. Increased granularity in models and calibration of models to real-world data may be used to obtain improved performance and risk management, by allowing for testing of system adjustments against more precise and robust models prior to implementation of the adjustments on real-world systems. Further, such improved models and analyses may be used to predict rare events that depend on a very specific confluence of factors for occurrence, or to detect unpredictable events such as infiltration of the operational technology system by malware (for example, a worm like Stuxnet).

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

"Artificial intelligence" or "AI" as used herein means a computer system or component that has been programmed in such a way that it mimics some aspect or aspects of cognitive functions that humans associate with human intelligence, such as learning, problem solving, pattern recognition, and decision-making. Examples of current AI technologies include understanding human speech, competing successfully in strategic games such as chess and Go, autonomous operation of vehicles, complex simulations, and interpretation of complex data such as images and video.

"Machine learning" as used herein is an aspect of artificial intelligence in which the computer system or component can modify its behavior or understanding without being explicitly programmed to do so. There are three primary classifications of machine learning algorithms: supervised learning, unsupervised learning, and reinforcement learning. Supervised learning algorithms attempt to infer functions from labeled training datasets, which functions can then be applied to new datasets. Unsupervised learning algorithms attempt to find previously unknown patterns in unlabeled datasets. Reinforcement learning algorithms attempt to find optimal actions to be taken by maximizing some reward.

As used herein, a "swimlane" is a communication channel between a time series sensor data reception and apportioning device and a data store meant to hold the apportioned data time series sensor data. A swimlane is able to move a specific, finite amount of data between the two devices. For example, a single swimlane might reliably carry and have incorporated into the data store, the data equivalent of 5 seconds worth of data from 10 sensors in 5 seconds, this being its capacity. Attempts to place 5 seconds worth of data received from 6 sensors using one swimlane would result in data loss.

As used herein, a "metaswimlane" is an as-needed logical combination of transfer capacity of two or more real swimlanes that is transparent to the requesting process. Sensor studies where the amount of data received per unit time is expected to be highly heterogeneous over time may be initiated to use metaswimlanes. Using the example used above that a single real swimlane may transfer and incorporate the 5 seconds worth of data of 10 sensors without data loss, the sudden receipt of incoming sensor data from 13 sensors during a 5 second interval would cause the system to create a two swimlane metaswimlane to accommodate the standard 10 sensors of data in one real swimlane and the 3 sensor data overage in the second, transparently added real swimlane, however no changes to the data receipt logic would be needed as the data reception and apportionment device would add the additional real swimlane transparently.

As used herein, "graph" is a representation of information and relationships, where each primary unit of information makes up a "node" or "vertex" of the graph and the relationship between two nodes makes up an edge of the graph. Nodes can be further qualified by the connection of one or more descriptors or "properties" to that node. For example, given the node "James R," name information for a person, qualifying properties might be "183 cm tall", "DOB Aug. 13, 1965" and "speaks English". Similar to the use of properties to further describe the information in a node, a relationship between two nodes that forms an edge can be qualified using a "label". Thus, given a second node "Thomas G," an edge between "James R" and "Thomas G" that indicates that the two people know each other might be labeled "knows." When graph theory notation (Graph= (Vertices, Edges)) is applied this situation, the set of nodes are used as one parameter of the ordered pair, V and the set of 2 element edge endpoints are used as the second parameter of the ordered pair, E. When the order of the edge endpoints within the pairs of E is not significant, for example, the edge James R, Thomas G is equivalent to Thomas G, James R, the graph is designated as "undirected." Under circumstances when a relationship flows from one node to another in one direction, for example James R is "taller" than Thomas G, the order of the endpoints is significant. Graphs with such edges are designated as "directed." In the distributed computational graph system, transformations within transformation pipeline are represented as directed graph with each transformation comprising a node and the output messages between transformations comprising edges. Distributed computational graph stipulates the potential use of non-linear transformation pipelines which are programmatically linearized. Such linearization can result in exponential growth of resource consumption. The most sensible approach to overcome possibility is to introduce new transformation pipelines just as they are needed, creating only those that are ready to compute. Such method results in transformation graphs which are highly variable in size and node, edge composition as the system processes data streams. Those familiar with the art will realize that transformation graph may assume many shapes and sizes with a vast topography of edge relationships. The examples given were chosen for illustrative purposes only and represent a small number of the simplest of possibilities. These examples should not be taken to define the possible graphs expected as part of operation of the invention As used herein, "transformation" is a function performed on zero or more streams of input data which results in a single stream of output which may or may not then be used as input for another transformation. Transformations may comprise any combination of machine, human or machine-human interactions Transformations need not change data that enters them, one example of this type of transformation would be a storage transformation which would receive input and then act as a queue for that data for subsequent transformations. As implied above, a specific transformation may generate output data in the absence of input data. A time stamp serves as a example. In the invention, transformations are placed into pipelines such that the output of one transformation may serve as an input for another. These pipelines can consist of two or more transformations with the number of transformations limited only by the resources of the system. Historically, transformation pipelines have been linear with each transformation in the pipeline receiving input from one antecedent and providing output to one subsequent with no branching or iteration. Other pipeline configurations are possible. The invention is designed to permit several of these configurations including, but not limited to: linear, afferent branch, efferent branch and cyclical.

A "database" or "data storage subsystem" (these terms may be considered substantially synonymous), as used herein, is a system adapted for the long-term storage, indexing, and retrieval of data, the retrieval typically being via some sort of querying interface or language. "Database" may be used to refer to relational database management systems known in the art, but should not be considered to be limited to such systems. Many alternative database or data storage system technologies have been, and indeed are being, introduced in the art, including but not limited to distributed non-relational data storage systems such as Hadoop, column-oriented databases, in-memory databases, and the like. While various aspects may preferentially employ one or another of the various data storage subsystems available in the art (or available in the future), the invention should not be construed to be so limited, as any data storage architecture may be used according to the aspects. Similarly, while in some cases one or more particular data storage needs are described as being satisfied by separate components (for example, an expanded private capital markets database and a configuration database), these descriptions refer to functional uses of data storage systems and do not refer to their physical architecture. For instance, any group of data storage systems of databases referred to herein may be included together in a single database management system operating on a single machine, or they may be included in a single database management system operating on a cluster of machines as is known in the art. Similarly, any single database (such as an expanded private capital markets database) may be implemented on a single machine, on a set of machines using clustering technology, on several machines connected by one or more messaging systems known in the art, or in a master/slave arrangement common in the art. These examples should make clear that no particular architectural approaches to database management is preferred according to the invention, and choice of data storage technology is at the discretion of each implementer, without departing from the scope of the invention as claimed.

A "data context", as used herein, refers to a set of arguments identifying the location of data. This could be a Rabbit queue, a .csv file in cloud-based storage, or any other such location reference except a single event or record. Activities may pass either events or data contexts to each other for processing. The nature of a pipeline allows for direct information passing between activities, and data locations or files do not need to be predetermined at pipeline start.

"Information technology" or "IT" as used herein means the development, maintenance, and use of computer systems, software, and networks for the processing and distribution of data. Typically, but not exclusively, the term information technology is associated use of computer systems, software, and networks for the business operations of an organization, and not for control of physical systems.

"Operational technology" as used herein means use of computer systems, software, and networks to monitor and alter the state of a physical system. Operational technology is often referred to as process control technology or process control systems. Operational technology systems typically include supervisory control and data acquisition (SCADA) systems, distributed control systems (DCS), Remote Terminal Units (RTU) and programmable logic controllers (PLC), as well as dedicated networks and organization units. Examples of large scale operational technology are systems for controlling power stations, oil and gas refineries, or railways. Embedded Systems are also included in the sphere of operational technology, and the term can include small scale control systems such as for the engine control unit (ECU) of a modern car.

"Parametric analysis" is used herein to mean an experiment or test designed to discover the differential effects of a range of values of an independent variable.

A "pipeline", as used herein and interchangeably referred to as a "data pipeline" or a "processing pipeline", refers to a set of data streaming activities and batch activities. Streaming and batch activities can be connected indiscriminately within a pipeline. Events will flow through the streaming activity actors in a reactive way. At the junction of a streaming activity to batch activity, there will exist a StreamBatchProtocol data object. This object is responsible for determining when and if the batch process is run. One or more of three possibilities can be used for processing triggers: regular timing interval, every N events, or optionally an external trigger. The events are held in a queue or similar until processing. Each batch activity may contain a "source" data context (this may be a streaming context if the upstream activities are streaming), and a "destination" data context (which is passed to the next activity). Streaming activities may have an optional "destination" streaming data context (optional meaning: caching/persistence of events vs. ephemeral), though this should not be part of the initial implementation.

Conceptual Architecture

FIG. 1 is a block diagram of an advanced cyber decision platform for external network reconnaissance and cybersecurity rating. Client access to the system 105 for specific data entry, system control and for interaction with system output such as automated predictive decision making and planning and alternate pathway simulations, occurs through the system's distributed, extensible high bandwidth cloud interface 110 which uses a versatile, robust web application driven interface for both input and display of client-facing information via network 107 and operates a data store 112 such as, but not limited to MONGODB™, COUCHDB™, CASSANDRA™ or REDIS™ according to various arrangements. Much of the business data analyzed by the system both from sources within the confines of the client business, and from cloud based sources, also enter the system through the cloud interface 110, data being passed to the connector module 135 which may possess the API routines 135a needed to accept and convert the external data and then pass the normalized information to other analysis and transformation components of the system, the distributed computational graph module 155, high volume web crawler module 115, multidimensional time series database (MDTSDB) 120 and the graph stack service 145. The distributed computational graph module 155 retrieves one or more streams of data from a plurality of sources, which includes, but is in no way not limited to, a plurality of physical sensors, network service providers, web based questionnaires and surveys, monitoring of electronic infrastructure, crowd sourcing campaigns, and human input device information. Within the distributed computational graph module 155, data may be split into two identical streams in a specialized pre-programmed data pipeline 155a, wherein one sub-stream may be sent for batch processing and storage while the other sub-stream may be reformatted for transformation pipeline analysis. The data is then transferred to the general transformer service module 160 for linear data transformation as part of analysis or the decomposable transformer service module 150 for branching or iterative transformations that are part of analysis. The distributed computational graph module 155 represents all data as directed graphs where the transformations are nodes and the result messages between transformations edges of the graph. The high volume web crawling module 115 uses multiple server hosted preprogrammed web spiders, which while autonomously configured are deployed within a web scraping framework 115a of which SCRAPY™ is an example, to identify and retrieve data of interest from web based sources that are not well tagged by conventional web crawling technology. The multiple dimension time series data store module 120 may receive streaming data from a large plurality of sensors that may be of several different types. The multiple dimension time series data store module may also store any time series data encountered by the system such as but not limited to enterprise network usage data, component and system logs, performance data, network service information captures such as, but not limited to news and financial feeds, and sales and service related customer data. The module is designed to accommodate irregular and high volume surges by dynamically allotting network bandwidth and server processing channels to process the incoming data. Inclusion of programming wrappers 120a for languages examples of which are, but not limited to C++, PERL, PYTHON, and ERLANG™ allows sophisticated programming logic to be added to the default function of the multidimensional time series database 120 without intimate knowledge of the core programming, greatly extending breadth of function. Data retrieved by the multidimensional time series database (MDTSDB) 120 and the high volume web crawling module 115 may be further analyzed and transformed into task optimized results by the distributed computational graph 155 and associated general transformer service 150 and decomposable transformer service 160 modules. Alternately, data from the multidimensional time series database and high volume web crawling modules may be sent, often with scripted cuing information determining important vertexes 145a, to the graph stack service module 145 which, employing standardized protocols for converting streams of information into graph representations of that data, for example, open graph internet technology although the invention is not reliant on any one standard. Through the steps, the graph stack service module 145 represents data in graphical form influenced by any pre-determined scripted modifications 145a and stores it in a graph-based data store 145b such as GIRAPH™ or a key value pair type data store REDIS™, or RIAK™, among others, all of which are suitable for storing graph-based information.

Results of the transformative analysis process may then be combined with further client directives, additional business rules and practices relevant to the analysis and situational information external to the already available data in the automated planning service module 130 which also runs powerful information theory 130a based predictive statistics functions and machine learning algorithms to allow future trends and outcomes to be rapidly forecast based upon the current system derived results and choosing each a plurality of possible business decisions. The using all available data, the automated planning service module 130 may propose business decisions most likely to result is the most favorable business outcome with a usably high level of certainty. Closely related to the automated planning service module in the use of system derived results in conjunction with possible externally supplied additional information in the assistance of end user business decision making, the action outcome simulation module 125 with its discrete event simulator programming module 125*a* coupled with the end user facing observation and state estimation service 140 which is highly scriptable 140*b* as circumstances require and has a game engine 140*a* to more realistically stage possible outcomes of business decisions under consideration, allows business decision makers to investigate the probable outcomes of choosing one pending course of action over another based upon analysis of the current available data.

When performing external reconnaissance via a network 107, web crawler 115 may be used to perform a variety of port and service scanning operations on a plurality of hosts. This may be used to target individual network hosts (for example, to examine a specific server or client device) or to broadly scan any number of hosts (such as all hosts within a particular domain, or any number of hosts up to the complete IPv4 address space). Port scanning is primarily used for gathering information about hosts and services connected to a network, using probe messages sent to hosts that prompt a response from that host. Port scanning is generally centered around the transmission control protocol (TCP), and using the information provided in a prompted response a port scan can provide information about network and application layers on the targeted host.

Port scan results can yield information on open, closed, or undetermined ports on a target host. An open port indicated that an application or service is accepting connections on this port (such as ports used for receiving customer web traffic on a web server), and these ports generally disclose the greatest quantity of useful information about the host. A closed port indicates that no application or service is listening for connections on that port, and still provides information about the host such as revealing the operating system of the host, which may discovered by fingerprinting the TCP/IP stack in a response. Different operating systems exhibit identifiable behaviors when populating TCP fields, and collecting multiple responses and matching the fields against a database of known fingerprints makes it possible to determine the OS of the host even when no ports are open. An undetermined port is one that does not produce a requested response, generally because the port is being filtered by a firewall on the host or between the host and the network (for example, a corporate firewall behind which all internal servers operate).

Scanning may be defined by scope to limit the scan according to two dimensions, hosts and ports. A horizontal scan checks the same port on multiple hosts, often used by attackers to check for an open port on any available hosts to select a target for an attack that exploits a vulnerability using that port. This type of scan is also useful for security audits, to ensure that vulnerabilities are not exposed on any of the target hosts. A vertical scan defines multiple ports to examine on a single host, for example a "vanilla scan" which targets every port of a single host, or a "strobe scan" that targets a small subset of ports on the host. This type of scan is usually performed for vulnerability detection on single systems, and due to the single-host nature is impractical for large network scans. A block scan combines elements of both horizontal and vertical scanning, to scan multiple ports on multiple hosts. This type of scan is useful for a variety of service discovery and data collection tasks, as it allows a broad scan of many hosts (up to the entire Internet, using the complete IPv4 address space) for a number of desired ports in a single sweep.

Large port scans involve quantitative research, and as such may be treated as experimental scientific measurement and are subject to measurement and quality standards to ensure the usefulness of results. To avoid observational errors during measurement, results must be precise (describing a degree of relative proximity between individual measured values), accurate (describing relative proximity of measured values to a reference value), preserve any metadata that accompanies the measured data, avoid misinterpretation of data due to faulty measurement execution, and must be well-calibrated to efficiently expose and address issues of inaccuracy or misinterpretation. In addition to these basic requirements, large volumes of data may lead to unexpected behavior of analysis tools, and extracting a subset to perform initial analysis may help to provide an initial overview before working with the complete data set. Analysis should also be reproducible, as with all experimental science, and should incorporate publicly-available data to add value to the comprehensibility of the research as well as contributing to a "common framework" that may be used to confirm results.

When performing a port scan, web crawler 115 may employ a variety of software suitable for the task, such as Nmap, ZMap, or masscan. Nmap is suitable for large scans as well as scanning individual hosts, and excels in offering a variety of diverse scanning techniques. ZMap is a newer application and unlike Nmap (which is more general-purpose), ZMap is designed specifically with Internet-wide scans as the intent. As a result, ZMap is far less customizable and relies on horizontal port scans for functionality, achieving fast scan times using techniques of probe randomization (randomizing the order in which probes are sent to hosts, minimizing network saturation) and asynchronous design (utilizing stateless operation to send and receive packets in separate processing threads). Masscan uses the same asynchronous operation model of ZMap, as well as probe randomization. In masscan however, a certain degree of statistical randomness is sacrificed to improve computation time for large scans (such as when scanning the entire IPv4 address space), using the BlackRock algorithm. This is a modified implementation of symmetric encryption algorithm DES, with fewer rounds and modulo operations in place of binary ones to allow for arbitrary ranges and achieve faster computation time for large data sets.

Received scan responses may be collected and processed through a plurality of data pipelines 155*a* to analyze the collected information. MDTSDB 120 and graph stack 145 may be used to produce a hybrid graph/time series database using the analyzed data, forming a graph of Internet-accessible organization resources and their evolving state information over time. Customer-specific profiling and scanning information may be linked to CPG graphs (as described below in detail, referring to FIG. 11) for a particular customer, but this information may be further linked to the base-level graph of internet-accessible resources and information. Depending on customer authorizations and legal or regulatory restrictions and authorizations, techniques used may involve both passive, semi-passive and active scanning and reconnaissance.

Figure 2A:
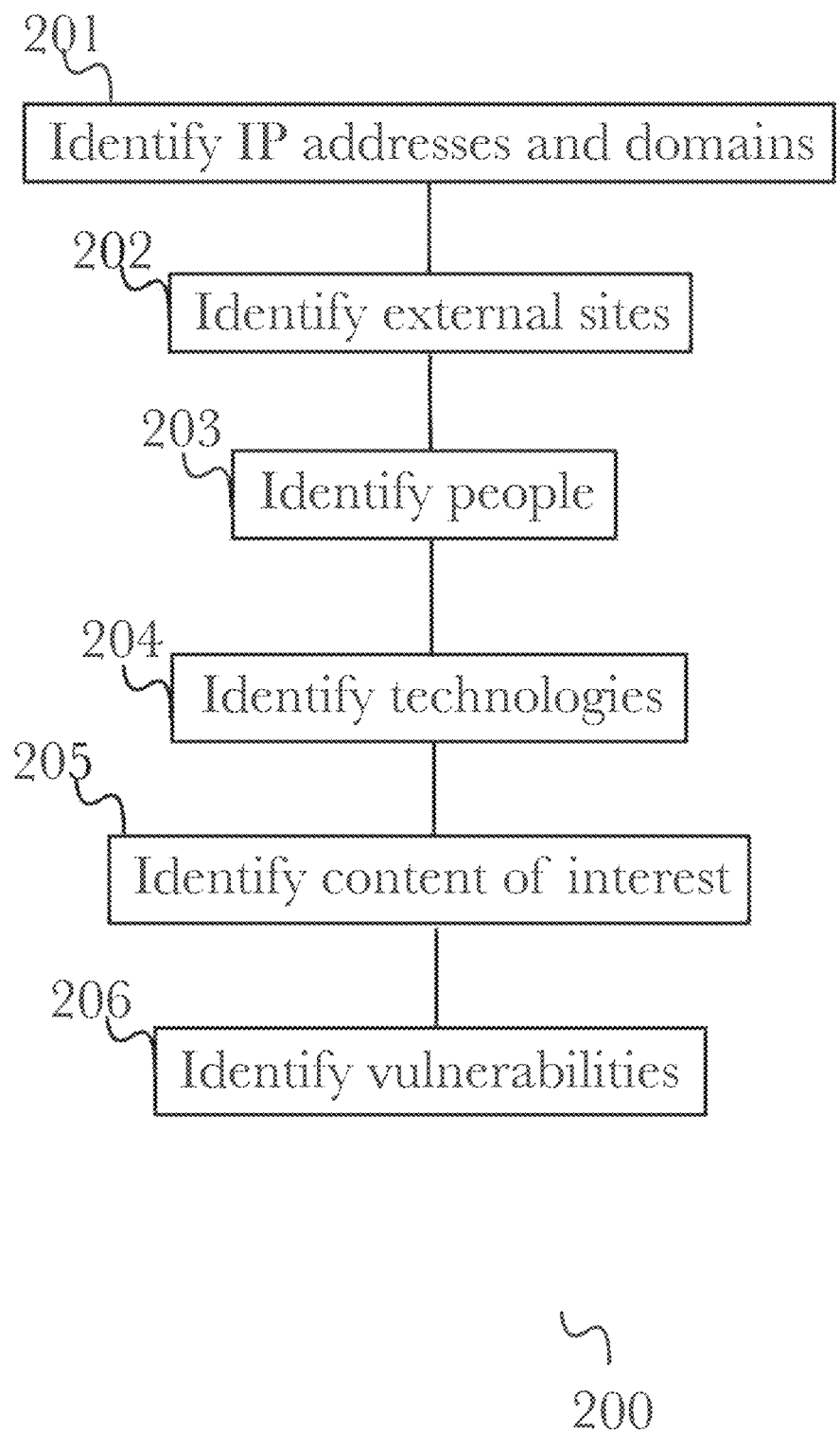
FIG. 2A is a block diagram showing general steps for performing passive network reconnaissance.

FIG. 2A is a block diagram showing general steps 200 for performing passive network reconnaissance. It should be appreciated that the steps illustrated and described may be performed in any order, and that steps may be added or omitted as needed for any particular reconnaissance operation. In a step 201, network address ranges and domains or sub-domains associated with a plurality of targets may be identified, for example to collect information for defining the scope of further scanning operations. In another step 202, external sites may be identified to understand relationships between targets and other third-party content providers, such as trust relationships or authoritative domain name service (DNS) resolution records. In another step 203, individual people or groups may be identified using names, email addresses, phone numbers, or other identifying information that may be useful for a variety of social engineering activities. In another step 204, technologies used may be identified, such as types or versions of hardware or software used by an organization, and this may include collecting and extracting information from job descriptions (for example) to identify technologies in use by an organization (for example, a job description for an administrator familiar with specific database software indicates that said software is in use within the organization). In another step 205, content of interest may be identified, for example including web and email portals, log files, backup or archive files, and other forms of sensitive information that may be contained within HTML comments or client-side scripts, as may be useful for vulnerability discovery and penetration testing activities. In another step 206, publicly-available information may be used to identify vulnerabilities that may be exploited with further active penetration testing.

Figure 2B:
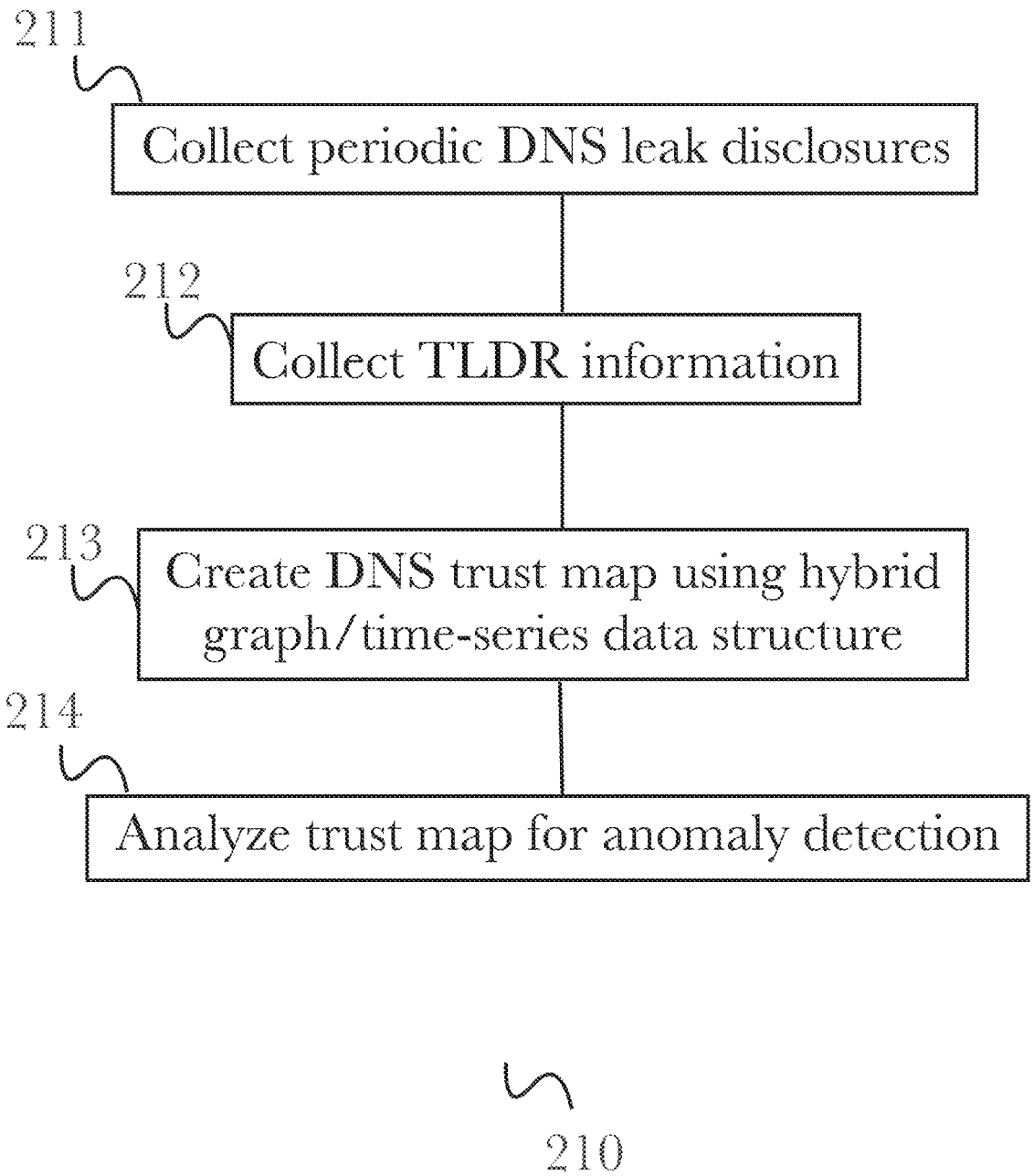
FIG. 2B is a process diagram showing a general flow of a process for performing active reconnaissance using DNS leak information collection.

FIG. 2B is a process diagram showing a general flow of a process 210 for performing active reconnaissance using DNS leak information collection. In an initial step 211, publicly-available DNS leak disclosure information may be collected to maintain current information regarding known leaks and vulnerabilities. In a next step 212, third-level domain (TLDR) information may be collected and used to report domain risk factors, such as domains that do not resolve properly (due to malformed DNS records, for example). In a next step 213, a DNS trust map may be created using a hybrid graph/time series data structure, using a graph stack service 145 and MDTSDB 120. This trust map may be produced as the output of an extraction process performed by a DCG 155 through a plurality of data pipelines 155a, analyzing collected data and mapping data points to produce hybrid structured output representing each data point over time. In a final step 214, the trust map may then be analyzed to identify anomalies, for example using community detection algorithms that may discover when new references are being created, and this may be used to identify vulnerabilities that may arise as a byproduct of the referential nature of a DNS hierarchy. In this manner, DCG pipeline processing and time series data graphing may be used to identify vulnerabilities that would otherwise be obscured within a large dataset.

Figure 2C:
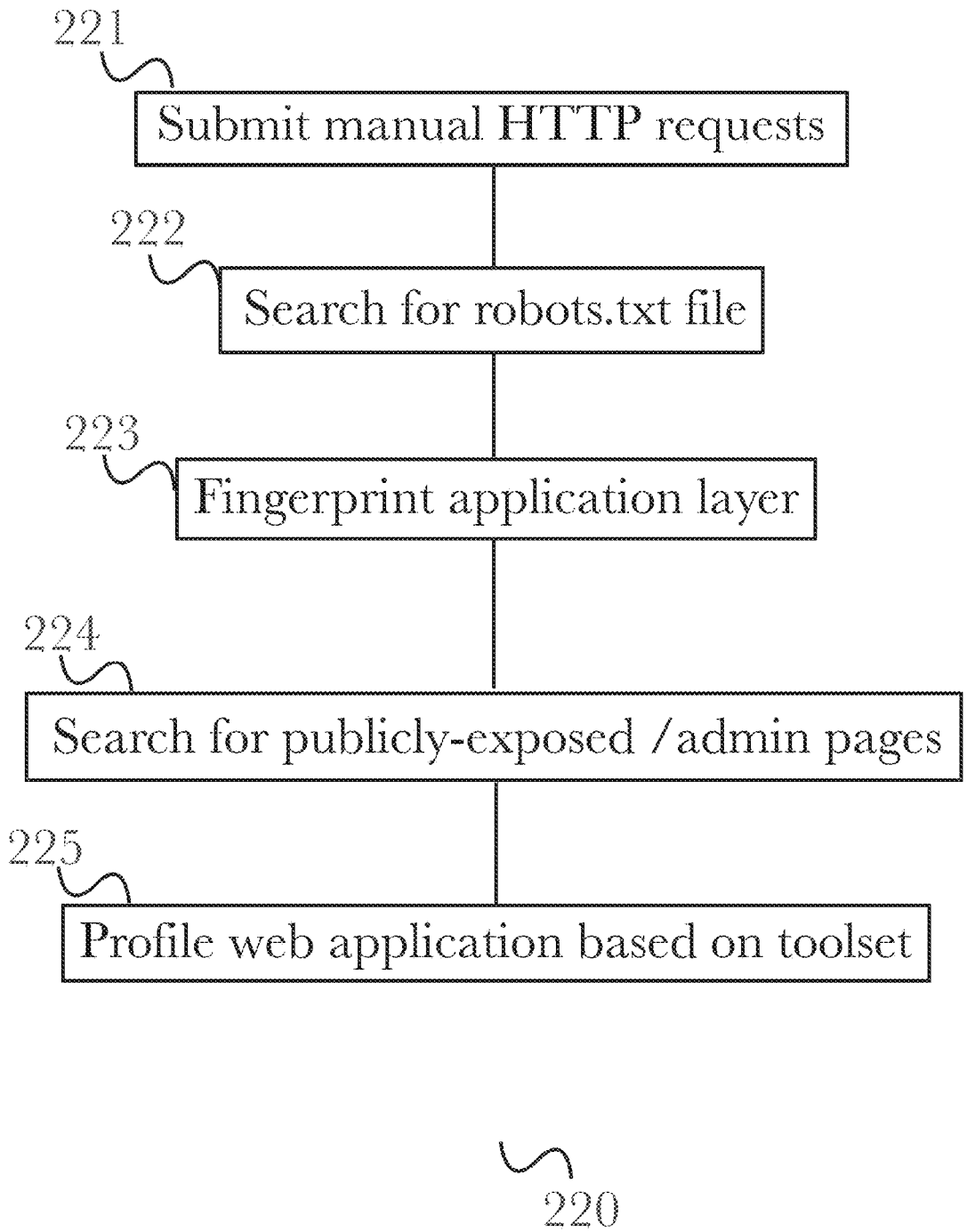
FIG. 2C is a process diagram showing a general flow of a process for performing active reconnaissance using web application and technology reconnaissance.

FIG. 2C is a process diagram showing a general flow of a process 220 for performing active reconnaissance using web application and technology reconnaissance. In an initial step 221, a plurality of manual HTTP requests may be transmitted to a host, for example to determine if a web server is announcing itself, or to obtain an application version number from an HTTP response message. In a next step 222, a robots.txt, used to identify and communicate with web crawlers and other automated "bots", may be searched for to identify portions of an application or site that robots are requested to ignore. In a next step 223, the host application layer may be fingerprinted, for example using file extensions and response message fields to identify characteristic patterns or markers that may be used to identify host or application details. In a next step 224, publicly-exposed/admin pages may be checked, to determine if any administrative portals are exposed and therefore potentially-vulnerable, as well as to potentially determine administration policies or capabilities based on exposed information. In a final step 225, an application may be profiled according to a particular toolset in use, such as WORDPRESS™ (for example) or other specific tools or plugins.

Figure 2D:
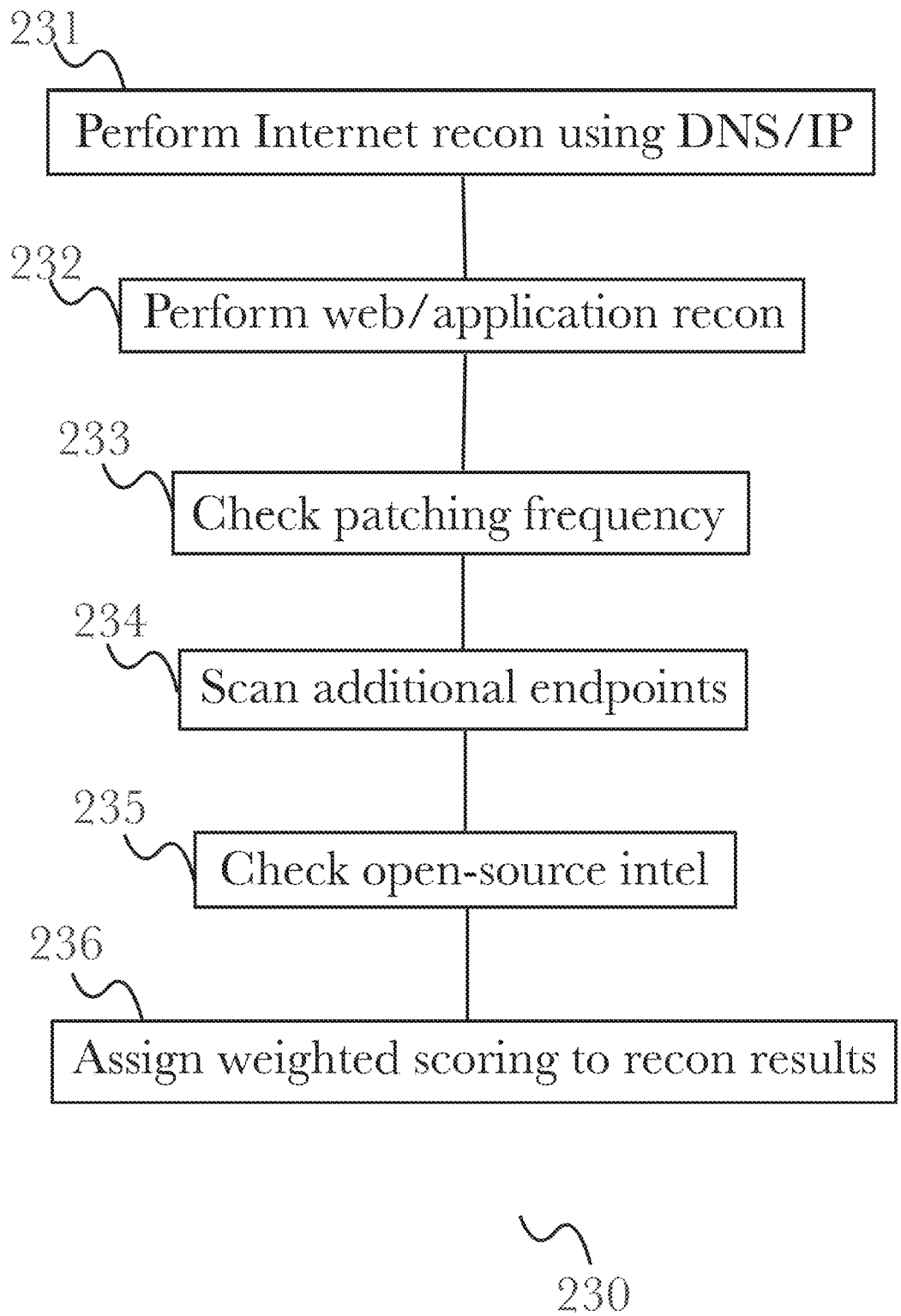
FIG. 2D is a process diagram showing a general flow of a process for producing a cybersecurity rating using reconnaissance data.

FIG. 2D is a process diagram showing a general flow of a process 230 for producing a cybersecurity rating using reconnaissance data. In an initial step 231, external reconnaissance may be performed using DNS and IP information as described above (referring to FIG. 2B), collecting information from DNS records, leak announcements, and publicly-available records to produce a DNS trust map from collected information and the DCG-driven analysis thereof. In a next step 232, web and application recon may be performed (as described in FIG. 2C), collecting information on applications, sites, and publicly-available records. In a next step 233, collected information over time may be analyzed for software version numbers, revealing the patching frequency of target hosts and their respective applications and services. Using a hybrid time series graph, timestamps may be associated with ongoing changes to reveal these updates over time. In a next step 234, a plurality of additional endpoints may be scanned, such as (for example, including but not limited to) internet-of-things (IoT) devices that may be scanned and fingerprinted, end-user devices such as personal smartphones, tablets, or computers, or social network endpoints such as scraping content from user social media pages or feeds. User devices may be fingerprinted and analyzed similar to organization hosts, and social media content may be retrieved such as collecting sentiment from services like TWITTER™ or LINKEDIN™, or analyzing job description listings and other publicly-available information. In a next step 235, open-source intelligence feeds may be checked, such as company IP address blacklists, search domains, or information leaks (for example, posted to public records such as PASTEBIN™). In a final step 236, collected information from all sources may be scored according to a weighted system, producing an overall cybersecurity rating score based on the information collected and the analysis of that information to reveal additional insights, relationships, and vulnerabilities.

For example, in an exemplary scoring system similar to a credit rating, information from initial Internet recon operations may be assigned a score up to 400 points, along with up to 200 additional points for web/application recon results, 100 points for patch frequency, and 50 points each for additional endpoints and open-source intel results. This yields a weighted score incorporating all available information from all scanned sources, allowing a meaningful and readily-appreciable representation of an organization's overall cybersecurity strength. Additionally, as scanning may be performed repeatedly and results collected into a time series hybrid data structure, this cybersecurity rating may evolve over time to continuously reflect the current state of the organization, reflecting any recent changes, newly-discovered or announced vulnerabilities, software or hardware updates, newly-added or removed devices or services, and any other changes that may occur.

Figure 3A:
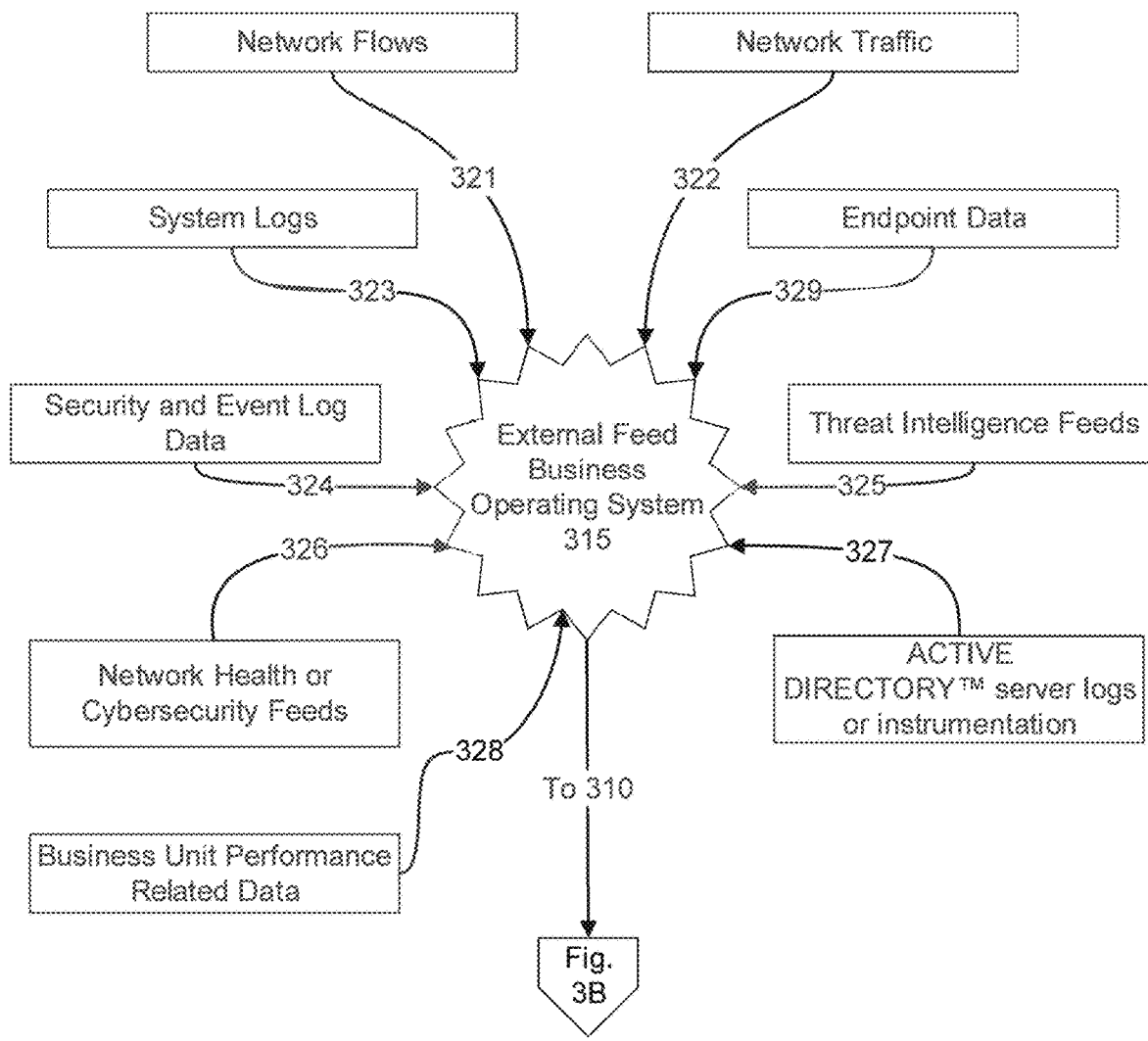
FIG. 3A is a process diagram showing data sources for a business operating system for use in mitigating cyberattacks.
Figure 3B:
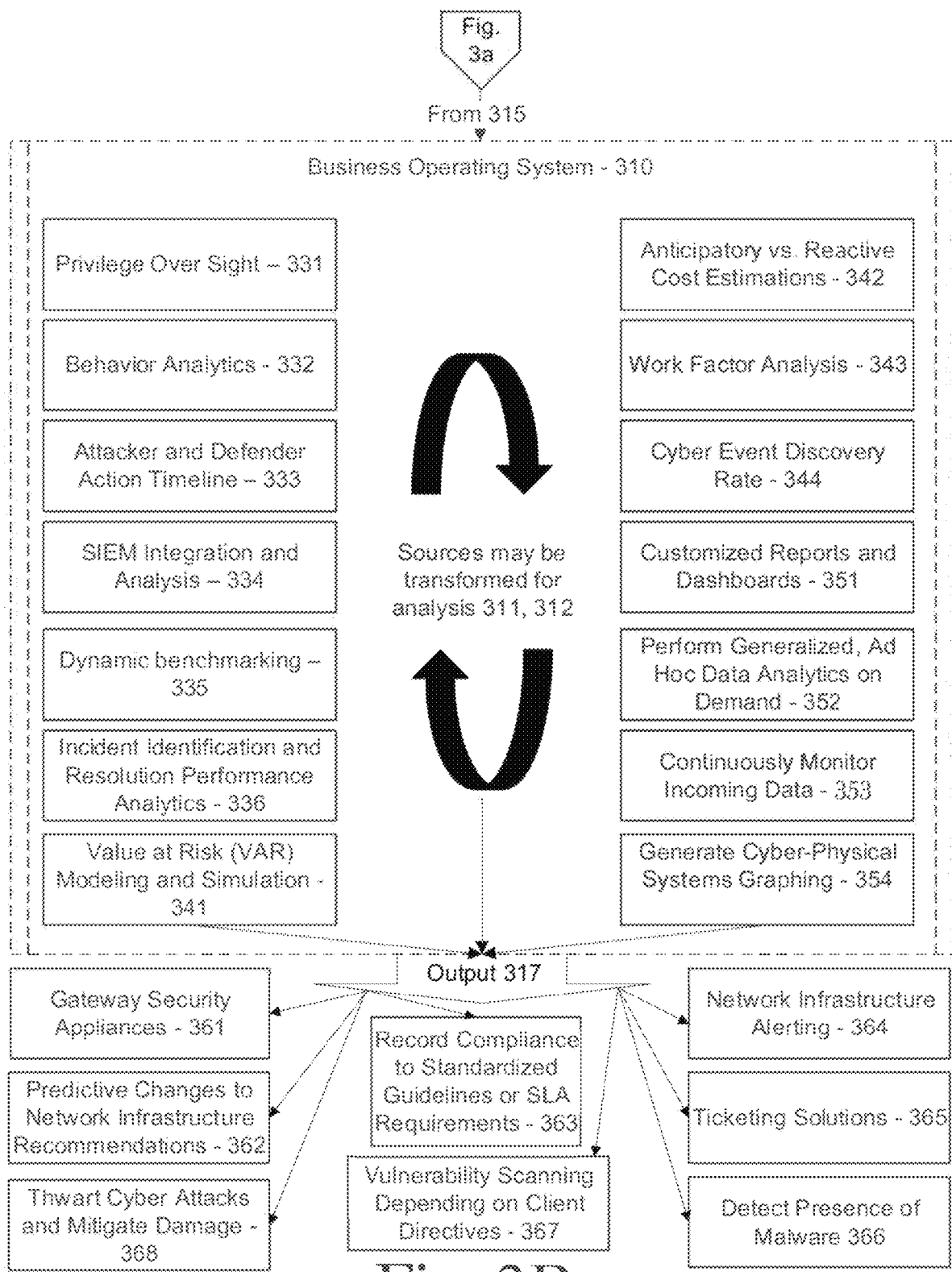
FIG. 3B is a process diagram showing business operating system functions in use to mitigate cyberattacks.

FIGS. 3A and 3B are process diagrams showing a general flow 300 of business operating system functions in use to mitigate cyberattacks. Input network data which may include network flow patterns 321, the origin and destination of each piece of measurable network traffic 322, system logs from servers and workstations on the network 323, endpoint data 329, any security event log data from servers or available security information and event (SIEM) systems 324, external threat intelligence feeds 324, identity or assessment context 325, external network health or cybersecurity feeds 326, Kerberos domain controller or ACTIVE DIRECTORY™ server logs or instrumentation 327 and business unit performance related data 328, among many other possible data types for which the invention was designed to analyze and integrate, may pass into 315 the business operating system 310 for analysis as part of its cyber security function. These multiple types of data from a plurality of sources may be transformed for analysis 311, 312 using at least one of the specialized cybersecurity, risk assessment or common functions of the business operating system in the role of cybersecurity system, such as, but not limited to network and system user privilege oversight 331, network and system user behavior analytics 332, attacker and defender action timeline 333, SIEM integration and analysis 334, dynamic benchmarking 335, and incident identification and resolution performance analytics 336 among other possible cybersecurity functions; value at risk (VAR) modeling and simulation 341, anticipatory vs. reactive cost estimations of different types of data breaches to establish priorities 342, work factor analysis 343 and cyber event discovery rate 344 as part of the system's risk analytics capabilities; and the ability to format and deliver customized reports and dashboards 351, perform generalized, ad hoc data analytics on demand 352, continuously monitor, process and explore incoming data for subtle changes or diffuse informational threads 353 and generate cyber-physical systems graphing 354 as part of the business operating system's common capabilities. Output 317 can be used to configure network gateway security appliances 361, to assist in preventing network intrusion through predictive change to infrastructure recommendations 362, to alert an enterprise of ongoing cyberattack early in the attack cycle, possibly thwarting it but at least mitigating the damage 362, to record compliance to standardized guidelines or SLA requirements 363, to continuously probe existing network infrastructure and issue alerts to any changes which may make a breach more likely 364, suggest solutions to any domain controller ticketing weaknesses detected 365, detect presence of malware 366, and perform one time or continuous vulnerability scanning depending on client directives 367, and thwart or mitigate damage from cyber attacks 368. These examples are, of course, only a subset of the possible uses of the system, they are exemplary in nature and do not reflect any boundaries in the capabilities of the invention.

Figure 4:
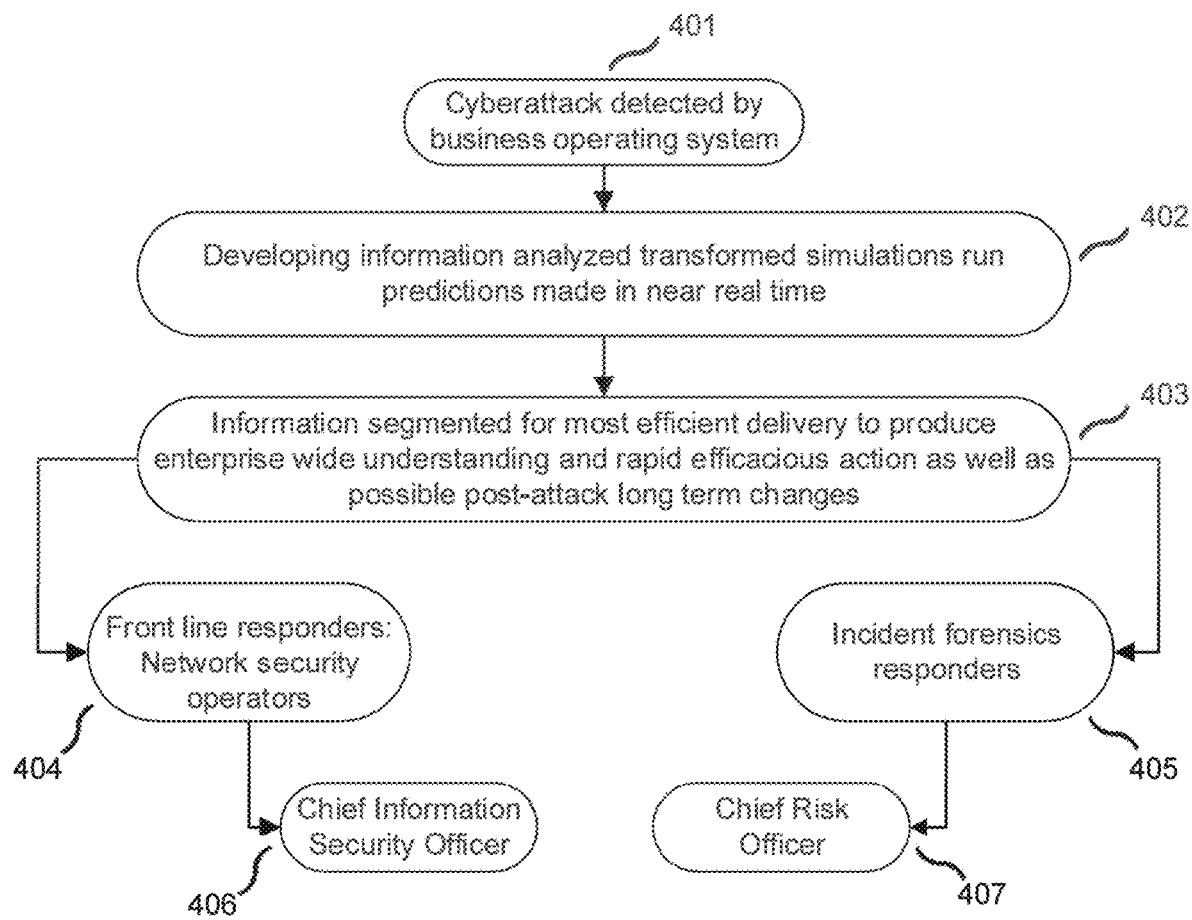
FIG. 4 is a process flow diagram of a method for segmenting cyberattack information to appropriate corporation parties.

FIG. 4 is a process flow diagram of a method for segmenting cyberattack information to appropriate corporation parties 400. As previously disclosed 200, 351, one of the strengths of the advanced cyber-decision platform is the ability to finely customize reports and dashboards to specific audiences, concurrently is appropriate. This customization is possible due to the devotion of a portion of the business operating system's programming specifically to outcome presentation by modules which include the observation and state estimation service 140 with its game engine 140a and script interpreter 140b. In the setting of cybersecurity, issuance of specialized alerts, updates and reports may significantly assist in getting the correct mitigating actions done in the most timely fashion while keeping all participants informed at predesignated, appropriate granularity. Upon the detection of a cyberattack by the system 401 all available information about the ongoing attack and existing cybersecurity knowledge are analyzed, including through predictive simulation in near real time 402 to develop both the most accurate appraisal of current events and actionable recommendations concerning where the attack may progress and how it may be mitigated. The information generated in totality is often more than any one group needs to perform their mitigation tasks. At this point, during a cyberattack, providing a single expansive and all inclusive alert, dashboard image, or report may make identification and action upon the crucial information by each participant more difficult, therefore the cybersecurity focused arrangement may create multiple targeted information streams each concurrently designed to produce most rapid and efficacious action throughout the enterprise during the attack and issue follow-up reports with and recommendations or information that may lead to long term changes afterward 403. Examples of groups that may receive specialized information streams include but may not be limited to front line responders during the attack 404, incident forensics support both during and after the attack 405, chief information security officer 406 and chief risk officer 407 the information sent to the latter two focused to appraise overall damage and to implement both mitigating strategy and preventive changes after the attack. Front line responders may use the cyber-decision platform's analyzed, transformed and correlated information specifically sent to them 404 to probe the extent of the attack, isolate such things as: the predictive attacker's entry point onto the enterprise's network, the systems involved or the predictive ultimate targets of the attack and may use the simulation capabilities of the system to investigate alternate methods of successfully ending the attack and repelling the attackers in the most efficient manner, although many other queries known to those skilled in the art are also answerable by the invention. Simulations run may also include the predictive effects of any attack mitigating actions on normal and critical operation of the enterprise's IT systems and corporate users. Similarly, a chief information security officer may use the cyber-decision platform to predictively analyze 406 what corporate information has already been compromised, predictively simulate the ultimate information targets of the attack that may or may not have been compromised and the total impact of the attack what can be done now and in the near future to safeguard that information. Further, during retrospective forensic inspection of the attack, the forensic responder may use the cyber-decision platform 405 to clearly and completely map the extent of network infrastructure through predictive simulation and large volume data analysis. The forensic analyst may also use the platform's capabilities to perform a time series and infrastructural spatial analysis of the attack's progression with methods used to infiltrate the enterprise's subnets and servers. Again, the chief risk officer would perform analyses of what information 407 was stolen and predictive simulations on what the theft means to the enterprise as time progresses. Additionally, the system's predictive capabilities may be employed to assist in creation of a plan for changes of the IT infrastructural that should be made that are optimal for remediation of cybersecurity risk under possibly limited enterprise budgetary constraints in place at the company so as to maximize financial outcome.

Figure 5:
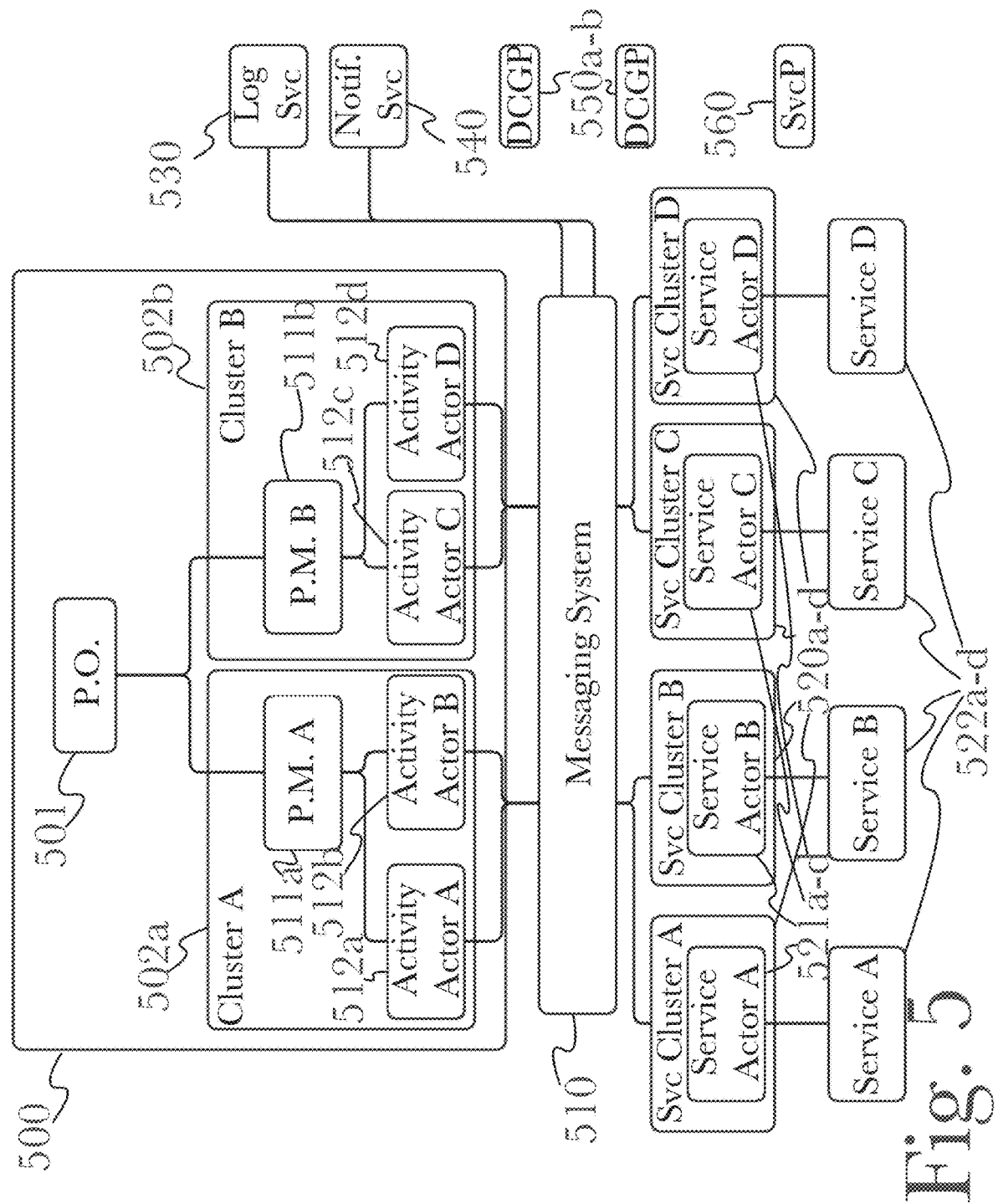
FIG. 5 is a diagram of an exemplary architecture for a system for rapid predictive analysis of very large data sets using an actor-driven distributed computational graph, according to one aspect.

FIG. 5 is a diagram of an exemplary architecture for a system for rapid predictive analysis of very large data sets using an actor-driven distributed computational graph 500, according to one aspect. According to the aspect, a DCG 500 may comprise a pipeline orchestrator 501 that may be used to perform a variety of data transformation functions on data within a processing pipeline, and may be used with a messaging system 510 that enables communication with any number of various services and protocols, relaying messages and translating them as needed into protocol-specific API system calls for interoperability with external systems (rather than requiring a particular protocol or service to be integrated into a DCG 500).

Pipeline orchestrator 501 may spawn a plurality of child pipeline clusters 502a-b, which may be used as dedicated workers for streamlining parallel processing. In some arrangements, an entire data processing pipeline may be passed to a child cluster 502a for handling, rather than individual processing tasks, enabling each child cluster 502a-b to handle an entire data pipeline in a dedicated fashion to maintain isolated processing of different pipelines using different cluster nodes 502a-b. Pipeline orchestrator 501 may provide a software API for starting, stopping, submitting, or saving pipelines. When a pipeline is started, pipeline orchestrator 501 may send the pipeline information to an available worker node 502a-b, for example using AKKA™ clustering. For each pipeline initialized by pipeline orchestrator 501, a reporting object with status information may be maintained. Streaming activities may report the last time an event was processed, and the number of events processed. Batch activities may report status messages as they occur. Pipeline orchestrator 501 may perform batch caching using, for example, an IGFS™ caching filesystem. This allows activities 512a-d within a pipeline 502a-b to pass data contexts to one another, with any necessary parameter configurations.

A pipeline manager 511a-b may be spawned for every new running pipeline, and may be used to send activity, status, lifecycle, and event count information to the pipeline orchestrator 501. Within a particular pipeline, a plurality of activity actors 512a-d may be created by a pipeline manager 511a-b to handle individual tasks, and provide output to data services 522a-d. Data models used in a given pipeline may be determined by the specific pipeline and activities, as directed by a pipeline manager 511a-b. Each pipeline manager 511a-b controls and directs the operation of any activity actors 512a-d spawned by it. A pipeline process may need to coordinate streaming data between tasks. For this, a pipeline manager 511a-b may spawn service connectors to dynamically create TCP connections between activity instances 512a-d. Data contexts may be maintained for each individual activity 512a-d, and may be cached for provision to other activities 512a-d as needed. A data context defines how an activity accesses information, and an activity 512a-d may process data or simply forward it to a next step. Forwarding data between pipeline steps may route data through a streaming context or batch context.

A client service cluster 530 may operate a plurality of service actors 521a-d to serve the requests of activity actors 512a-d, ideally maintaining enough service actors 521a-d to support each activity per the service type. These may also be arranged within service clusters 520a-d, in a manner similar to the logical organization of activity actors 512a-d within clusters 502a-b in a data pipeline. A logging service 530 may be used to log and sample DCG requests and messages during operation while notification service 540 may be used to receive alerts and other notifications during operation (for example to alert on errors, which may then be diagnosed by reviewing records from logging service 530), and by being connected externally to messaging system 510, logging and notification services can be added, removed, or modified during operation without impacting DCG 500. A plurality of DCG protocols 550a-b may be used to provide structured messaging between a DCG 500 and messaging system 510, or to enable messaging system 510 to distribute DCG messages across service clusters 520a-d as shown. A service protocol 560 may be used to define service interactions so that a DCG 500 may be modified without impacting service implementations. In this manner it can be appreciated that the overall structure of a system using an actor-driven DCG 500 operates in a modular fashion, enabling modification and substitution of various components without impacting other operations or requiring additional reconfiguration.

Figure 6:
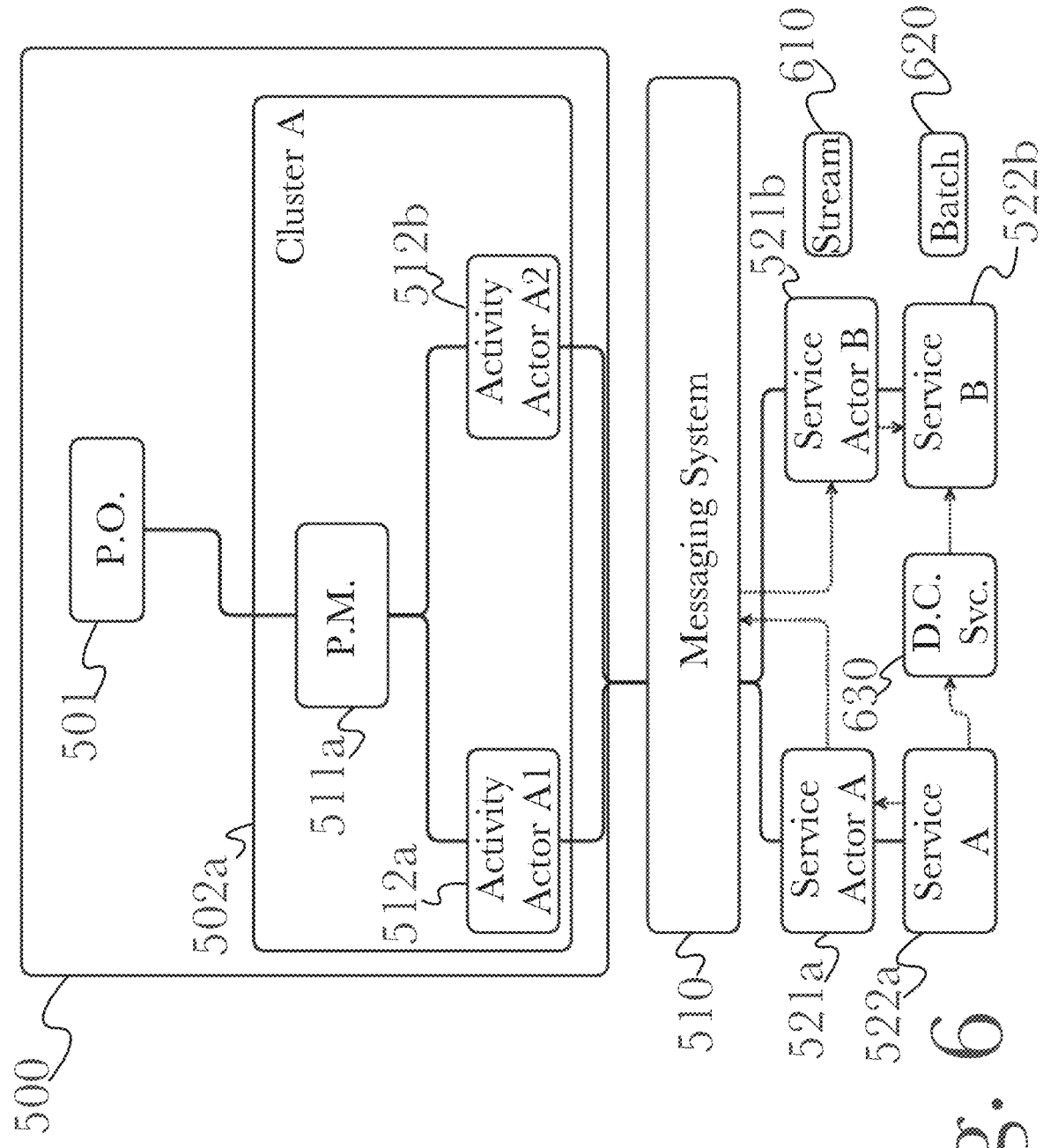
FIG. 6 is a diagram of an exemplary architecture for a system for rapid predictive analysis of very large data sets using an actor-driven distributed computational graph, according to one aspect.

FIG. 6 is a diagram of an exemplary architecture for a system for rapid predictive analysis of very large data sets using an actor-driven distributed computational graph 500, according to one aspect. According to the aspect, a variant messaging arrangement may utilize messaging system 510 as a messaging broker using a streaming protocol 610, transmitting and receiving messages immediately using messaging system 510 as a message broker to bridge communication between service actors 521a-b as needed. Alternately, individual services 522a-b may communicate directly in a batch context 620, using a data context service 630 as a broker to batch-process and relay messages between services 522a-b.

Figure 7:
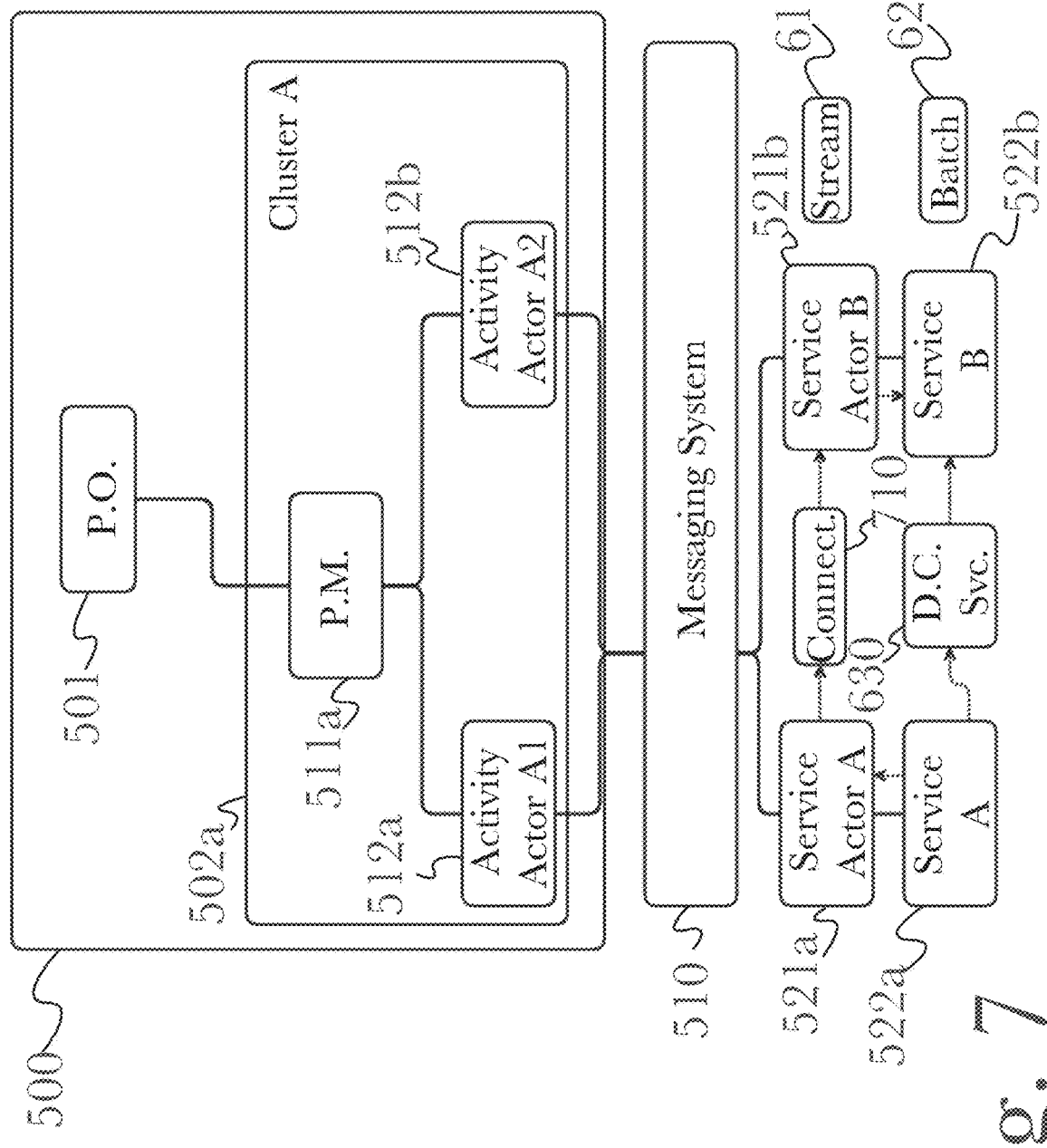
FIG. 7 is a diagram of an exemplary architecture for a system for rapid predictive analysis of very large data sets using an actor-driven distributed computational graph, according to one aspect.

FIG. 7 is a diagram of an exemplary architecture for a system for rapid predictive analysis of very large data sets using an actor-driven distributed computational graph 500, according to one aspect. According to the aspect, a variant messaging arrangement may utilize a service connector 710 as a central message broker between a plurality of service actors 521a-b, bridging messages in a streaming context 610 while a data context service 630 continues to provide direct peer-to-peer messaging between individual services 522a-b in a batch context 620.

It should be appreciated that various combinations and arrangements of the system variants described above (referring to FIGS. 1-7) may be possible, for example using one particular messaging arrangement for one data pipeline directed by a pipeline manager 511a-b, while another pipeline may utilize a different messaging arrangement (or may not utilize messaging at all). In this manner, a single DCG 500 and pipeline orchestrator 501 may operate individual pipelines in the manner that is most suited to their particular needs, with dynamic arrangements being made possible through design modularity as described above in FIG. 5.

Figure 19:
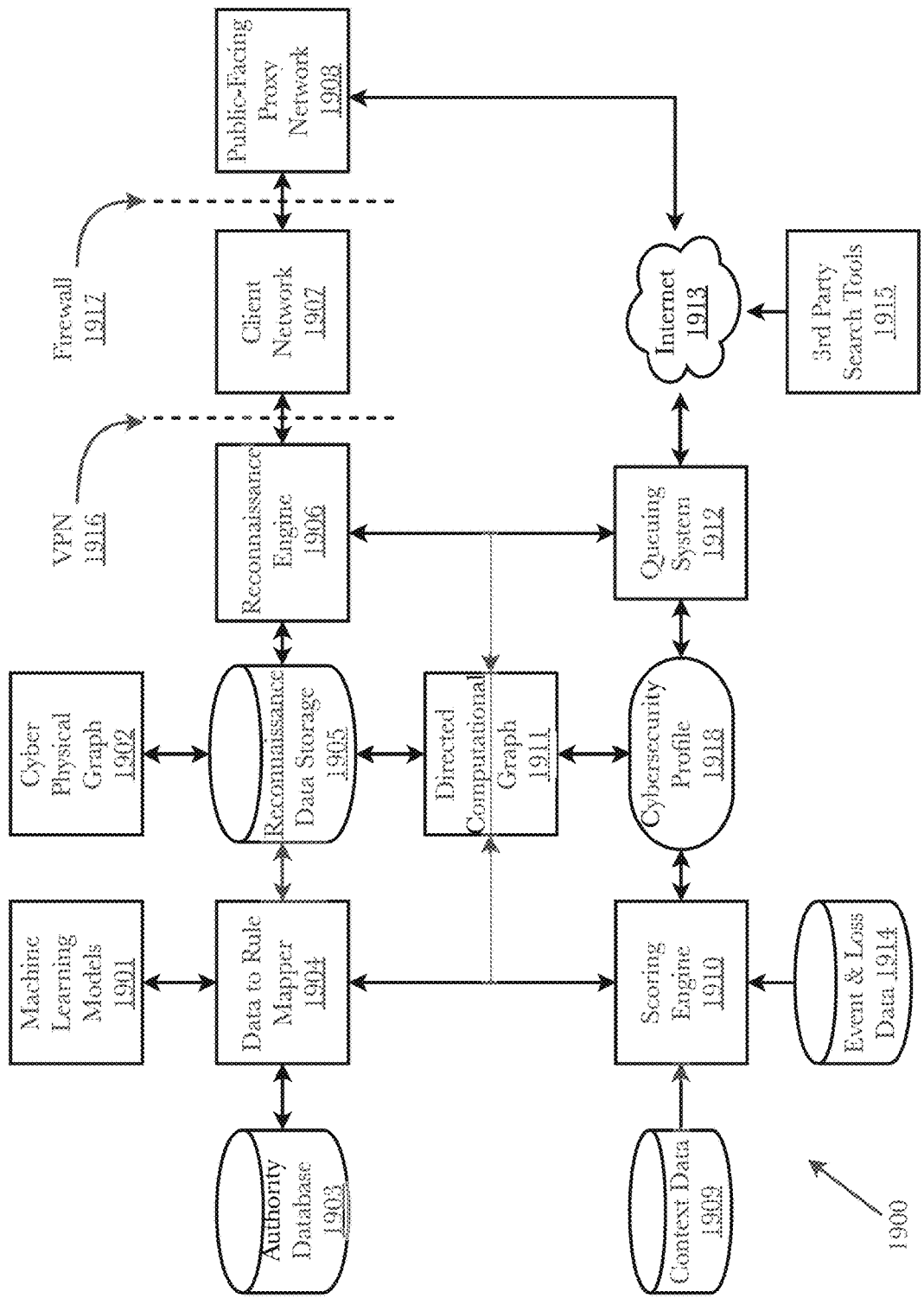
FIG. 19 is block diagram showing an exemplary system architecture for a system for cybersecurity profiling and rating.

FIG. 19 is block diagram showing an exemplary system architecture 1900 for a system for cybersecurity profiling and rating. The system in this example contains a cyber-physical graph 1902 which is used to represent a complete picture of an organization's infrastructure and operations including, importantly, the organization's computer network infrastructure. The system further contains a distributed computational graph 1911, which contains representations of complex processing pipelines and is used to control workflows through the system such as determining which $3^{rd}$ party search tools 1915 to use, assigning search tasks, and analyzing the cyber-physical graph 1902 and comparing results of the analysis against reconnaissance data received from the reconnaissance engine 1906 and stored in the reconnaissance data storage 1905. In some embodiments, the determination of which $3^{rd}$ party search tools 1915 to use and assignment of search tasks may be implemented by a reconnaissance engine 1906. The cyber-physical graph 1902 plus the analyses of data directed by the distributed computational graph on the reconnaissance data received from the reconnaissance engine 1906 are combined to represent the cyber-security profile of the client organization whose network 1907 is being evaluated. A queuing system 1912 is used to organize and schedule the search tasks requested by the reconnaissance engine 1906. A data to rule mapper 1904 is used to retrieve laws, policies, and other rules from an authority database 1903 and compare reconnaissance data received from the reconnaissance engine 1906 and stored in the reconnaissance data storage 1905 against the rules in order to determine whether and to what extent the data received indicates a violation of the rules. Machine learning models 1901 may be used to identify patterns and trends in any aspect of the system, but in this case are being used to identify patterns and trends in the data which would help the data to rule mapper 1904 determine whether and to what extent certain data indicate a violation of certain rules. A scoring engine 1910 receives the data analyses performed by the distributed computational graph 1911, the output of the data to rule mapper 1904, plus event and loss data 1914 and contextual data 1909 which defines a context in which the other data are to be scored and/or rated. A public-facing proxy network 1908 is established outside of a firewall 1917 around the client network 1907 both to control access to the client network from the Internet 1913, and to provide the ability to change the outward presentation of the client network 1907 to the Internet 1913, which may affect the data obtained by the reconnaissance engine 1906. In some embodiments, certain components of the system may operate outside the client network 1907 and may access the client network through a secure, encrypted virtual private network (VPN) 1916, as in a cloud-based or platform-as-a-service implementation, but in other embodiments some or all of these components may be installed and operated from within the client network 1907.

As a brief overview of operation, information is obtained about the client network 1907 and the client organization's operations, which is used to construct a cyber-physical graph 1902 representing the relationships between devices, users, resources, and processes in the organization, and contextualizing cybersecurity information with physical and logical relationships that represent the flow of data and access to data within the organization including, in particular, network security protocols and procedures. The distributed computational graph 1911 containing workflows and analysis processes, selects one or more analyses to be performed on the cyber-physical graph 1902. Some analyses may be performed on the information contained in the cyber-physical graph, and some analyses may be performed on or against the cyber-physical graph using information obtained from the Internet 1913 from reconnaissance engine 1906. The workflows contained in the distributed computational graph 1911 select one or more search tools to obtain information about the organization from the Internet 1915, and may comprise one or more third party search tools 1915 available on the Internet. As data are collected, they are fed into a reconnaissance data storage 1905, from which they may be retrieved and further analyzed. Comparisons are made between the data obtained from the reconnaissance engine 1906, the cyber-physical graph 1902, the data to rule mapper, from which comparisons a cybersecurity profile of the organization is developed. The cybersecurity profile is sent to the scoring engine 1910 along with event and loss data 1914 and context data 1909 for the scoring engine 1910 to develop a score and/or rating for the organization that takes into consideration both the cybersecurity profile, context, and other information.

Figure 24:
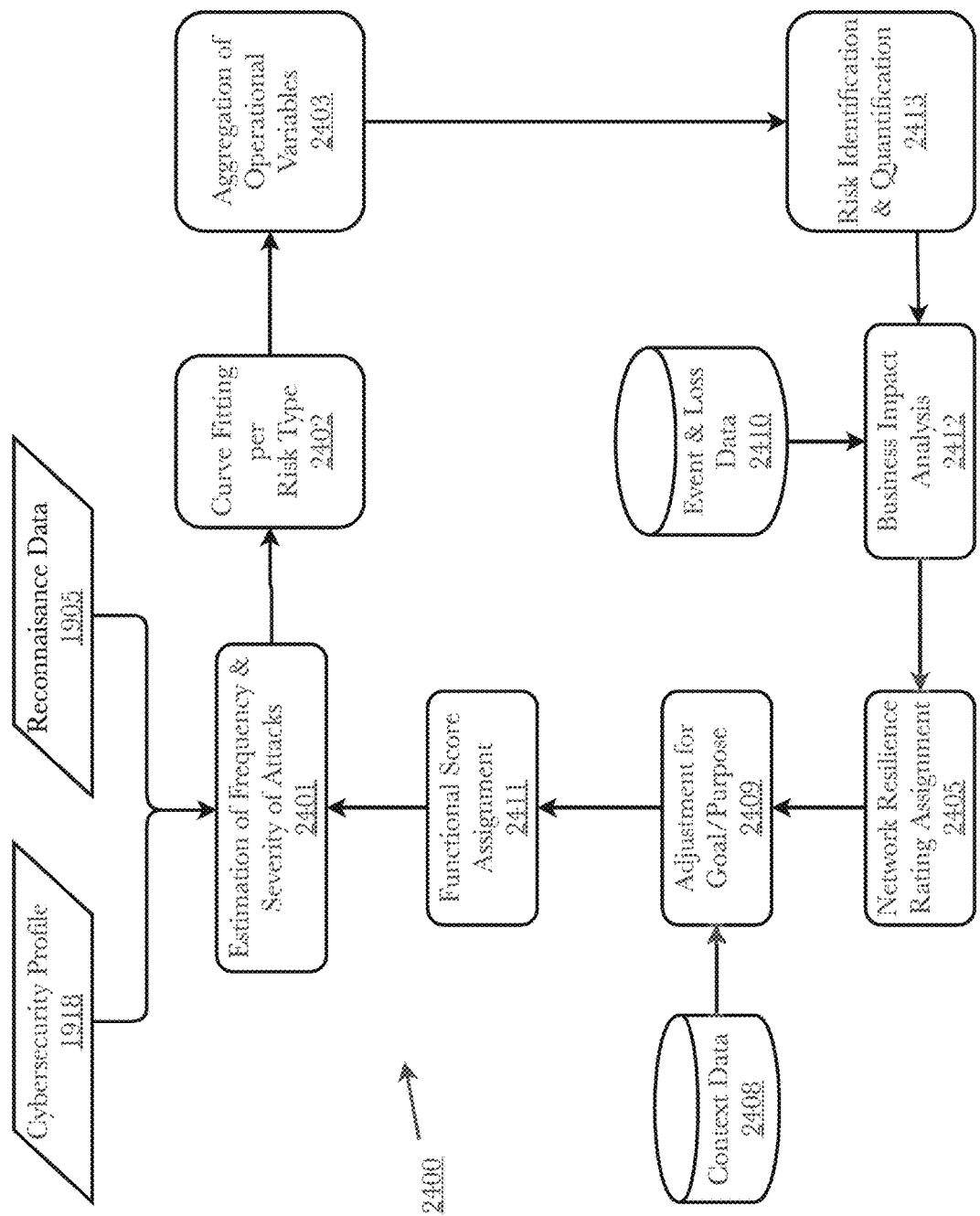
FIG. 24 is block diagram showing an exemplary architecture diagram for a scoring engine.

FIG. 24 is block diagram showing an exemplary architecture 2400 for a scoring engine. Data fed into the scoring engine comprise the cybersecurity profile 1918 and reconnaissance data 1905 developed at earlier stages of system operation. Based on these data, a frequency and severity of attack is estimated 2408. For each risk type, curve fitting 2402 may be performed on the data points to assign a "best fit" function along the range of data points, which captures trends in the data and allows for predictions of how similar data will behave in the future. Aggregations of operational variables 2403 may be applied to identify maxima, minima, counts, sums, and standard deviations of the data. Risk identification and quantification is then performed 2413, and a business impact analysis is performed 2412 based on a totality of the predicted risks, their severity, business dependencies reflected in the cyber-physical graph, and prior event and loss data 2410, among other variables. From this analysis of business impact 2412, a network resilience rating is assigned 2405, representing a weighted and adjusted total of relative exposure the organization has to various types of risks, each of which may be assigned a sub-rating. The network resilience rating 2405 may be a single score for all factors, a combination of scores, or a score for a particular risk or area of concern. The network resilience rating 2411 may then be adjusted or filtered depending on the context in which it is to be used 2409. For example, context data received 2408 may indicate that the scores are to be used for compliance with internal theft policies, but the factors associated with the network resilience rating indicate that the highest risks are associated with cyber-attacks from external systems, which may cause the adjustment for goal/purpose 2409 to filter out the factors of the network resilience rating associated with risks from external cyber-attacks or reduce their contribution to a functional score. Finally, a functional cybersecurity score 2411 is assigned which takes into account the adjusted factors of the network resilience score and the context in which the functional score is to be applied. The process may be iterative, in that the network resilience rating 2405 from previous analyses may be fed back into the start of the process at estimation of frequency and severity of attacks 2401.

Figure 25:
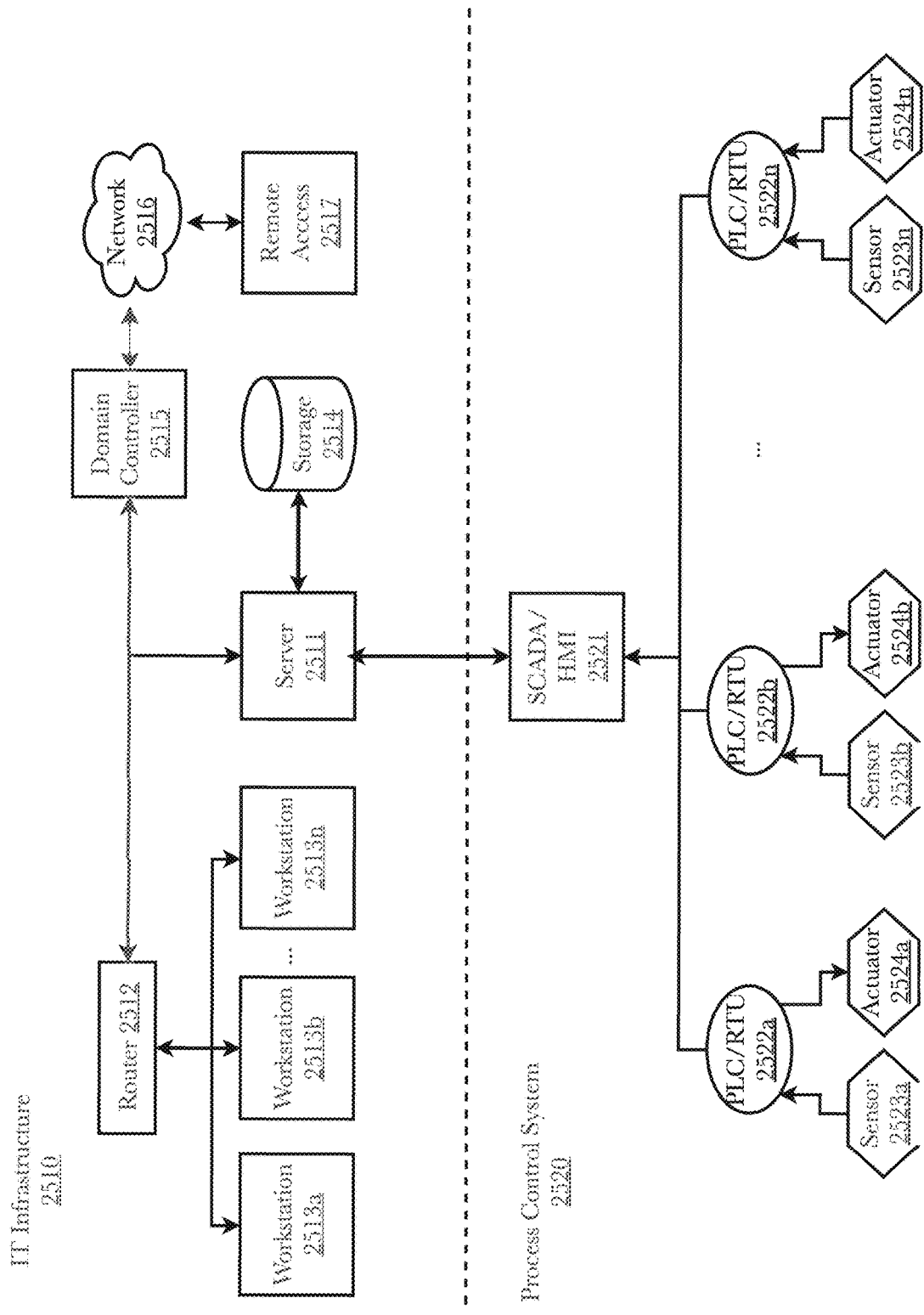
FIG. 25 (PRIOR ART) is a block diagram showing an exemplary process control system integrated with an information technology system.

FIG. 25 (PRIOR ART) is a block diagram showing an exemplary process control system integrated with an information technology system. In this simplified diagram, the process control system 2520 is controlled by a supervisory control and data acquisition (SCADA) unit, which is sometimes also referred to as a human machine interface (HMI). The SCADA/HMI unit displays information to a control system operator about the operation of the overall system and the state or status of various sub-systems and devices. Sub-systems and devices are each controlled by a programmable logic controller (PLC) or remote terminal unit (RTU) 2522a-n, which are dedicated computing devices programmed to control specific physical systems and devices such as valves, pumps, heaters, conveyor belts, etc. The PLC/RTUs 2522a-n receive data from sensors 2523a-n and either take action through their own programming or direction from the SCADA/HMI 2521 to send control signals to actuators 2524a-n which change the operation or state of the physical system or device (not shown). Process control systems 2520 often communicate with or are integrated with an IT infrastructure system 2510, typically through one or more servers 2511. In this simplified diagram, the server 2511 acts as the central hub which manages data traffic throughout the IT infrastructure system 2510. The server 2511 routes information to and from to the SCADA/HMI system 2521, one or more routers 2512 which route information to a plurality of workstations 2513a-n and other devices (not shown), storage 2514, and a domain controller 2515 which controls access to the IT infrastructure from other networks 2516 such as the Internet, for example allowing remote access 2517 to the IT infrastructure from authorized systems and entities, but preventing access from other systems and entities.

Figure 26:
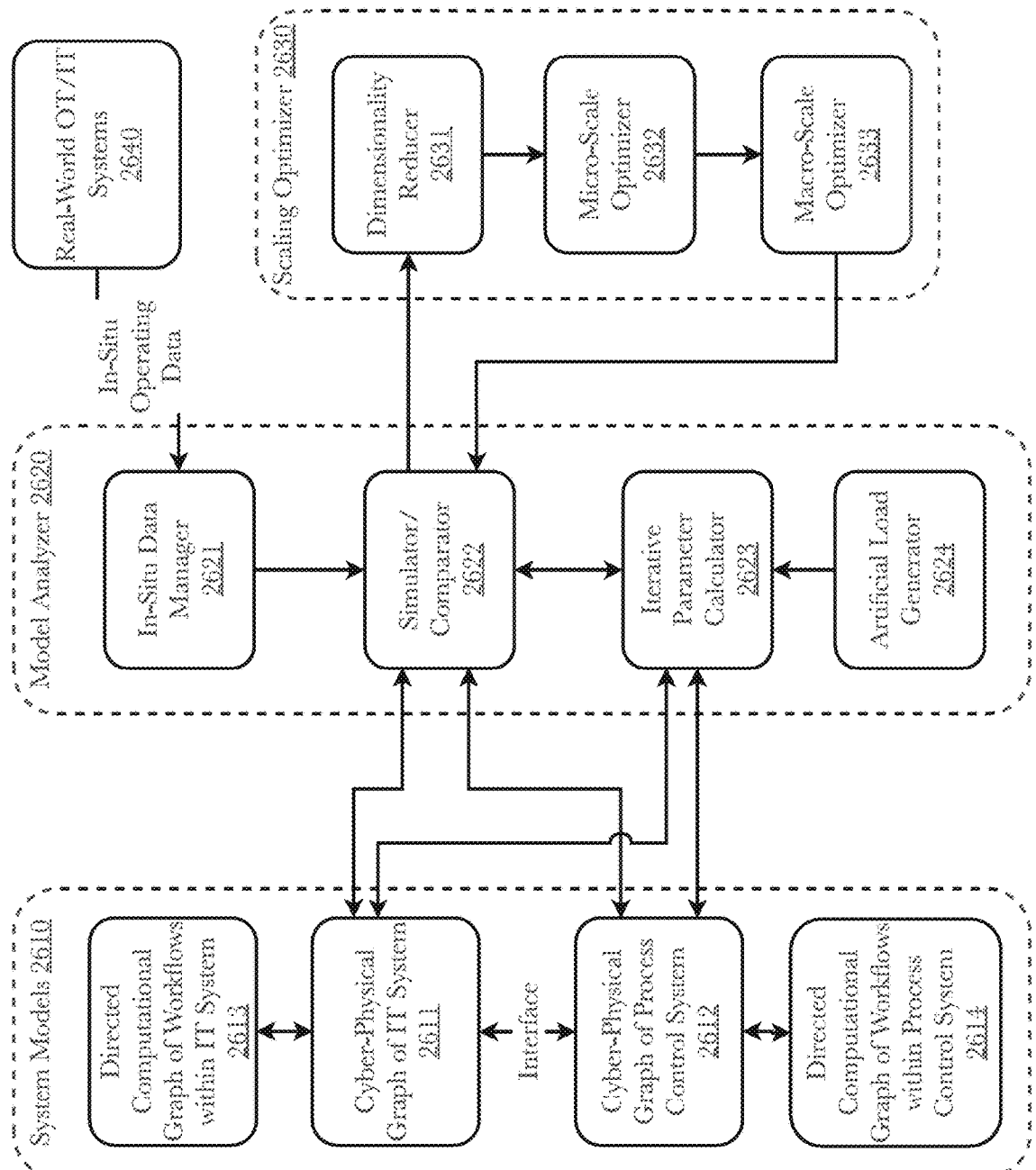
FIG. 26 is a block diagram showing an exemplary architecture for a system for parametric analysis of integrated operational technology systems and information technology systems.

FIG. 26 is a block diagram showing an exemplary architecture for a system for parametric analysis of integrated operational technology systems and information technology systems. In the embodiments described herein, one or more directed graphs are used to create system models 2610 to model both the operational technology (OT) and information technology (IT) systems and the interactions between them. A cyber-physical graph is used to model the entities and entity relationships of the IT system 2611 and a distributed computational graph is used to model the complex workflows and processes within the IT system 2613 as modeled by the cyber-physical graph of the IT system 2611. A cyber-physical graph is used to model the entities and entity relationships of the IT system 2611 and a distributed computational graph is used to model the complex workflows and processes within the IT system 2613 as modeled by the cyber-physical graph of the IT system 2611. Likewise, a cyber-physical graph is used to model the entities and entity relationships of the OT system 2612 and a distributed computational graph is used to model the complex workflows and processes within the OT system 2614 as modeled by the cyber-physical graph of the OT system 2612. This methodology of using directed graphs to models the systems allows for a very fine level of granularity in the model and incorporation of broader range of variables than traditional modeling. While separate directed graphs are show in this example for each system and its workflows, it is possible to incorporate all of this information into a single graph or break the information into a series of smaller graphs. The interface between the cyber-physical graphs of OT and IT system models 2611, 2613 may be a separate cyber-physical graph or may be implied by inputs/outputs in each of the separate cyber-physical graphs of OT and IT system models 2611, 2613.

A model analyzer 2620 is used to analyze scenarios run on the models and calibrate them to the real-world OT and IT systems that are being modeled. An in-situ data manager 2621 receives, organizes, and stores data obtained from the real-world operation of the OT and IT systems 2640 that are being modeled by the system models 2610. These in-situ operational data may comprise any data generated by, or obtainable from, the OT and IT systems 2640, including but not limited to device telemetry data, system and device log files, connection and access activity, network events, deployed software versions, user activity information, sensor data, process control status information, etc., and may be stored in a time series data store.

A simulator/comparator 2622 runs simulations on the system models 2610, and compares the simulations to the in-situ operating data to calibrate the system models 2610 to the real-world systems 2640 being modeled. The simulator/comparator 2622 may be programmed to search for parameter values that maximize agreement between simulation output under varying conditions (whether actual or artificial) and in-situ operating data from the real-world OT/IT systems 2640. Results of the simulations may be passed through machine learning algorithms (not shown) to identify trends or patterns in the data. The simulator/comparator 2622 may use the output of an iterative parameter calculator 2623 to search for parameter values that maximize agreement between simulation output under varying conditions (whether actual or artificial) and in-situ operating data from the real-world OT/IT systems 2640. Results of the simulations may be passed through machine learning algorithms (not shown) to identify trends or patterns in the data.

An iterative parameter calculator 2623 can be used to iterate individual parameters or groups of parameters over a range of conditions to determine their impact on the individual system models 2610 or the system represented by the system models 2610 as a whole. In conjunction with the simulator/comparator 2622 to link observed phenomena (e.g., in-situ data as one example) and expectations from the system models 2610, along with the IT/OT control system state, to help isolate whether observed effects are likely to be linked to operational changes, errors in OT systems (including, for example, errors from malware such as Olympic Games/Stuxnet), or physical or process problems (e.g. a pipeline leak for an oil or gas transportation network). For example, the iterative parameter calculator 2623 may be used to isolate uncertainty in outcomes based on different contributing factors. This can include sampling from a given parameter to determine the uncertainty in the overall model output, prioritizing exploration of factors (internal or exogenous) contributing to deviations in the expected mean or median performance of a system, quantification of the overall variability in model response or the reliability of a given set of operational criteria being met or maintained over a finite time horizon (which may be used as a reasonable proxy for reliability estimation), or to simply determine the range or intervals of possible outcomes, particularly when frequency of occurrence may be not be capable of estimation so severity of an occurrence must take priority in the analysis. The results obtained from the iterative parameter calculator 2623 may also enable statistical validation metrics or estimates associated with performance changes possible from RL type approaches. An artificial load generator 2624 may be used by the iterative parameter calculator to iterate parameters of the system while under a simulated load (e.g., bandwidth and data usage for IT systems, physical process conditions such as temperature, flow rates, etc., for OT systems, and the like).

A key feature of the system for parametric analysis is the scaling optimizer 2630 which, with the help of the simulator/comparator 2622 and iterative parameter calculator 2623, identifies key components of the system models 2610 and scales the analyses to make them tractable from the standpoint of finite computing resources while maintaining sufficient low-level analysis and granularity to be able to identify confluences of factors that can result in rare events. The scaling optimizer 2630 has one or more components that reduce that scale of analyses to a tractable level with finite computing resources, including a dimensionality reducer 2631, a micro-scale optimizer 2632, and a macro-scale optimizer 2633. The dimensionality reducer 2631 is used to limit the scope of the problem under analysis either by selecting certain features for analysis or by combining a large set of variables into a smaller set of variables that are combinations of the large set of variables containing essentially the same information. The dimensionality reducer 2631 may rely on techniques such as sliding time windows, filters and algorithms such as missing value ratios, low variance filters, high correlation filers, etc., or reinforcement learning algorithms such as genetic algorithms and stochastic scheduling strategies to reduce the dimensionality of the analyses to a tractable range. The micro-scale optimizer 2632 may be used to determine the right "balance" between perturbations and iterative cycles of a particular system model 2610 or of sub-systems within a particular system model 2610 before enabling cyber-physical model interactions of a larger set of system models 2610. An example of this methodology is fluid-structure interaction (FSI) analysis where an independent model evolution is evaluated within discrete time steps based on the amount of sensitivity or impact to overall outcomes against some defined objective function. A macro-scale optimizer 2633 may be used to determine when new simulations of the system models 2610 should be triggered. New simulations may be triggered, for example, by determining what degree of change in state or objective function should trigger new simulations based on the economic, time, or computing resources cost estimates of simulations versus the value and actionability of potential information gains by conducing new simulations. The frequency of such changes in state may be monitored, and used to trigger a new simulation when the threshold degree of change in state would be expected to occur, even if it is not determined that the threshold degree of change has actually occurred.

Figure 30:
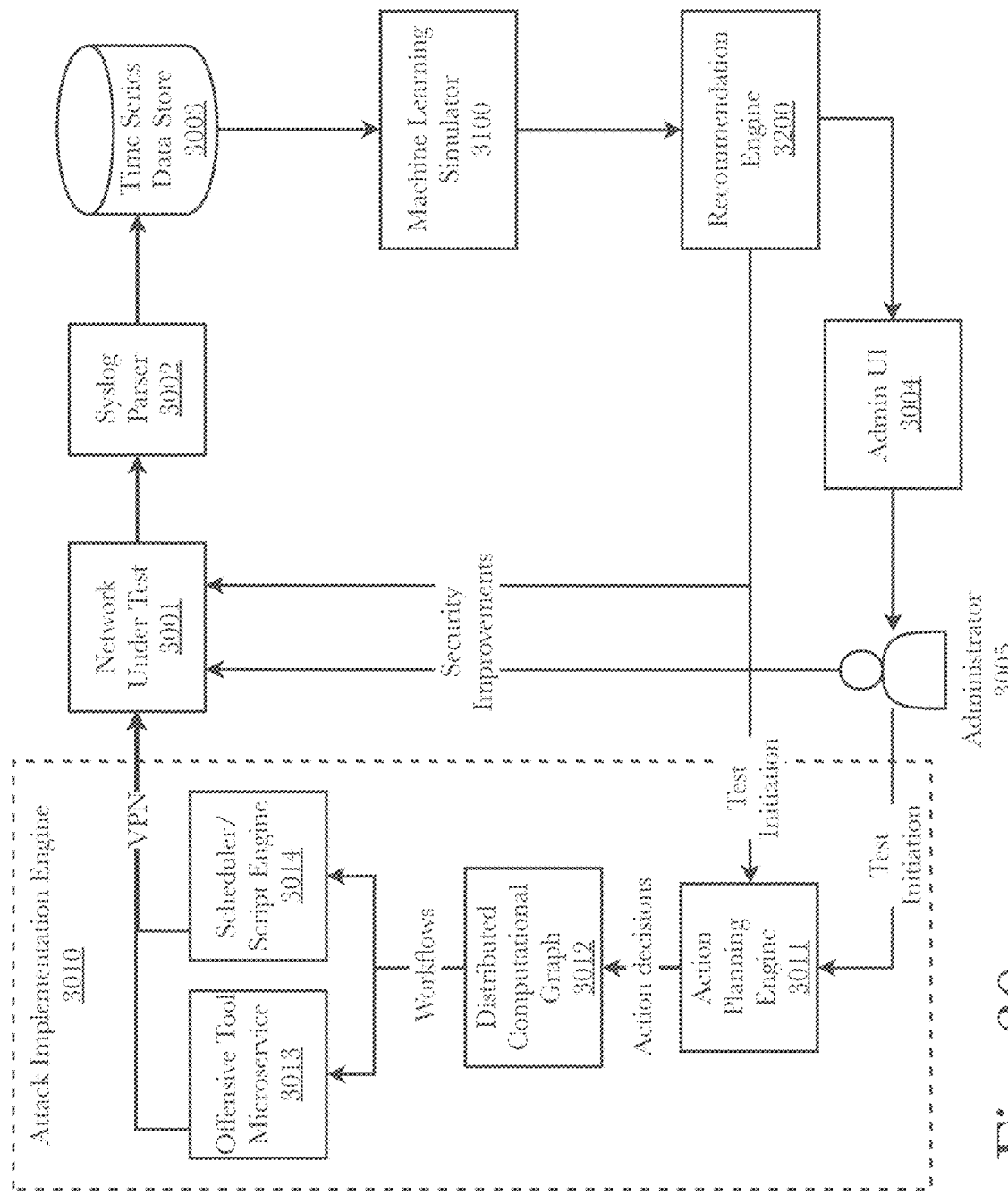
FIG. 30 is a block diagram showing an exemplary system architecture for an automated cybersecurity defensive strategy analysis and recommendation system.

FIG. 30 is a block diagram showing an exemplary system architecture for an automated cybersecurity defensive strategy analysis and recommendation system. In this embodiment, the system is structured to provide an iterative analysis and improvement process that uses an attack implementation engine 3010 to test an actual network under test 3001, gathers system information from the test, which is used by a simulator 3100 to initiate an iterative simulation of a cyberattack strategy sequence, with each iteration comprising a simulated attack generated by a machine learning algorithm on a model of the network under test 3001 and a simulated defense generated by a machine learning algorithm against the simulated attack. The iterative simulation produces a simulation result, which is passed to a recommendation engine 3200, which recommends cybersecurity improvements to the network under test 3001 based on one or more cost factors and benefit factors. The improvements are implemented on the network under test 3001, which starts the next iteration of testing. A test may be initiated either manually by an administrator 3005 or automatically by a recommendation engine 3200, with the test initiation describing an attack strategy to be tested. Upon receiving test initiation instructions, an action planning engine 3011 determines how to implement the attack strategy by determining a set of action decisions. The action planning engine 3011 may be a state/action engine wherein possible courses of action are determined by states of the system and the actions possible from that state, and may use a state/action modeling language such as Action Notation Modeling Language (ANML), although other implementations are possible. The action decisions from the action planning engine 3011 are passed to a distributed computational graph 3012, which contains detailed workflows for implementing cyberattacks on the network under test 3001 based on the action decisions. The workflows in the distributed computational graph 3012 are used to control attacks generated by an offensive tool microservice 3013 which contains a collection of cyberattack tools joined together by a scheduler or script engine 3014, which defines when each cyberattack tool will be used against the network under test 3001. The network under test 3001 is a real-world network that may be an entire network or a subset of an entire network. The network under test 3001 may be an actual network in live operation, or may be a network created specifically for testing purposes and not associated with live operations. Portions of the network under test 3001 may be sandboxed to prevent damage to, or infiltration of, other areas of the network, particularly where the network under test 3001 is an actual network in live operation.

During testing, the network under test 3001 is monitored to capture system information about the operation of the network under test 3001 during the test cyberattack, including time series information about the sequence of events and response of affected devices. In this example, system log (syslog) information and time series data is gathered from affected devices and sent to a syslog parser 3002 which sorts the system logs and associates them with time events to create a time series data store 3003 of the cyberattack and the network's response.

The real-world data from the time series data store 3003 is used to inform the operations of a simulator 3100, which uses the real-world data to run attack and defense simulations using a machine learning engine 3120, which uses machine learning algorithms such as reinforcement learning or evolutionary learning algorithms to test a model of the network under test 3001 represented by a cyber-physical graph 3101. The results of the simulations comprise a probability of success of various attack and defense strategies arising out of the implementation of the real-world attack data on the model of the network under test 3001 represented by the cyber-physical graph 3101. The simulation results from the simulator 3100 are sent to a recommendation engine 3200, which compares the likelihood of success of the various attack and defense strategies against real-world cost and benefit considerations to generate recommendations for cost-effective, realistic security improvements to the network under test 3001. The recommendations may be used to automatically implement security improvements and initiate the next iteration of testing. The recommendations are also sent to an administrative user interface 3004, which may be used by an administrator 3005 to manually implement security improvements and initiate the next iteration of testing.

Detailed Description of Exemplary Aspects

Figure 8:
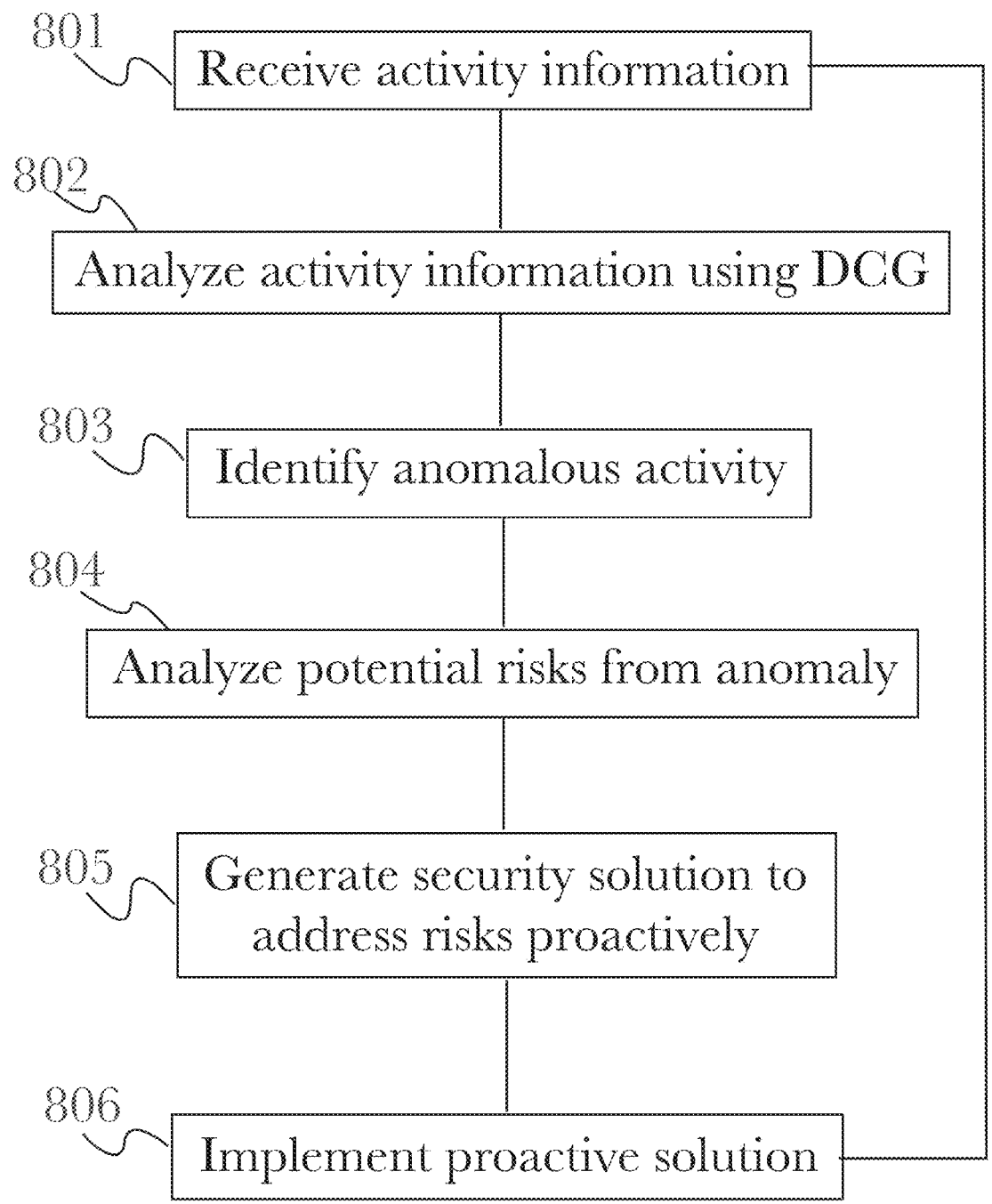
FIG. 8 is a flow diagram of an exemplary method for cybersecurity behavioral analytics, according to one aspect.

FIG. 8 is a flow diagram of an exemplary method 800 for cybersecurity behavioral analytics, according to one aspect. According to the aspect, behavior analytics may utilize passive information feeds from a plurality of existing endpoints (for example, including but not limited to user activity on a network, network performance, or device behavior) to generate security solutions. In an initial step 801, a web crawler 115 may passively collect activity information, which may then be processed 802 using a DCG 155 to analyze behavior patterns. Based on this initial analysis, anomalous behavior may be recognized 803 (for example, based on a threshold of variance from an established pattern or trend) such as high-risk users or malicious software operators such as bots. These anomalous behaviors may then be used 804 to analyze potential angles of attack and then produce 805 security suggestions based on this second-level analysis and predictions generated by an action outcome simulation module 125 to determine the likely effects of the change. The suggested behaviors may then be automatically implemented 806 as needed. Passive monitoring 801 then continues, collecting information after new security solutions are implemented 806, enabling machine learning to improve operation over time as the relationship between security changes and observed behaviors and threats are observed and analyzed.

This method 800 for behavioral analytics enables proactive and high-speed reactive defense capabilities against a variety of cyberattack threats, including anomalous human behaviors as well as nonhuman "bad actors" such as automated software bots that may probe for, and then exploit, existing vulnerabilities. Using automated behavioral learning in this manner provides a much more responsive solution than manual intervention, enabling rapid response to threats to mitigate any potential impact. Utilizing machine learning behavior further enhances this approach, providing additional proactive behavior that is not possible in simple automated approaches that merely react to threats as they occur.

Figure 9:
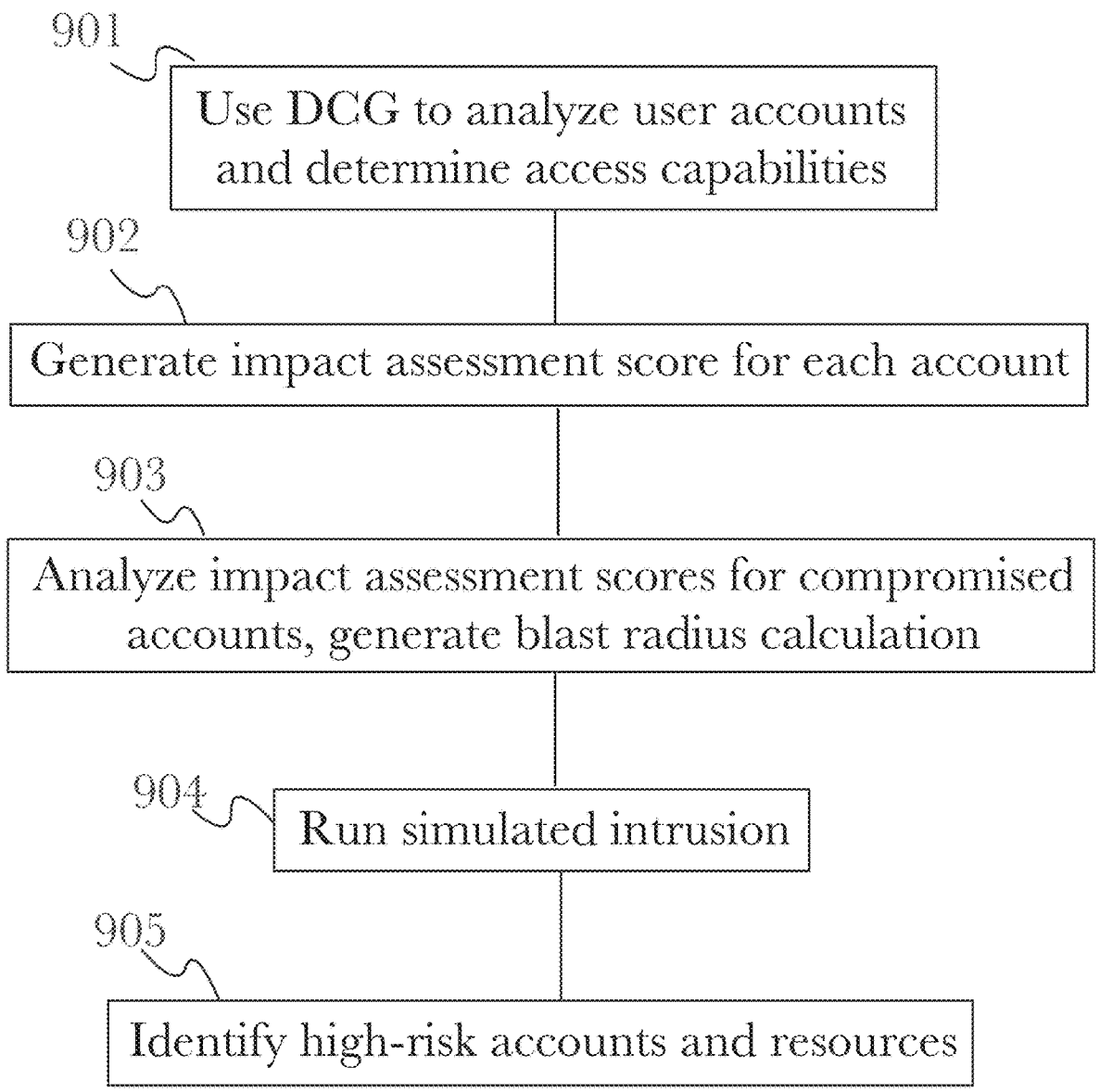
FIG. 9 is a flow diagram of an exemplary method for measuring the effects of cybersecurity attacks, according to one aspect.

FIG. 9 is a flow diagram of an exemplary method 900 for measuring the effects of cybersecurity attacks, according to one aspect. According to the aspect, impact assessment of an attack may be measured using a DCG 155 to analyze a user account and identify its access capabilities 901 (for example, what files, directories, devices or domains an account may have access to). This may then be used to generate 902 an impact assessment score for the account, representing the potential risk should that account be compromised. In the event of an incident, the impact assessment score for any compromised accounts may be used to produce a "blast radius" calculation 903, identifying exactly what resources are at risk as a result of the intrusion and where security personnel should focus their attention. To provide proactive security recommendations through a simulation module 125, simulated intrusions may be run 904 to identify potential blast radius calculations for a variety of attacks and to determine 905 high risk accounts or resources so that security may be improved in those key areas rather than focusing on reactive solutions.

Figure 10:
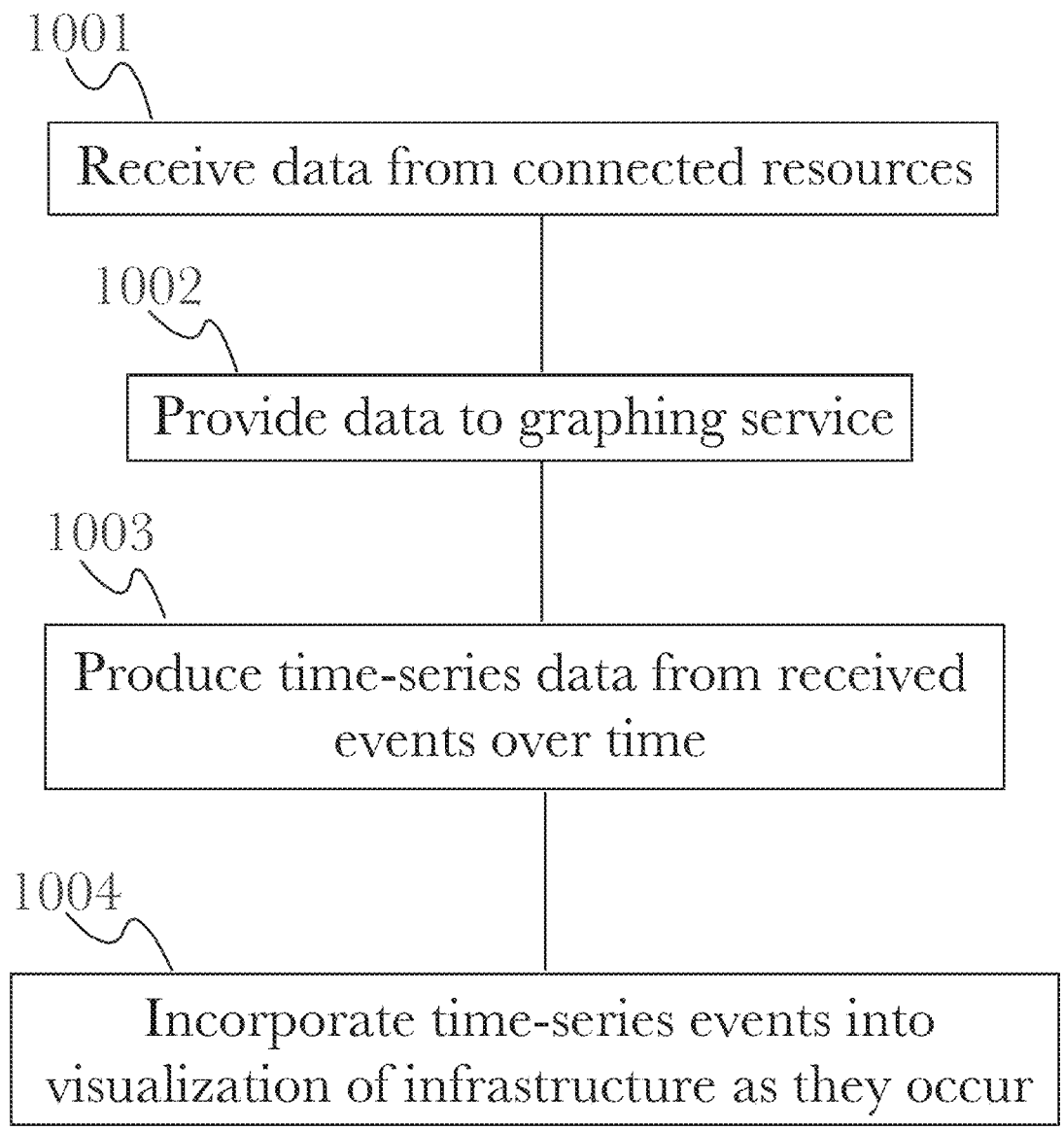
FIG. 10 is a flow diagram of an exemplary method for continuous cybersecurity monitoring and exploration, according to one aspect.

FIG. 10 is a flow diagram of an exemplary method 1000 for continuous cybersecurity monitoring and exploration, according to one aspect. According to the aspect, a state observation service 140 may receive data from a variety of connected systems 1001 such as (for example, including but not limited to) servers, domains, databases, or user directories. This information may be received continuously, passively collecting events and monitoring activity over time while feeding 1002 collected information into a graphing service 145 for use in producing time series graphs 1003 of states and changes over time. This collated time series data may then be used to produce a visualization 1004 of changes over time, quantifying collected data into a meaningful and understandable format. As new events are recorded, such as changing user roles or permissions, modifying servers or data structures, or other changes within a security infrastructure, these events are automatically incorporated into the time series data and visualizations are updated accordingly, providing live monitoring of a wealth of information in a way that highlights meaningful data without losing detail due to the quantity of data points under examination.

Figure 11:
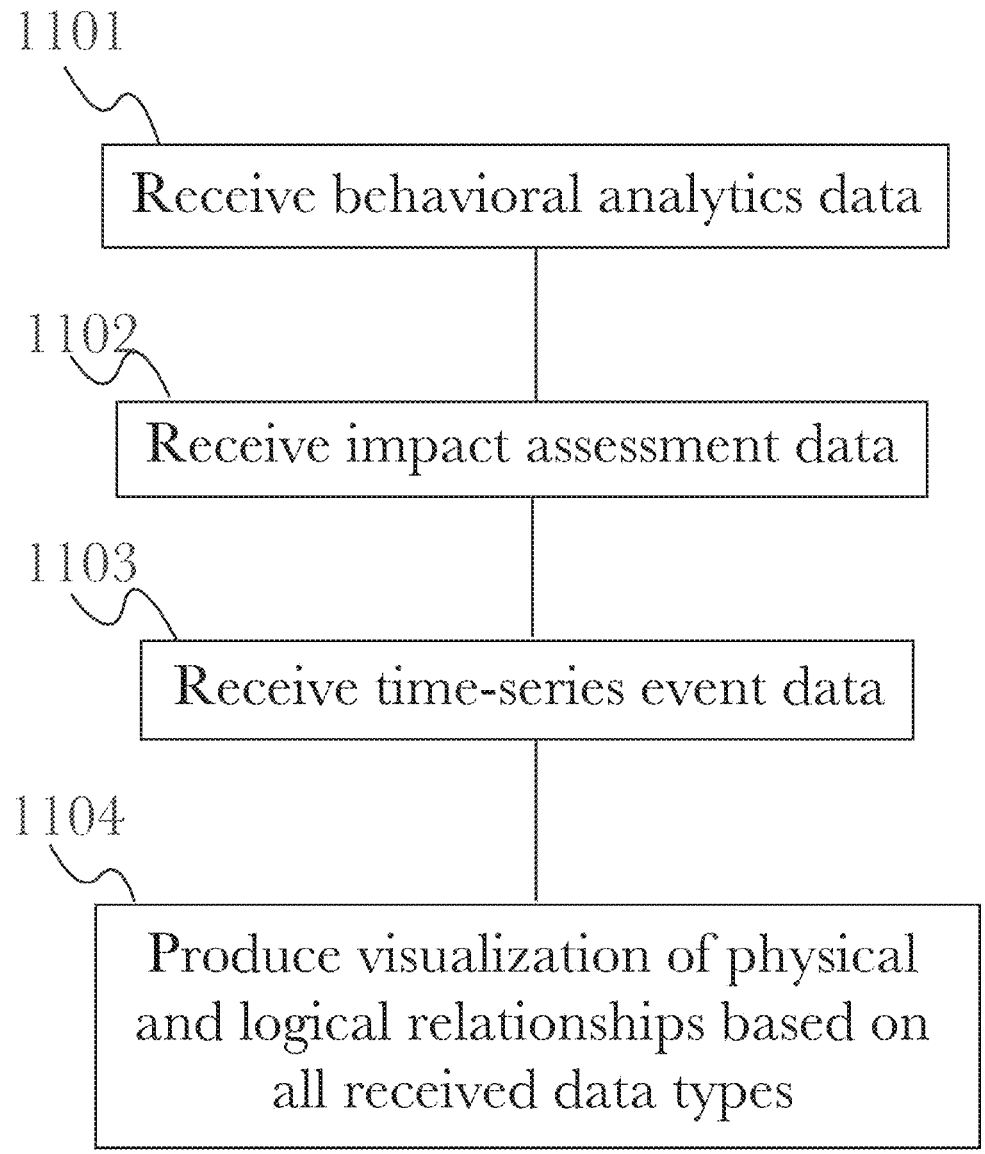
FIG. 11 is a flow diagram of an exemplary method for mapping a cyber-physical system graph, according to one aspect.

FIG. 11 is a flow diagram of an exemplary method 1100 for mapping a cyber-physical system graph (CPG), according to one aspect. According to the aspect, a cyber-physical system graph may comprise a visualization of hierarchies and relationships between devices and resources in a security infrastructure, contextualizing security information with physical device relationships that are easily understandable for security personnel and users. In an initial step 1101, behavior analytics information (as described previously, referring to FIG. 8) may be received at a graphing service 145 for inclusion in a CPG. In a next step 1102, impact assessment scores (as described previously, referring to FIG. 9) may be received and incorporated in the CPG information, adding risk assessment context to the behavior information. In a next step 1103, time series information (as described previously, referring to FIG. 10) may be received and incorporated, updating CPG information as changes occur and events are logged. This information may then be used to produce 1104 a graph visualization of users, servers, devices, and other resources correlating physical relationships (such as a user's personal computer or smartphone, or physical connections between servers) with logical relationships (such as access privileges or database connections), to produce a meaningful and contextualized visualization of a security infrastructure that reflects the current state of the internal relationships present in the infrastructure.

Figure 12:
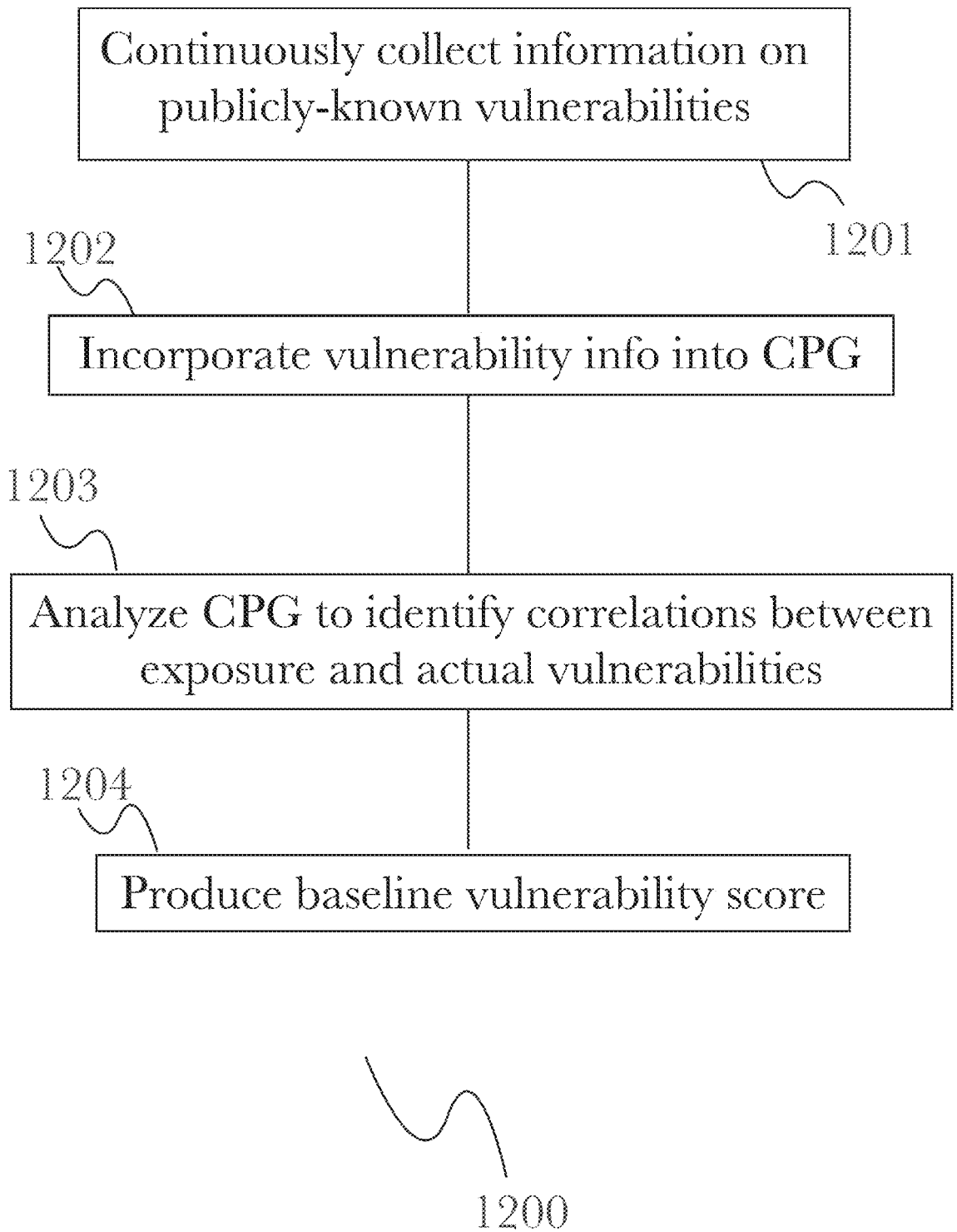
FIG. 12 is a flow diagram of an exemplary method for continuous network resilience rating, according to one aspect.

FIG. 12 is a flow diagram of an exemplary method 1200 for continuous network resilience rating, according to one aspect. According to the aspect, a baseline score can be used to measure an overall level of risk for a network infrastructure, and may be compiled by first collecting 1201 information on publicly-disclosed vulnerabilities, such as (for example) using the Internet or common vulnerabilities and exploits (CVE) process. This information may then 1202 be incorporated into a CPG as described previously in FIG. 11, and the combined data of the CPG and the known vulnerabilities may then be analyzed 1203 to identify the relationships between known vulnerabilities and risks exposed by components of the infrastructure. This produces a combined CPG 1204 that incorporates both the internal risk level of network resources, user accounts, and devices as well as the actual risk level based on the analysis of known vulnerabilities and security risks.

Figure 13:
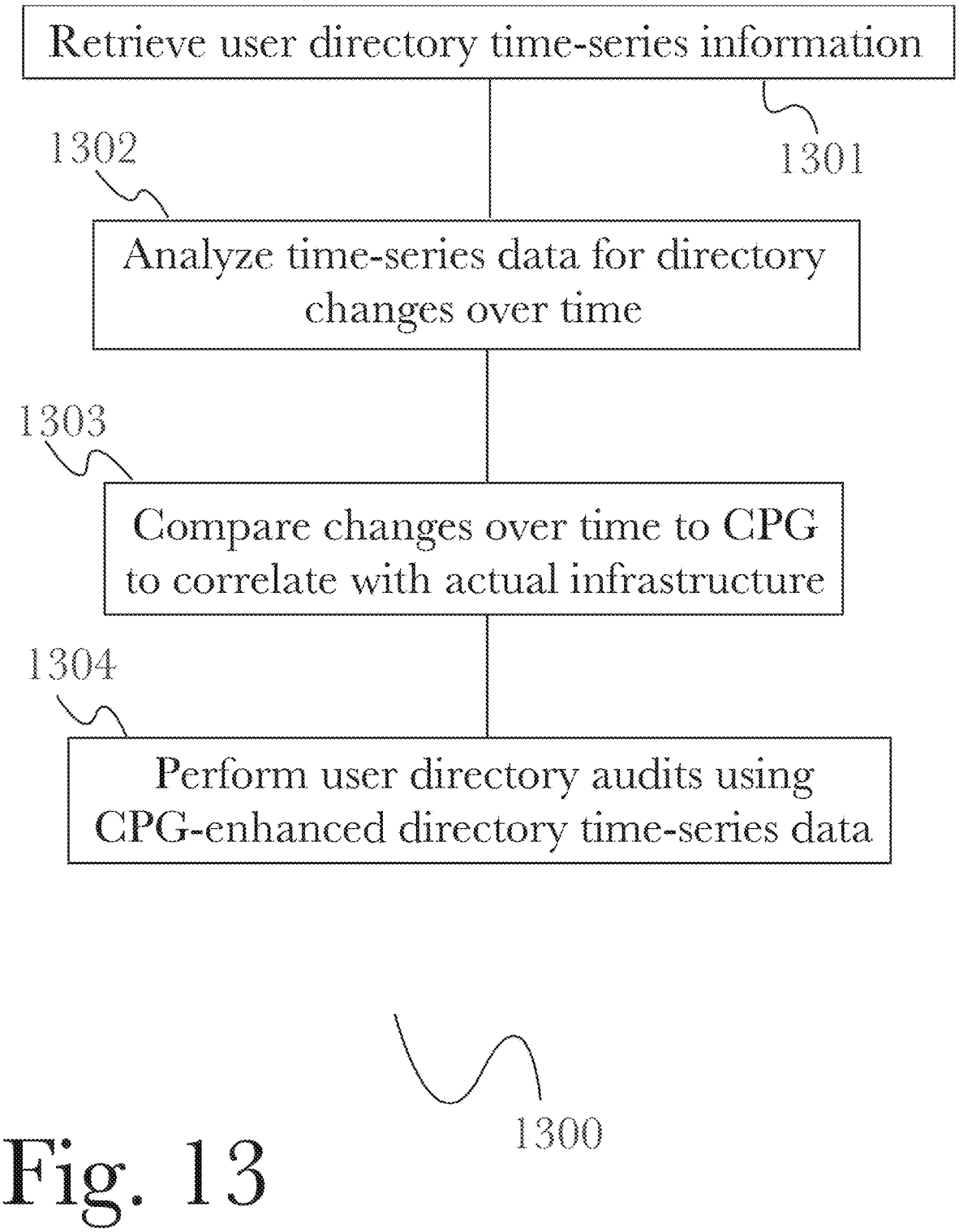
FIG. 13 is a flow diagram of an exemplary method for cybersecurity privilege oversight, according to one aspect.

FIG. 13 is a flow diagram of an exemplary method 1300 for cybersecurity privilege oversight, according to one aspect. According to the aspect, time series data (as described above, referring to FIG. 10) may be collected 1301 for user accounts, credentials, directories, and other user-based privilege and access information. This data may then 1302 be analyzed to identify changes over time that may affect security, such as modifying user access privileges or adding new users. The results of analysis may be checked 1303 against a CPG (as described previously in FIG. 11), to compare and correlate user directory changes with the actual infrastructure state. This comparison may be used to perform accurate and context-enhanced user directory audits 1304 that identify not only current user credentials and other user-specific information, but changes to this information over time and how the user information relates to the actual infrastructure (for example, credentials that grant access to devices and may therefore implicitly grant additional access due to device relationships that were not immediately apparent from the user directory alone).

Figure 14:
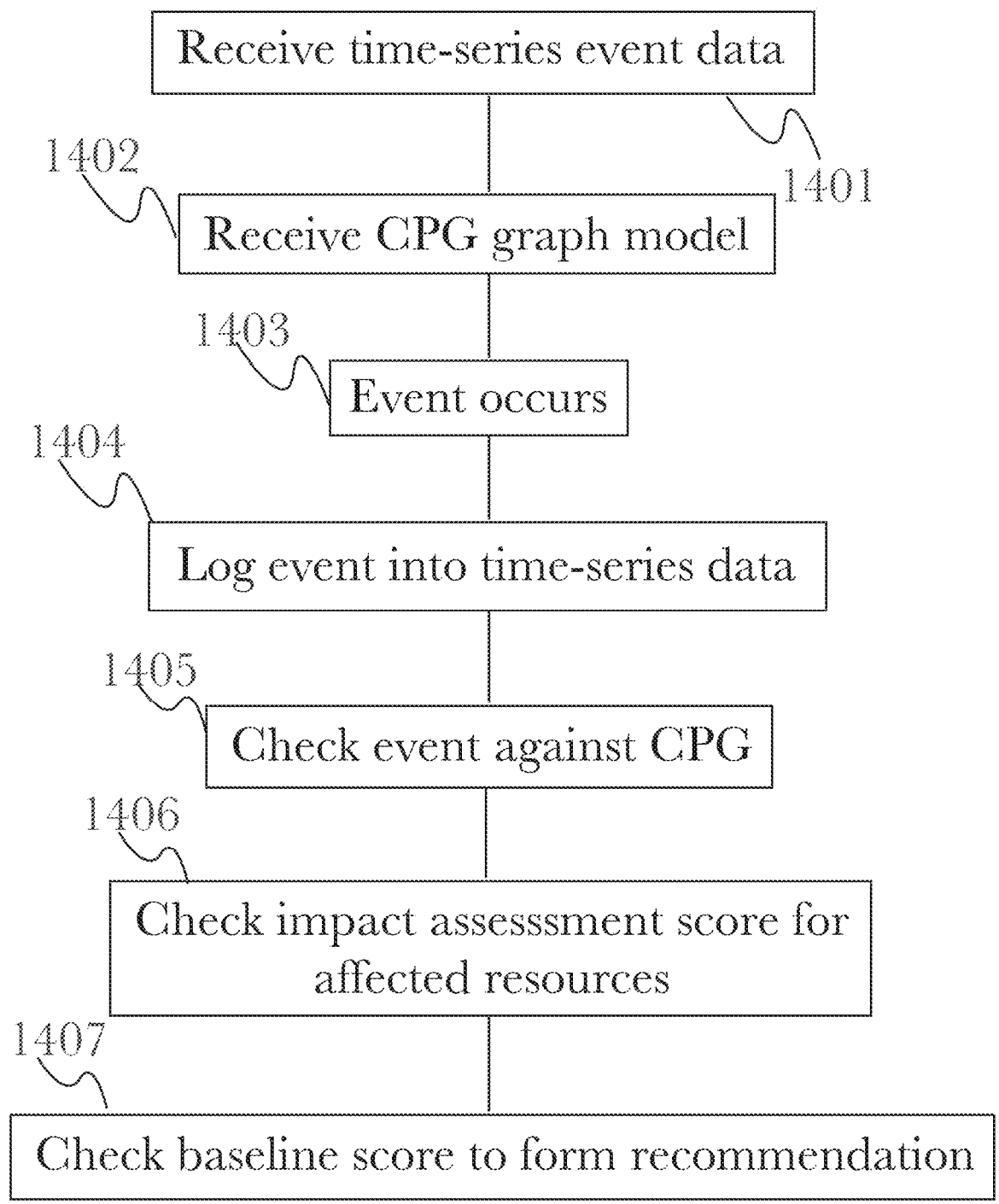
FIG. 14 is a flow diagram of an exemplary method for cybersecurity risk management, according to one aspect.

FIG. 14 is a flow diagram of an exemplary method 1400 for cybersecurity risk management, according to one aspect. According to the aspect, multiple methods described previously may be combined to provide live assessment of attacks as they occur, by first receiving 1401 time series data for an infrastructure (as described previously, in FIG. 10) to provide live monitoring of network events. This data is then enhanced 1402 with a CPG (as described above in FIG. 11) to correlate events with actual infrastructure elements, such as servers or accounts. When an event (for example, an attempted attack against a vulnerable system or resource) occurs 1403, the event is logged in the time series data 1404, and compared against the CPG 1405 to determine the impact. This is enhanced with the inclusion of impact assessment information 1406 for any affected resources, and the attack is then checked against a baseline score 1407 to determine the full extent of the impact of the attack and any necessary modifications to the infrastructure or policies.

Figure 15:
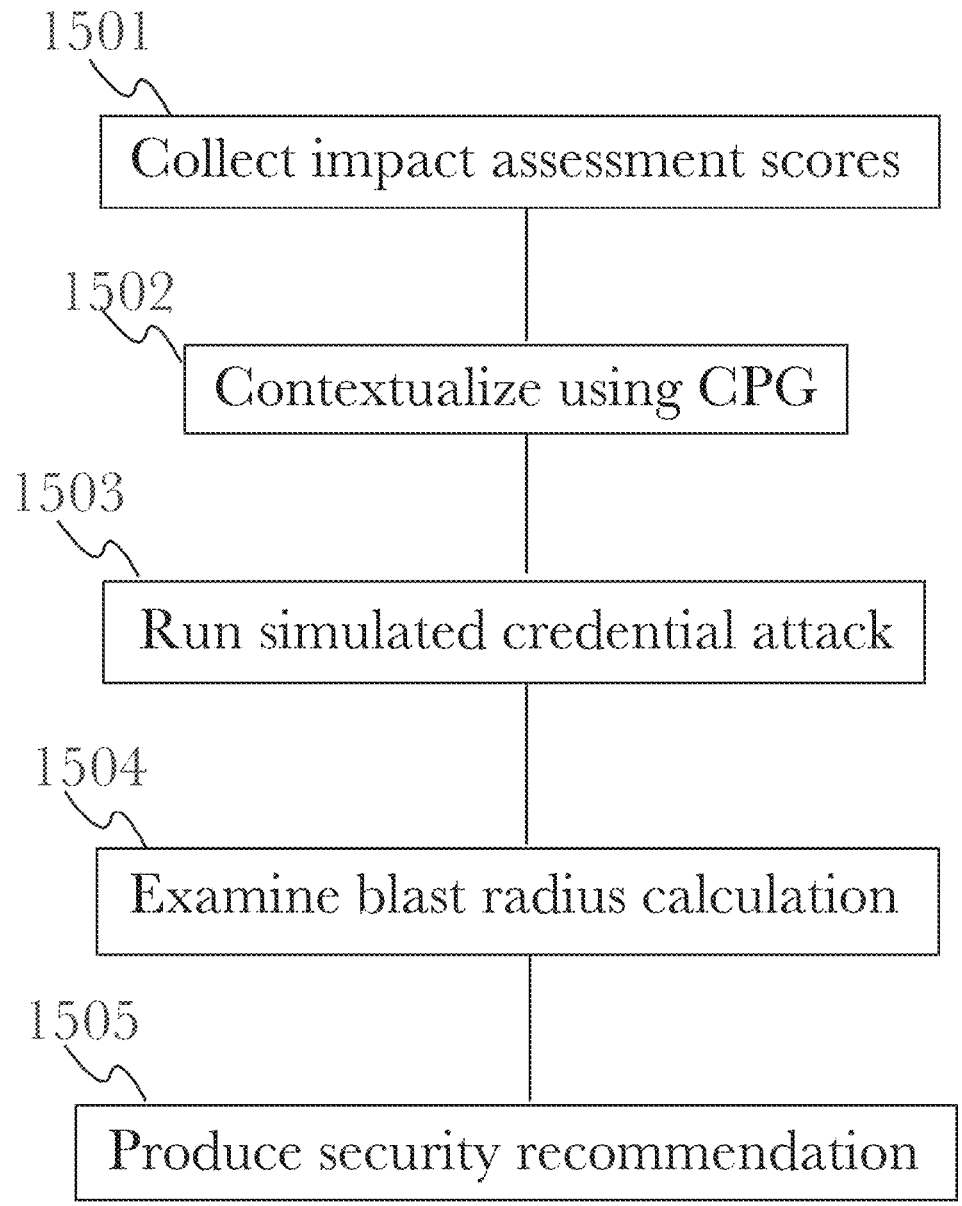
FIG. 15 is a flow diagram of an exemplary method for mitigating compromised credential threats, according to one aspect.

FIG. 15 is a flow diagram of an exemplary method 1500 for mitigating compromised credential threats, according to one aspect. According to the aspect, impact assessment scores (as described previously, referring to FIG. 9) may be collected 1501 for user accounts in a directory, so that the potential impact of any given credential attack is known in advance of an actual attack event. This information may be combined with a CPG 1502 as described previously in FIG. 11, to contextualize impact assessment scores within the infrastructure (for example, so that it may be predicted what systems or resources might be at risk for any given credential attack). A simulated attack may then be performed 1503 to use machine learning to improve security without waiting for actual attacks to trigger a reactive response. A blast radius assessment (as described above in FIG. 9) may be used in response 1504 to determine the effects of the simulated attack and identify points of weakness, and produce a recommendation report 1505 for improving and hardening the infrastructure against future attacks.

Figure 16:
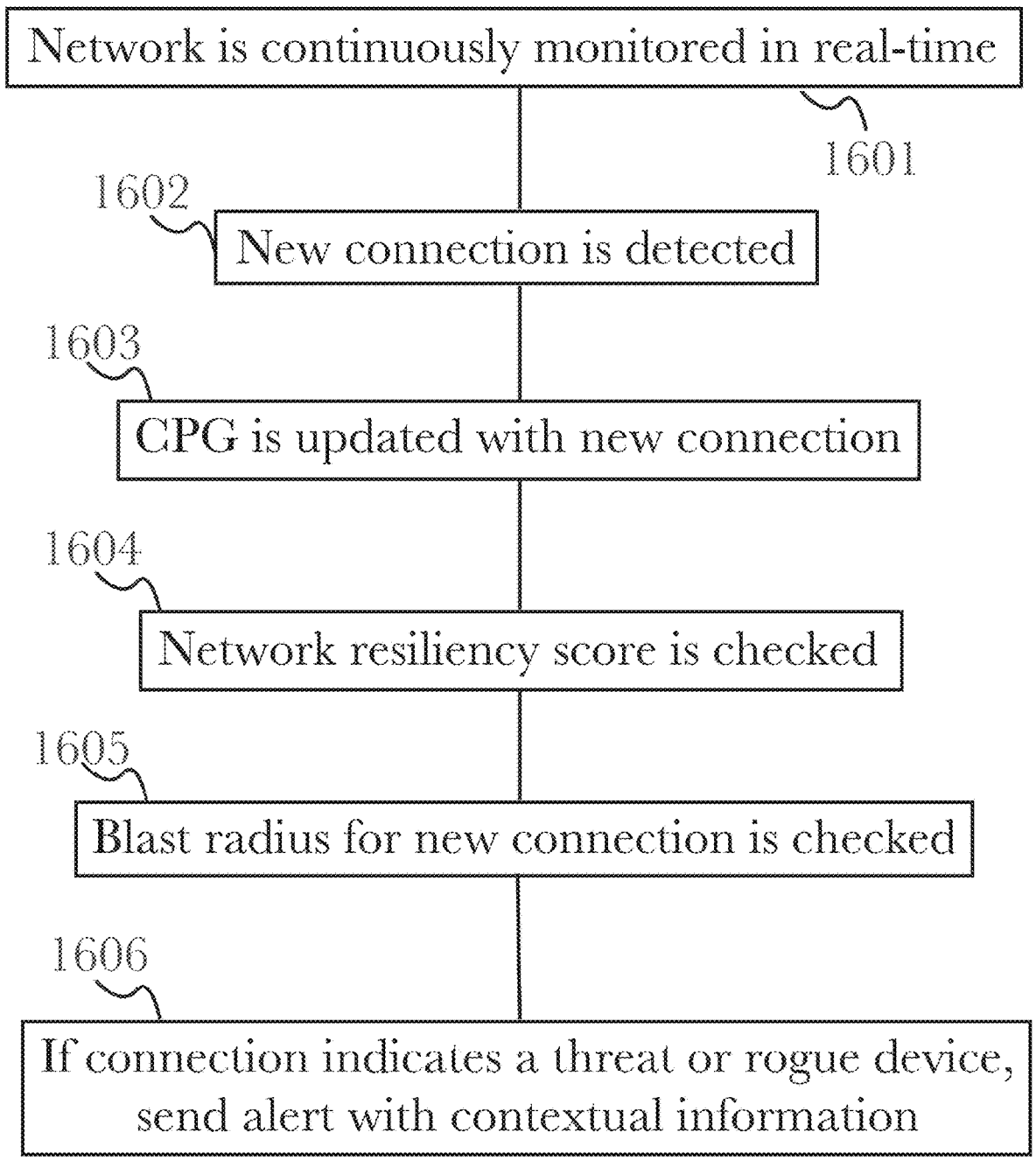
FIG. 16 is a flow diagram of an exemplary method for dynamic network and rogue device discovery, according to one aspect.

FIG. 16 is a flow diagram of an exemplary method 1600 for dynamic network and rogue device discovery, according to one aspect. According to the aspect, an advanced cyber decision platform may continuously monitor a network in real-time 1601, detecting any changes as they occur. When a new connection is detected 1602, a CPG may be updated 1603 with the new connection information, which may then be compared against the network's resiliency score 1604 to examine for potential risk. The blast radius metric for any other devices involved in the connection may also be checked 1605, to examine the context of the connection for risk potential (for example, an unknown connection to an internal data server with sensitive information may be considered a much higher risk than an unknown connection to an externally-facing web server). If the connection is a risk, an alert may be sent to an administrator 1606 with the contextual information for the connection to provide a concise notification of relevant details for quick handling.

Figure 17:
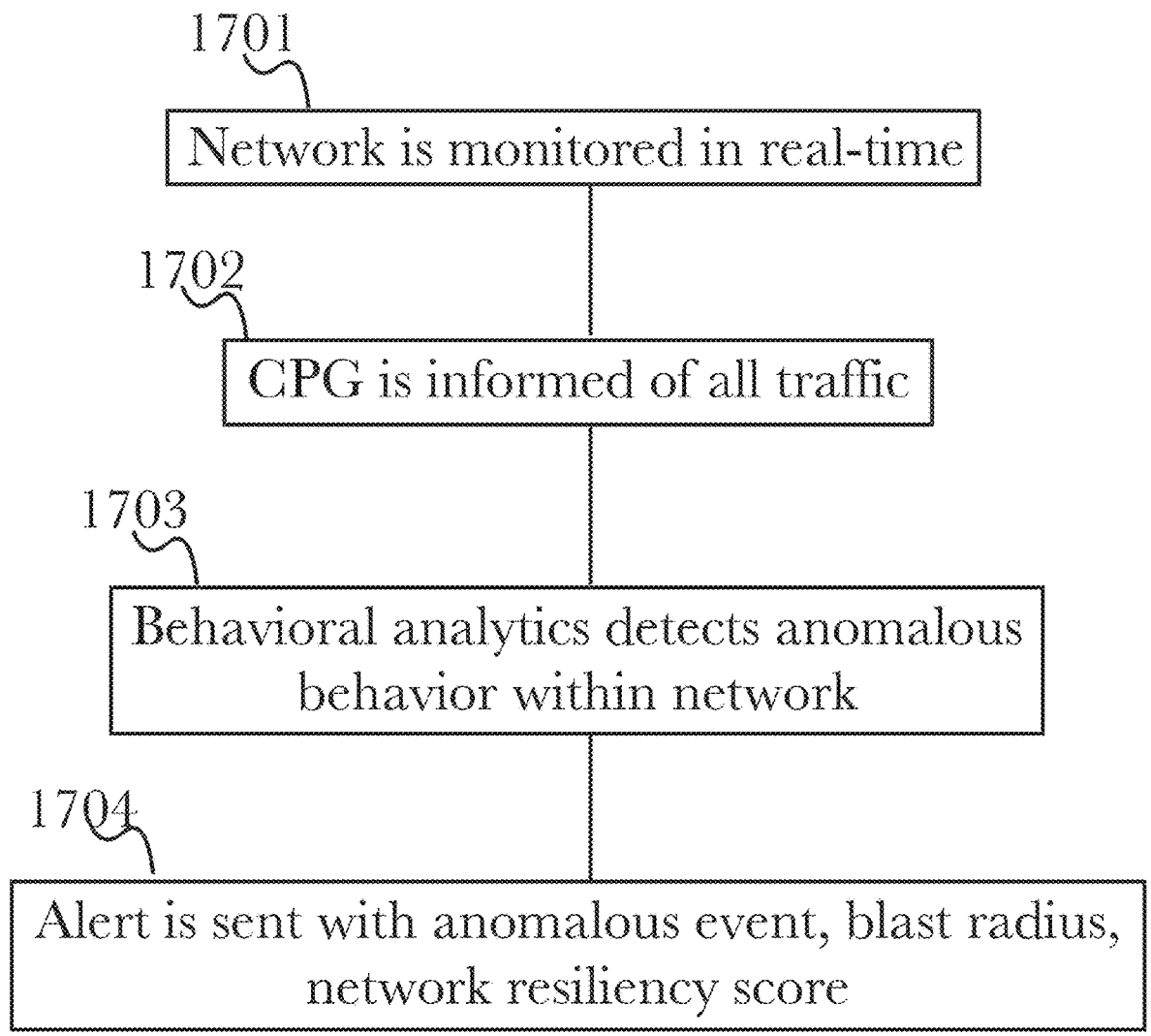
FIG. 17 is a flow diagram of an exemplary method for Kerberos "golden ticket" attack detection, according to one aspect.

FIG. 17 is a flow diagram of an exemplary method 1700 for Kerberos "golden ticket" attack detection, according to one aspect. Kerberos is a network authentication protocol employed across many enterprise networks to enable single sign-on and authentication for enterprise services. This makes it an attractive target for attacks, which can result in persistent, undetected access to services within a network in what is known as a "golden ticket" attack. To detect this form of attack, behavioral analytics may be employed to detect forged authentication tickets resulting from an attack. According to the aspect, an advanced cyber decision platform may continuously monitor a network 1701, informing a CPG in real-time of all traffic associated with entities in an organization, for example, people, places, devices, or services 1702. Machine learning algorithms detect behavioral anomalies as they occur in real-time 1703, notifying administrators with an assessment of the anomalous event 1704 as well as a blast radius score for the particular event and a network resiliency score to advise of the overall health of the network. By automatically detecting unusual behavior and informing an administrator of the anomaly along with contextual information for the event and network, a compromised ticket is immediately detected when a new authentication connection is made.

Figure 18:
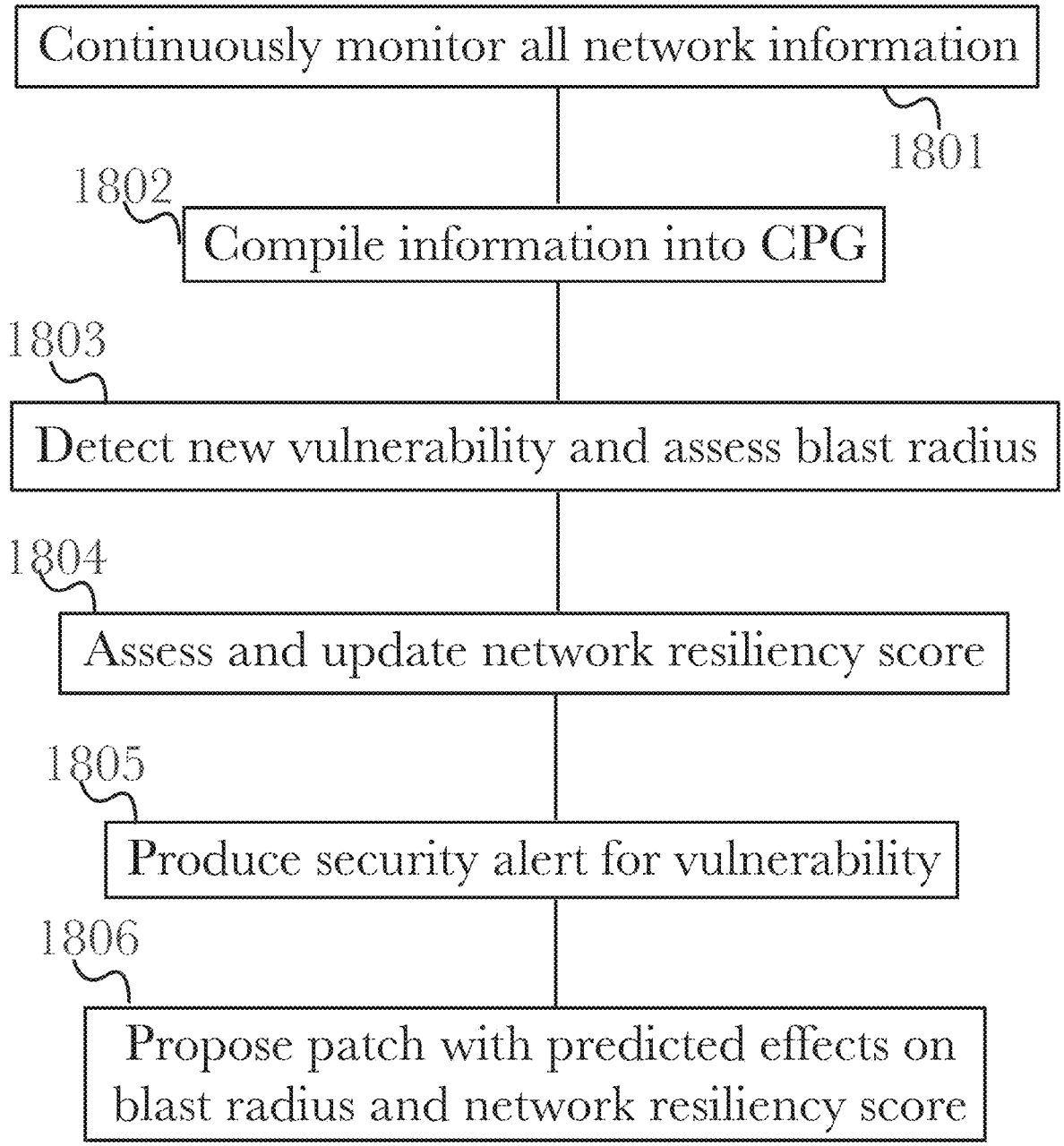
FIG. 18 is a flow diagram of an exemplary method for risk-based vulnerability and patch management, according to one aspect.

FIG. 18 is a flow diagram of an exemplary method 1800 for risk-based vulnerability and patch management, according to one aspect. According to the aspect, an advanced cyber decision platform may monitor all information about a network 1801, including (but not limited to) device telemetry data, log files, connections and network events, deployed software versions, or contextual user activity information. This information is incorporated into a CPG 1802 to maintain an up-to-date model of the network in real-time. When a new vulnerability is discovered, a blast radius score may be assessed 1803 and the network's resiliency score may be updated 1804 as needed. A security alert may then be produced 1805 to notify an administrator of the vulnerability and its impact, and a proposed patch may be presented 1806 along with the predicted effects of the patch on the vulnerability's blast radius and the overall network resiliency score. This determines both the total impact risk of any particular vulnerability, as well as the overall effect of each vulnerability on the network as a whole. This continuous network assessment may be used to collect information about new vulnerabilities and exploits to provide proactive solutions with clear result predictions, before attacks occur.

Figure 20:
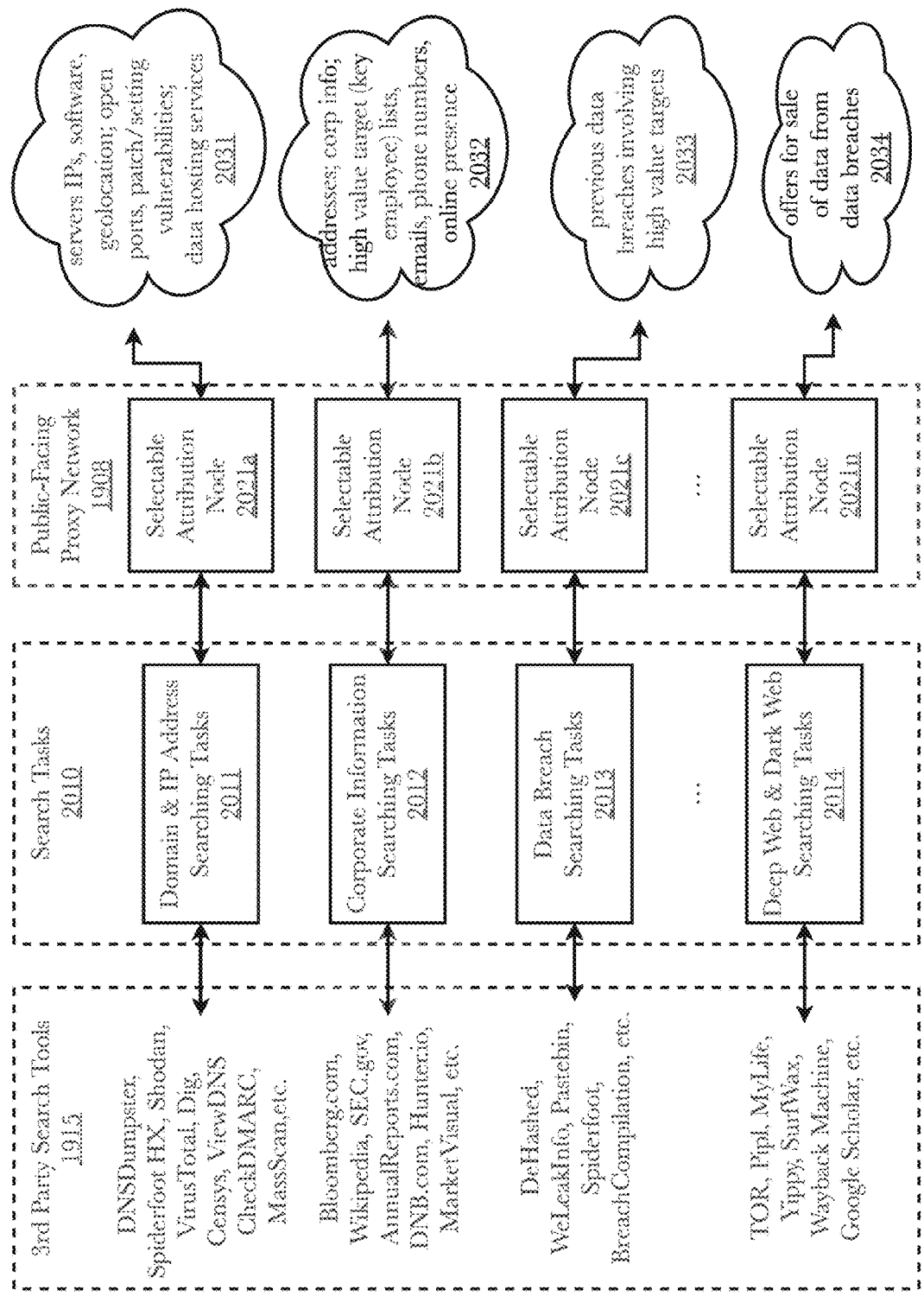
FIG. 20 is a relational diagram showing the relationships between exemplary $3^{rd}$ party search tools, search tasks that can be generated using such tools, and the types of information that may be gathered with those tasks.

FIG. 20 is a relational diagram showing the relationships between exemplary $3^{rd}$ party search tools 1915, search tasks 2010 that can be generated using such tools, and the types of information that may be gathered with those tasks 2011-2014, and how a public-facing proxy network 1908 may be used to influence the search task results. While the use of $3^{rd}$ party search tools 1915 is in no way required, and proprietary or other self-developed search tools may be used, there are numerous $3^{rd}$ party search tools 1915 available on the Internet, many of them available for use free of charge, that are convenient for purposes of performing external and internal reconnaissance of an organization's infrastructure. Because they are well-known, they are included here as examples of the types of search tools that may be used and the reconnaissance data that may be gathered using such tools. The search tasks 2010 that may be generated may be classified into several categories. While this category list is by no means exhaustive, several important categories of reconnaissance data are domain and internet protocol (IP) address searching tasks 2011, corporate information searching tasks 2012, data breach searching tasks 2013, and dark web searching tasks 2014. Third party search tools 1915 for domain and IP address searching tasks 2011 include, for example, DNSDumpster, Spiderfoot HX, Shodan, VirusTotal, Dig, Censys, ViewDNS, and CheckDMARC, among others. These tools may be used to obtain reconnaissance data about an organization's server IPs, software, geolocation; open ports, patch/setting vulnerabilities; data hosting services, among other data 2031. Third party search tools 1915 for corporate information searching tasks 2012 include, for example, Bloomberg.com, Wikipedia, SEC.gov, AnnualReports.com, DNB.com, Hunter.io, and MarketVisual, among others. These tools may be used to obtain reconnaissance data about an organization's addresses; corp info; high value target (key employee or key data assets) lists, emails, phone numbers, online presence 2032. Third party search tools 1915 for data breach searching tasks 2013 include, for example, DeHashed, WeLeakInfo, Pastebin, Spiderfoot, and BreachCompilation, among others. These tools may be used to obtain reconnaissance data about an organization's previous data breaches, especially those involving high value targets, and similar data loss information 2033. Third party search tools 1915 for deep web (reports, records, and other documents linked to in web pages, but not indexed in search results . . . estimated to be 90% of available web content) and dark web (websites accessible only through anonymizers such as TOR . . . estimated to be about 6% of available web content) searching tasks 2013 include, for example, Pipl, MyLife, Yippy, SurfWax, Wayback machine, Google Scholar, DuckDuckGo, Fazzle, Not Evil, and Start Page, among others. These tools may be used to obtain reconnaissance data about an organization's lost and stolen data such as customer credit card numbers, stolen subscription credentials, hacked accounts, software tools designed for certain exploits, which organizations are being targeted for certain attacks, and similar information 2034. A public-facing proxy network 1908 may be used to change the outward presentation of the organization's network by conducting the searches through selectable attribution nodes 2021a-n, which are configurable to present the network to the Internet in different ways such as, but not limited to, presenting the organization network as a commercial IP address, a residential IP address, or as an IP address from a particular country, all of which may influence the reconnaissance data received using certain search tools.

Figure 21:
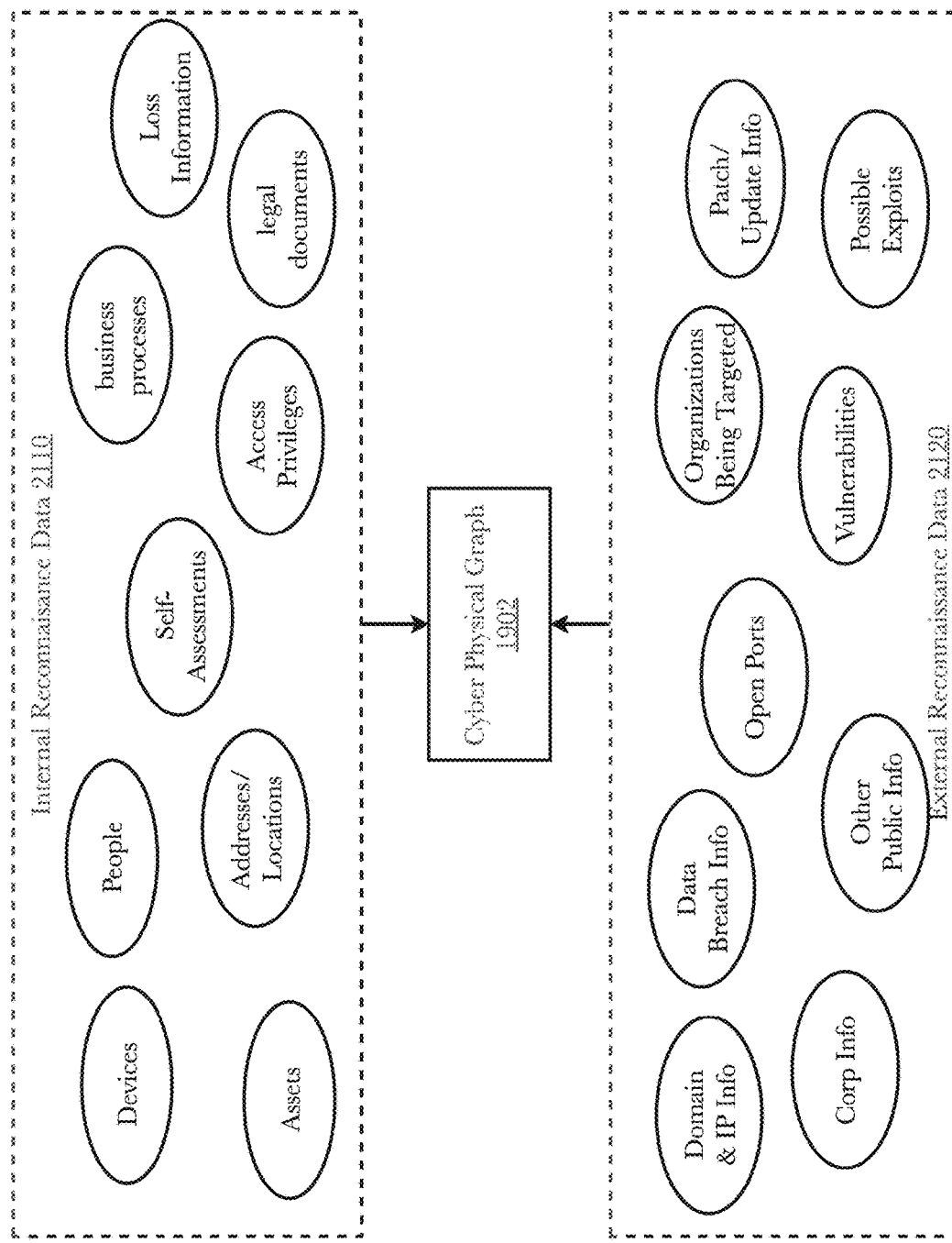
FIG. 21 is a relational diagram showing the exemplary types and classifications of information that may be used in constructing a cyber-physical graph of an organization's infrastructure and operations.

FIG. 21 is a relational diagram showing the exemplary types and classifications of information that may be used in constructing a cyber-physical graph 1902 of an organization's infrastructure and operations. The cyber-physical graph 1902 is a directed graph that represents a comprehensive picture of an organization's infrastructure and operations. A cyber-physical graph 1902 represents the relationships between entities associated with an organization, for example, devices, users, resources, groups, and computing services, the relationships between the entities defining relationships and processes in an organization's infrastructure, thereby contextualizing security information with physical and logical relationships that represent the flow of data and access to data within the organization including, in particular, network security protocols and procedures. Data that may be incorporated into a cyber-physical graph may be any data relating to an organization's infrastructure and operations, and two primary categories of data that may be incorporated are internal reconnaissance data 2110 and external reconnaissance data 2120. Non-limiting examples of internal reconnaissance data 2110 include computers and devices, physical and intangible (data) assets, people (employees, contractors, etc.), addresses and locations of buildings, servers, etc., business processes, access privileges, loss information, legal documents, and self-assessments of cybersecurity. Non-limiting examples of external reconnaissance data 2120 include domains and IP information, data breach information, organization information such as corporate structures, key employees, etc., open port information, information regarding which organizations are current targets of cyber-attacks, network vulnerability information, system version and patch/update information, known and possible exploits, and publicly available information.

In an initial step 1101, behavior analytics information (as described previously, referring to FIG. 8) may be received at a graphing service 145 for inclusion in a CPG. In a next step 1102, impact assessment scores (as described previously, referring to FIG. 9) may be received and incorporated in the CPG information, adding risk assessment context to the behavior information. In a next step 1103, time series information (as described previously, referring to FIG. 10) may be received and incorporated, updating CPG information as changes occur and events are logged. This information may then be used to produce 1104 a graph visualization of users, servers, devices, and other resources correlating physical relationships (such as a user's personal computer or smartphone, or physical connections between servers) with logical relationships (such as access privileges or database connections), to produce a meaningful and contextualized visualization of a security infrastructure that reflects the current state of the internal relationships present in the infrastructure.

Figure 22:
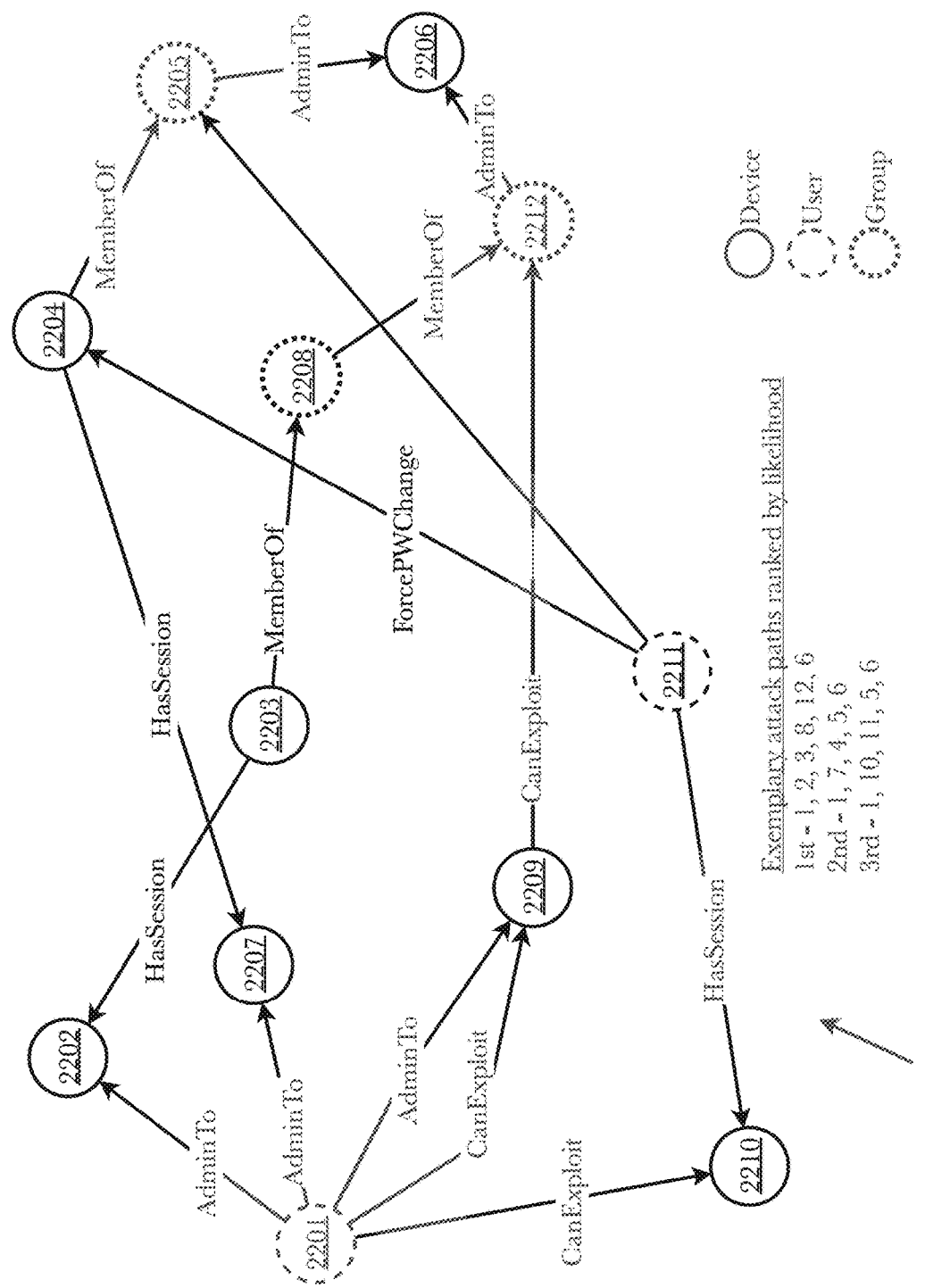
FIG. 22 is a directed graph diagram showing an exemplary cyber-physical graph and its possible use in analyzing cybersecurity threats.

FIG. 22 is a directed graph diagram showing an exemplary cyber-physical graph 2200 and its possible use in creating cybersecurity profiles and ratings. A cyber-physical graph 1902 represents the relationships between entities associated with an organization, for example, devices, users, resources, groups, and computing services, the relationships between the entities defining relationships and processes in an organization's infrastructure, thereby contextualizing security information with physical and logical relationships that represent the flow of data and access to data within the organization including, in particular, network security protocols and procedures. A cyber-physical graph, in its most basic form, represents the network devices comprising an organization's network infrastructure as nodes (also called vertices) in the graph and the physical or logical connections between them as edges between the nodes. The cyber-physical graph may be expanded to include network information and processes such as data flow, security protocols and procedures, and software versions and patch information. Further, human users and their access privileges to devices and assets may be included. A cyber-security graph may be further expanded to include internal process information such as business processes, loss information, and legal requirements and documents; external information such as domain and IP information, data breach information; and generated information such as open port information from external network scans, and vulnerabilities and avenues of attack. Thus, a cyber-physical graph may be used to represent a complete picture of an organization's infrastructure and operations.

In this example, which is necessarily simplified for clarity, the cyber-physical graph 2200 contains 12 nodes (vertices) comprising: seven computers and devices designated by solid circles 2202, 2203, 2204, 2206, 2207, 2209, 2210, two users designated by dashed-line circles 2201, 2211, and three functional groups designated by dotted-line circles 2205, 2208, and 2212. The edges (lines) between the nodes indicate relationships between the nodes, and have a direction and relationship indicator such as "AdminTo," "MemberOf," etc. While not shown here, the edges may also be assigned numerical weights or probabilities, indicating, for example, the likelihood of a successful attack gaining access from one node to another. Possible attack paths may be analyzed using the cyber-physical graph by running graph analysis algorithms such as shortest path algorithms, minimum cost/maximum flow algorithms, strongly connected node algorithms, etc. In this example, several exemplary attack paths are ranked by likelihood. In the most likely attack path, user 2201 is an administrator to device 2202 to which device 2203 has connected. Device 2203 is a member of functional group 2208, which has a member of group 2212. Functional group 2212 is an administrator to the target 2206. In a second most likely attack path, user 2201 is an administrator to device 2207 to which device 2204 has connected. Device 2204 is a member of functional group 2205, which is an administrator to the target device 2206. In a third most likely attack path, a flaw in the security protocols allow the credentials of user 2201 to be used to gain access to device 2210. User 2211 who is working on device 2210 may be tricked into providing access to functional group 2205, which is an administrator to the target device 2206.

Figure 23:
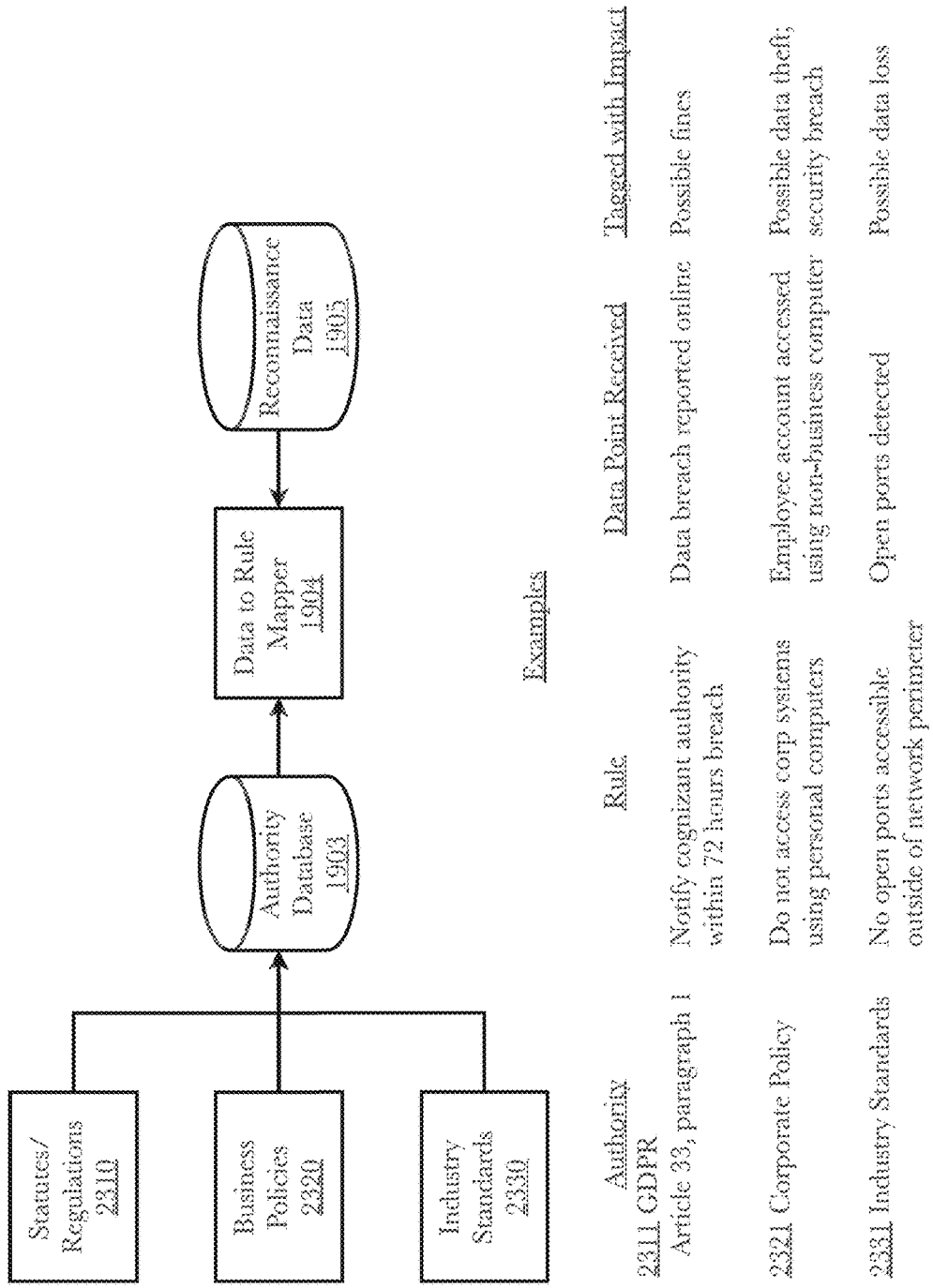
FIG. 23 is a block diagram showing exemplary operation of a data to rule mapper.

FIG. 23 is a block diagram showing exemplary operation of a data to rule mapper. Laws, policies, standards, and other rules are gathered and stored in an authority database 1903. Non-limiting examples of such rules include federal, state, and local statutes, regulations, case law interpretations, and other laws 2310, business policies and procedures 2320, and industry standards (as one example, cybersecurity industry standards for network security) 2330. Reconnaissance data are stored in a database 1905. A data to rule mapper 1904 retrieves the reconnaissance data 1905 and matches it to rules from the authority database 1903. An example of this operation for statues/regulations 2310 is shown in 2311, where Article 33, paragraph 1 of the European Union's General Data Protection Regulation (GDPR) requires that an organization notify a cognizant authority of a data breach within 72 hours of knowledge of the breach. If a data point indicates that a data breach has been discovered because data of the organization is found online, the data point is associated with that rule, and tagged with the possible impact of fines if the rule is not followed. An example of this operation for business policies 2320 is shown in 2321, where a corporate policy prohibits access of the organization's systems using personal computers. If a data point indicates that an employee account is accessed using a non-business-owned computer, the data point is associated with the rule, and tagged with possible data theft and/or security breach. An example of this operation for industry standards 2330 is shown in 2331, where an industry standard prohibits open ports accessible from outside the network perimeter. If a data point indicates an open port, the data point is associated with the rule, and tagged with possible data loss and/or security breach.

Figure 27:
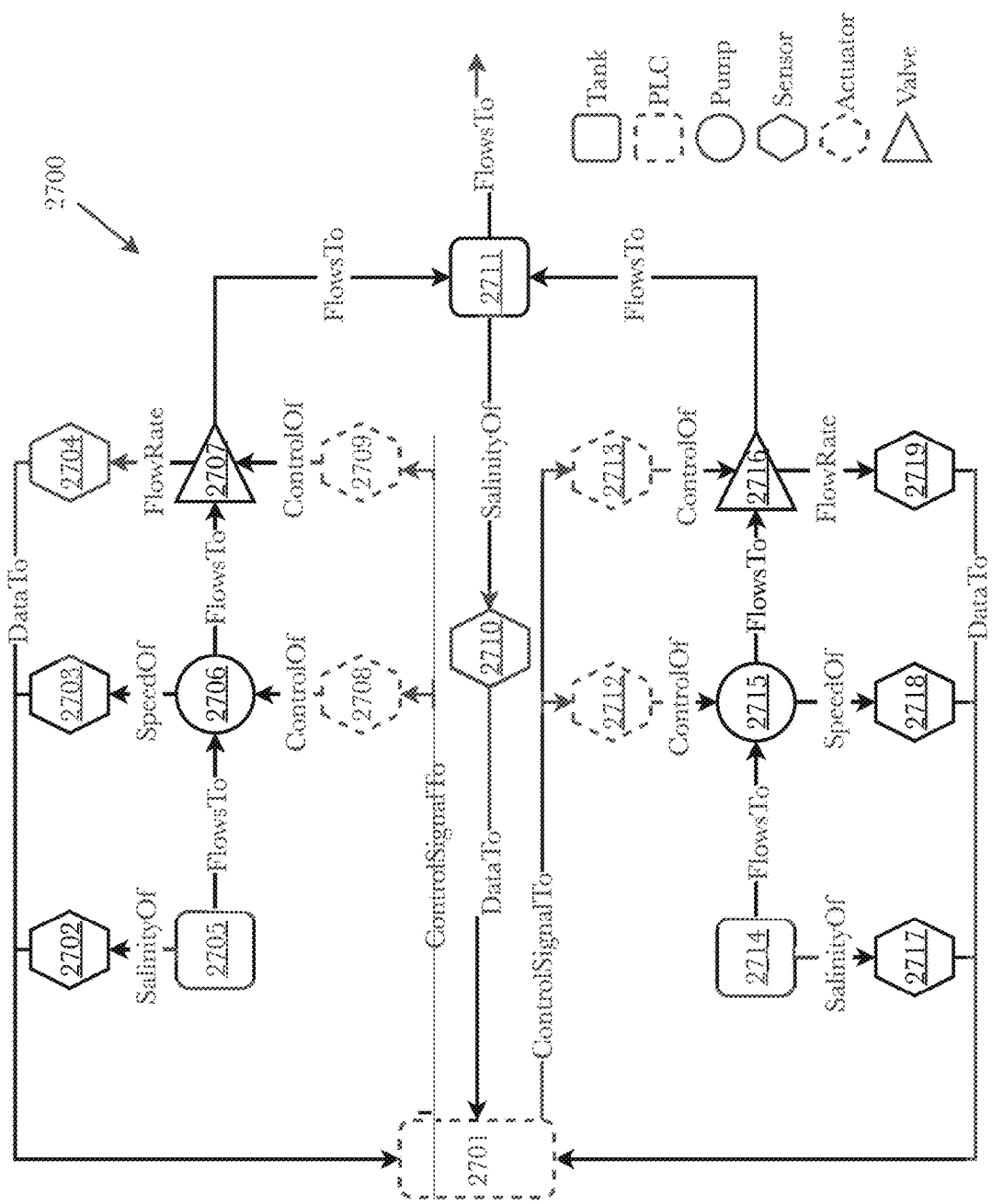
FIG. 27 is a directed graph diagram showing an example of the use of a cyber-physical graph to model a simple salinity adjustment process control system.
Figure 28:
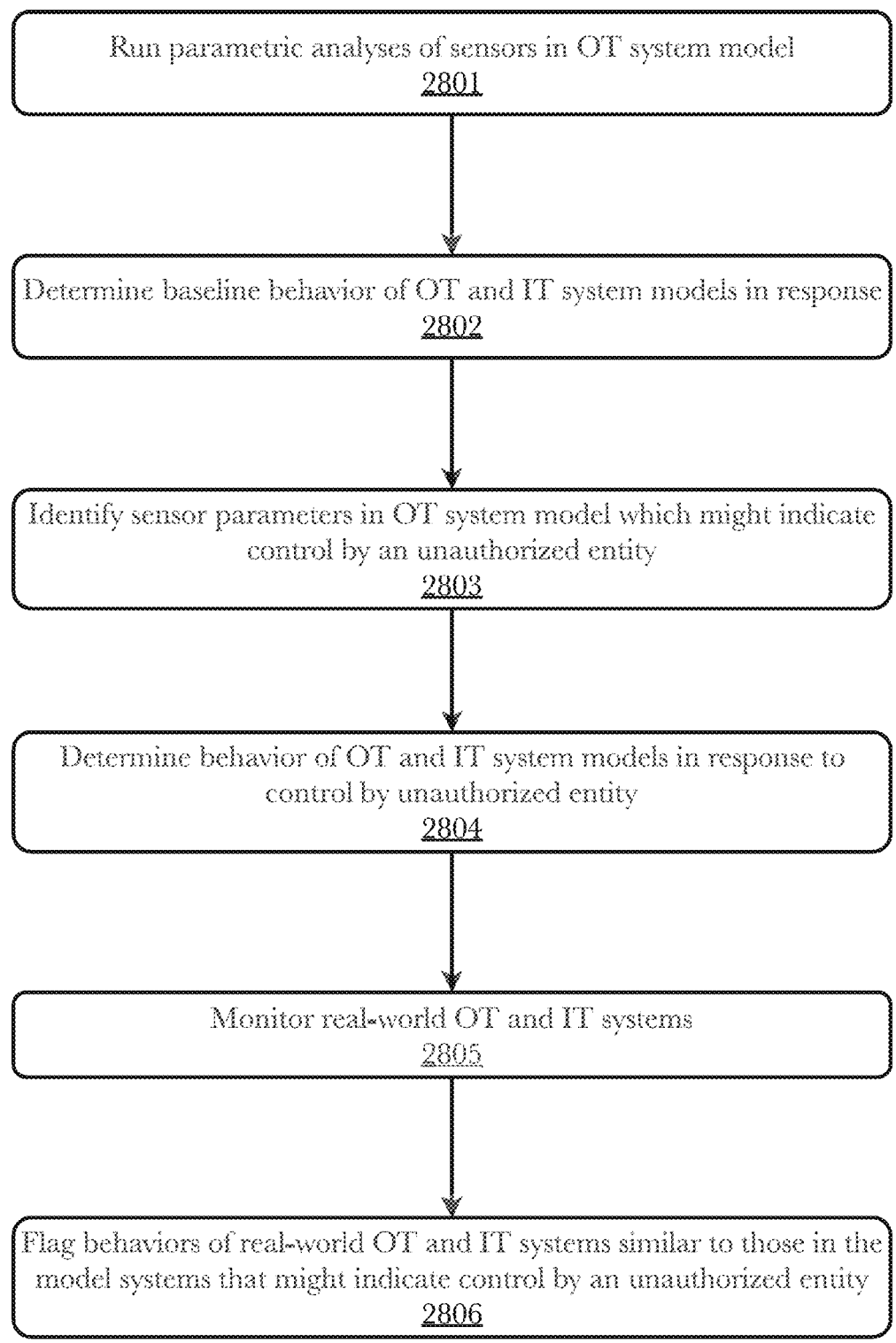
FIG. 28 is a method diagram showing how parametric analysis of integrated operational technology and information technology systems may be employed to detect cybersecurity threats.

FIG. 27 is a directed graph diagram showing an example of the use of a cyber-physical graph to model a simple salinity adjustment process control system 2700. This example is a simple example for clarity and understandability, and does not limit the types of systems that may be modeled using this methodology. In this cyber-physical graph, nodes (aka vertices) represent entities (in this case components and devices) and the edges between the nodes represent logical relationships between the nodes. In this case, the system is controlled by a programmable logic controller (PLC) 2701. The upper half of the graph represents the flow of a source fluid, and the lower half of the graph represents the flow of a concentrated saline solution used to ensure that the salinity of the outflow from the system is meets or exceeds a threshold salinity. The source fluid is contained in a tank 2705. The salinity of the source fluid is monitored by a sensor 2702, which reports the salinity data to the PLC 2701. The source fluid flows to a pump 2706, the motor of which is controlled by a motor controller 2708 using signals from the PLC 2701 based on pump speed data sent from a pump speed sensor 2703. The pump pushes the source fluid at a constant pressure to a valve 2707, which is controlled by an actuator 2709 using signals from the PLC 2701 based on flow rate data sent by a flow sensor 2704. The source fluid flows from the valve 2707 to a mixing tank 2711, the salinity of which is measured by a sensor 2710 and the salinity data for which is sent to the PLC 2710. Similarly, in the lower half of the graph, the saline solution fluid is contained in a tank 2714. The salinity of the saline solution fluid is monitored by a sensor 2717, which reports the salinity data to the PLC 2701. The saline solution fluid flows to a pump 2715, the motor of which is controlled by a motor controller 2712 using signals from the PLC 2701 based on pump speed data sent from a pump speed sensor 2718. The pump pushes the saline solution fluid at a constant pressure to a valve 2716, which is controlled by an actuator 2713 using signals from the PLC 2701 based on flow rate data sent by a flow sensor 2719. The saline solution fluid flows from the valve 2716 to a mixing tank 2711, the salinity of which is measured by a sensor 2710 and the salinity data for which is sent to the PLC 2710. Based on the salinity and flow rates of the fluids, the salinity of the outflow from the mixing tank 2711 can be guaranteed to meet or exceed a certain threshold. While not shown in this diagram, it is possible to incorporate time series data into a cyber-physical graph of an operational technology system to create a hybrid time series/graph model using the methods shown and described in FIG. 29, wherein data are captured using individual time series swimlanes that are optionally referenced by nodes and edges in the graph to capture the additional state information of the system. For example, nodes in the graph may reference the particular sensor readings on devices represented by the nodes, and edges between the nodes may reference the actual commands between devices, such as commands from the PLC 2701 to the motor controller 2708, and may further store this additional state information as a time series (i.e., a history of readings and commands sent over time). FIG. 28 is a method diagram showing how parametric analysis of integrated operational technology and information technology systems may be employed to detect cybersecurity threats. In a first step, parametric analyses are run of sensors in the OT system model 2801. A baseline behavior of both the OT and IT system models is determined in response to the parametric analyses 2802. Sensor parameters which might indicate control by an unauthorized entity are identified 2803, and the behavior of the OT and IT systems at those parameter points are determined 2804. The real-world OT and IT systems on which the models are based are monitored 2805, and if behaviors similar to those from the models are discovered, such behaviors are flagged as possibly indicating control by an unauthorized entity 2806.

Figure 29:
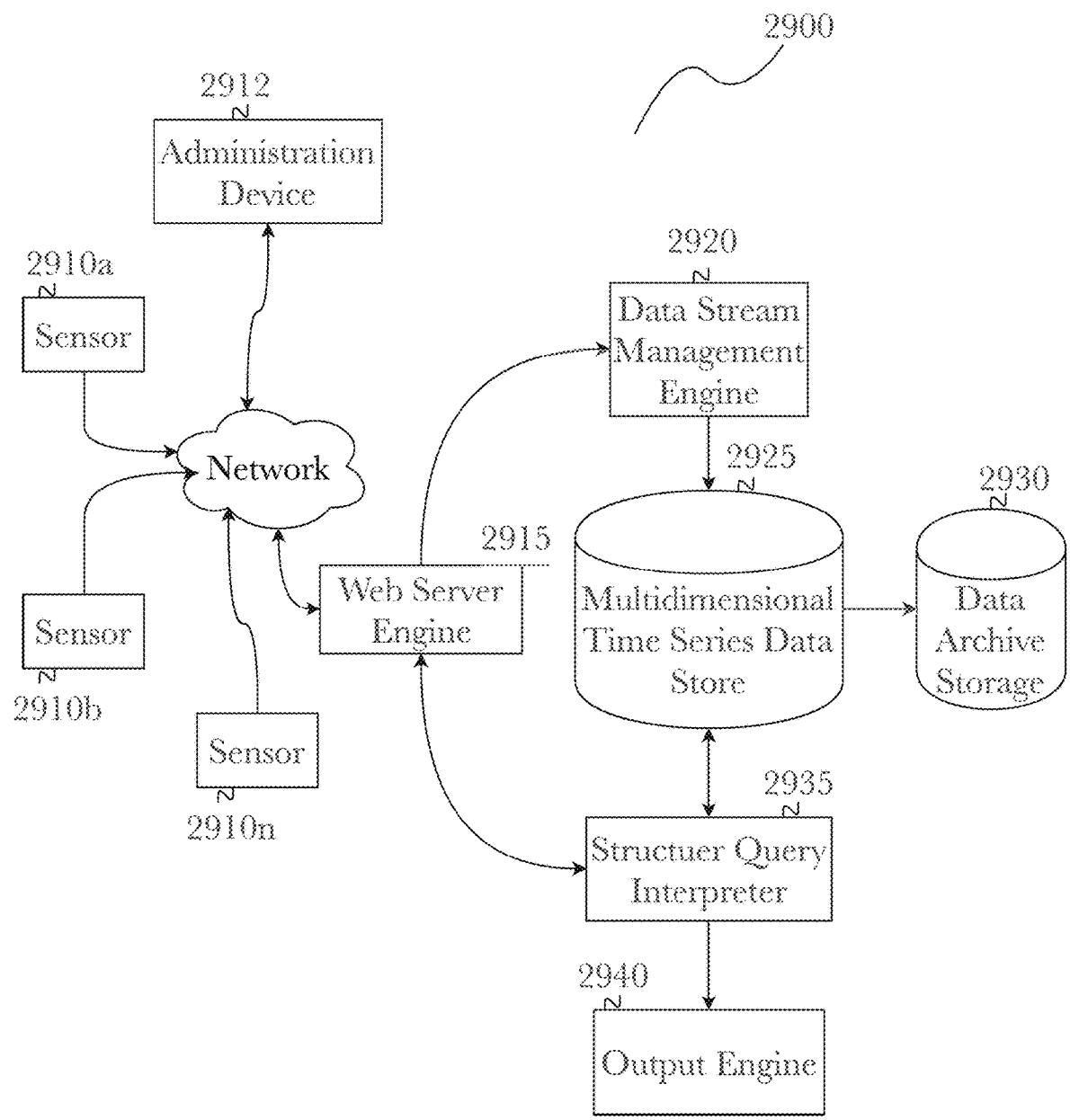
FIG. 29 is a diagram of an exemplary architecture of a system for the capture and storage of time series data from sensors with heterogeneous reporting profiles according to an embodiment of the invention.

FIG. 29 is a diagram of an exemplary architecture of a system for the capture and storage of time series data from sensors with heterogeneous reporting profiles according to an embodiment of the invention 2900. In this embodiment, a plurality of sensor devices 2910*a-n* stream data to a collection device, in this case a web server acting as a network gateway 2915. These sensors 2910*a-n* can be of several forms, some non-exhaustive examples being: physical sensors measuring humidity, pressure, temperature, orientation, and presence of a gas; or virtual such as programming measuring a level of network traffic, memory usage in a controller, and number of times the word "refill" is used in a stream of email messages on a particular network segment, to name a small few of the many diverse forms known to the art. In the embodiment, the sensor data is passed without transformation to the data management engine 2920, where it is aggregated and organized for storage in a specific type of data store 2925 designed to handle the multidimensional time series data resultant from sensor data. Raw sensor data can exhibit highly different delivery characteristics. Some sensor sets may deliver low to moderate volumes of data continuously. It would be infeasible to attempt to store the data in this continuous fashion to a data store, as attempting to assign identifying keys to store real time data from large volumes of continuously-streaming data from multiple sensors would invariably lead to significant data loss. In this circumstance, the data stream management engine 2920 would hold incoming data in memory, keeping only the parameters, or "dimensions" from within the larger sensor stream that are pre-decided by the administrator of the study as important and instructions to store them transmitted from the administration device 2912. The data stream management engine 2920 would then aggregate the data from multiple individual sensors and apportion that data at a predetermined interval, for example, every 10 seconds, using the timestamp as the key when storing the data to a multidimensional time series data store over a single swimlane of sufficient size. This highly ordered delivery of a foreseeable amount of data per unit time is particularly amenable to data capture and storage but patterns where delivery of data from sensors occurs irregularly and the amount of data is extremely heterogeneous are quite prevalent. In these situations, the data stream management engine cannot successfully use strictly single time interval over a single swimlane mode of data storage. In addition to the single time interval method the invention also can make use of event based storage triggers where a predetermined number of data receipt events, as set at the administration device 2912, triggers transfer of a data block consisting of the apportioned number of events as one dimension and a number of sensor ids as the other. In the embodiment, the system time at commitment or a time stamp that is part of the sensor data received is used as the key for the data block value of the value-key pair. The invention can also accept a raw data stream with commitment occurring when the accumulated stream data reaches a predesigned size set at the administration device 2912.

It is also likely that that during times of heavy reporting from a moderate to large array of sensors, the instantaneous load of data to be committed will exceed what can be reliably transferred over a single swimlane. The embodiment of the invention can, if capture parameters pre-set at the administration device 2912, combine the data movement capacity of two or more swimlanes, the combined bandwidth dubbed a metaswimlane, transparently to the committing process, to accommodate the influx of data in need of commitment. All sensor data, regardless of delivery circumstances are stored in a multidimensional time series data store 2925 which is designed for very low overhead and rapid data storage and minimal maintenance needs to sap resources. The embodiment uses a key-value pair data store examples of which are Riak, Redis and Berkeley DB for their low overhead and speed, although the invention is not specifically tied to a single data store type to the exclusion of others known in the art should another data store with better response and feature characteristics emerge. Data store commitment reliability is dependent on data store data size under the conditions intrinsic to time series sensor data analysis. The number of data records must be kept relatively low for the herein disclosed purpose. As an example, one group of developers restrict the size of their multidimensional time series key-value pair data store to approximately $8.64 \times 20^4$ records, equivalent to 24 hours of 1 second interval sensor readings or 60 days of 1 minute interval readings. In this development system the oldest data is deleted from the data store and lost. This loss of data is acceptable under development conditions but in a production environment, the loss of the older data is almost always significant and unacceptable. The invention accounts for this need to retain older data by stipulating that aged data be placed in long term storage. In the embodiment, the archival storage is included 2930. This archival storage might be locally provided by the user, might be cloud based such as that offered by Amazon Web Services or Google or could be any other available very large capacity storage method known to those skilled in the art.

Reliably capturing and storing sensor data as well as providing for longer term, offline, storage of the data, while important, is only an exercise without methods to repetitively retrieve and analyze most likely differing but specific sets of data over time. The invention provides for this requirement with a robust query language that both provides straightforward language to retrieve data sets bounded by multiple parameters, but to then invoke several transformations on that data set prior to output. In the embodiment isolation of desired data sets and transformations applied to that data occurs using pre-defined query commands issued from the administration device 2912 and acted upon within the database by the structured query interpreter 2935. Below is a highly simplified example statement to illustrate the method by which a very small number of options that are available using the structured query interpreter 2935 might be accessed:

SELECT [STREAMING|EVENTS] data_spec FROM [unit] timestamp TO timestamp GROUPBY (sensor_id, identifier) FILTER [filter_identifier] FORMAT [sensor [AS identifier] [, sensor [AS identifier]] . . . ] (TEXT|JSON-|FUNNEL|KML|GEOJSON|TOPOJSON). In this example, "data_spec" might be replaced by a list of individual sensors from a larger array of sensors and each sensor in the list might be given a human readable identifier in the format "sensor AS identifier". "unit" allows the researcher to assign a periodicity for the sensor data such as second (s), minute (m), hour (h). One or more transformational filters, which include but a not limited to: mean, median, variance, standard deviation, standard linear interpolation, or Kalman filtering and smoothing, may be applied and then data formatted in one or more formats examples of with are text, JSON, KML, GEOJSON and TOPOJSON among others, depending on the intended use of the data. The results of the structured query may be passed to other systems using an output engine 2940.

Figure 31:
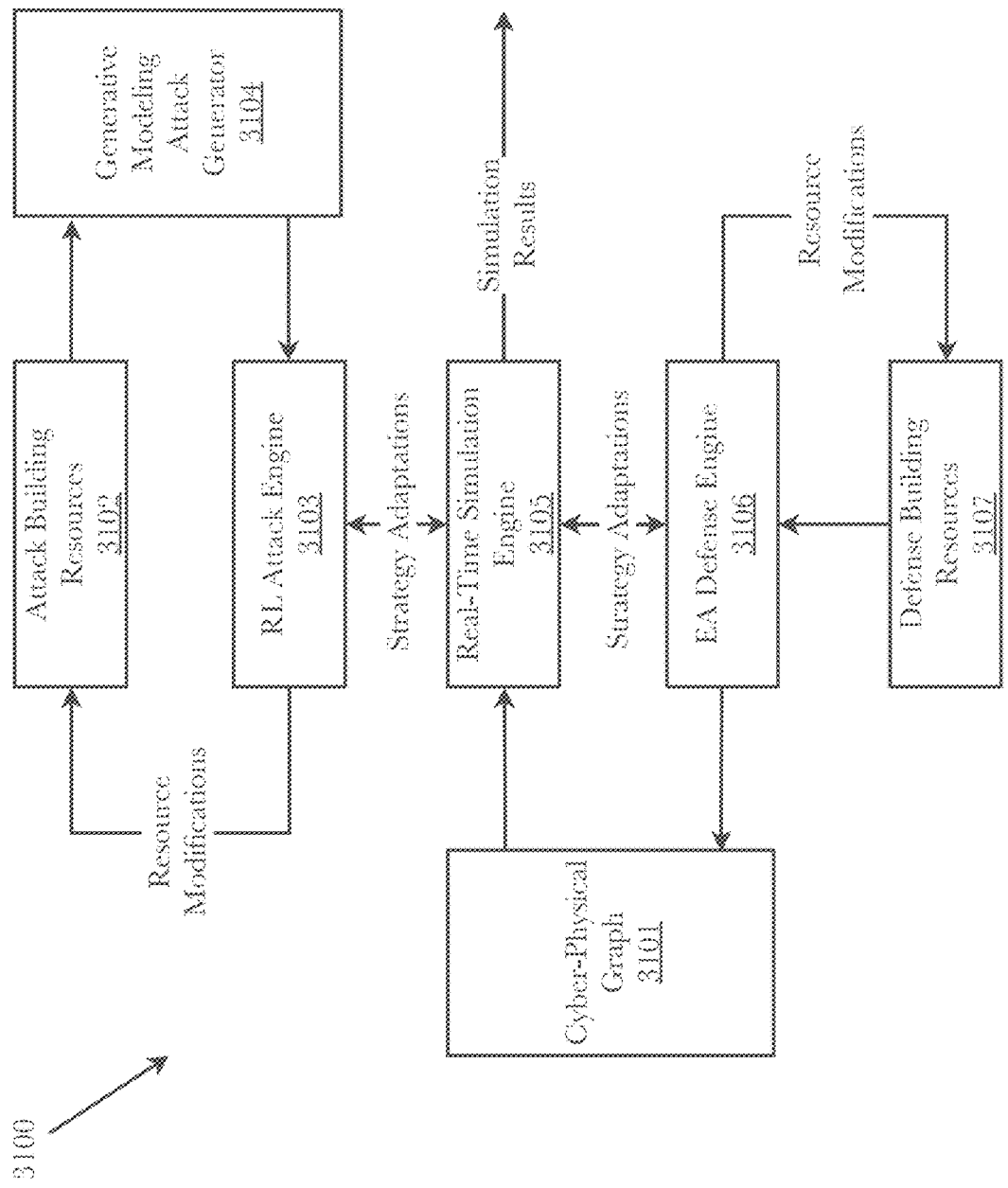
FIG. 31 is a block diagram showing an exemplary system architecture for a machine learning simulator for an automated cybersecurity defensive strategy analysis and recommendation system.

FIG. 31 is a block diagram showing an exemplary system architecture for a machine learning simulator 3100 for an automated cybersecurity defensive strategy analysis and recommendation system. The network for simulations is modeled by a cyber-physical graph 3101, details regarding the use of which are described in preceding paragraphs. In this embodiment, the machine learning simulator 3100 pits a reinforcement learning (RL) attack engine 3122 against a dynamically-modified network model driven by an evolutionary algorithm (EA) defense engine. EA algorithms are a type of machine learning algorithm similar to genetic algorithms, in that they continually evolve their operation based on the current state plus possible improvements which are tested in the next iteration, with the most successful variants passing on their traits to the next "generation" of improvements.

A generative modeling attack generator 3104 simulates an attacker using available attack building resources 3102 which contain scripts for implementing certain types of attacks on a network. For example, one attack building resource might be a port scanner that scans the network for open ports. Another might be a system version checker that checks the version of services running on the open ports to find unpatched services that are vulnerable to exploits. A reinforcement learning (RL) attack engine applies the generated attacks to the network model through a real-time simulation engine 3105, and learns which attacks are most effective by gaining a reward for each successful attack. The attack building resources 3102 may be updated by the RL attack engine as new forms of possible attacks find success. As part of its reinforcement learning process, the RL attack engine 3103 calculates probabilities of success of certain attack strategies based on outcome of attacks presented to the real-time simulation engine 3105.

An evolutionary algorithm (EA) defense engine 3106 is used to generate defenses against the cyberattacks for the network model represented by the cyber-physical graph 3001 by making evolutionary changes to the state of the cyber-physical graph 3001 and determining which evolution paths are most effective against the attacks presented by the RL attack engine 3103. In developing its evolutionary changes to the state of the network model, the EA defense engine 3106 uses available defense building resources 3107 which contain scripts for implementing certain types of defenses on a network. An example of a defense building resource might be a port scanner that checks for and closes open ports. Another might be an updater that checks software and services running on the network and installs updates and patches. The defense building resources 3107 may be updated by the EA defense engine 3124 applying a suitable fitness function characterizing network resilience as new forms of possible defense are discovered. Thus, the state of the network model is dynamically evolved through generations of defensive changes to the network state in response to the attacks presented. As part of the determination of the success of evolutionary defensive paths, the EA defense engine 3106 calculates probabilities of success of certain defensive strategies based on outcome of defensive state changes made to the cyber-physical graph 3101 and processed through the real-time simulation engine 3105 in response to attacks presented by the RL attack engine 3103.

The attack and defense strategies generated by the attack engine 3105 are run on a real-time simulation engine, which implements the attacks on the cyber-physical graph and measures the impact of mitigations and other features of network resilience. The real-time simulation engine further captures the probabilities of successful attack strategies from the RL attack engine 3103 and the probabilities of successful defense strategies from the EA defense engine 3106, and outputs simulation results comprising those probabilities In some embodiments, the simulation may be hosted online, and outside participants may be invited to participate in the cyberattack simulations. In such a situation, human participants may develop attack and/or defense strategies, as in the form of a real-time simulation game, or may participate by developing automated machine learning algorithms that develop attack and/or defense strategies, such as continual online evolutionary planning (COEP) algorithms. COEP algorithms are a form of evolutionary algorithms that have been adapted to run on persistent online real-time simulation games and are used to plan development and use of in-game resources.

Figure 32:
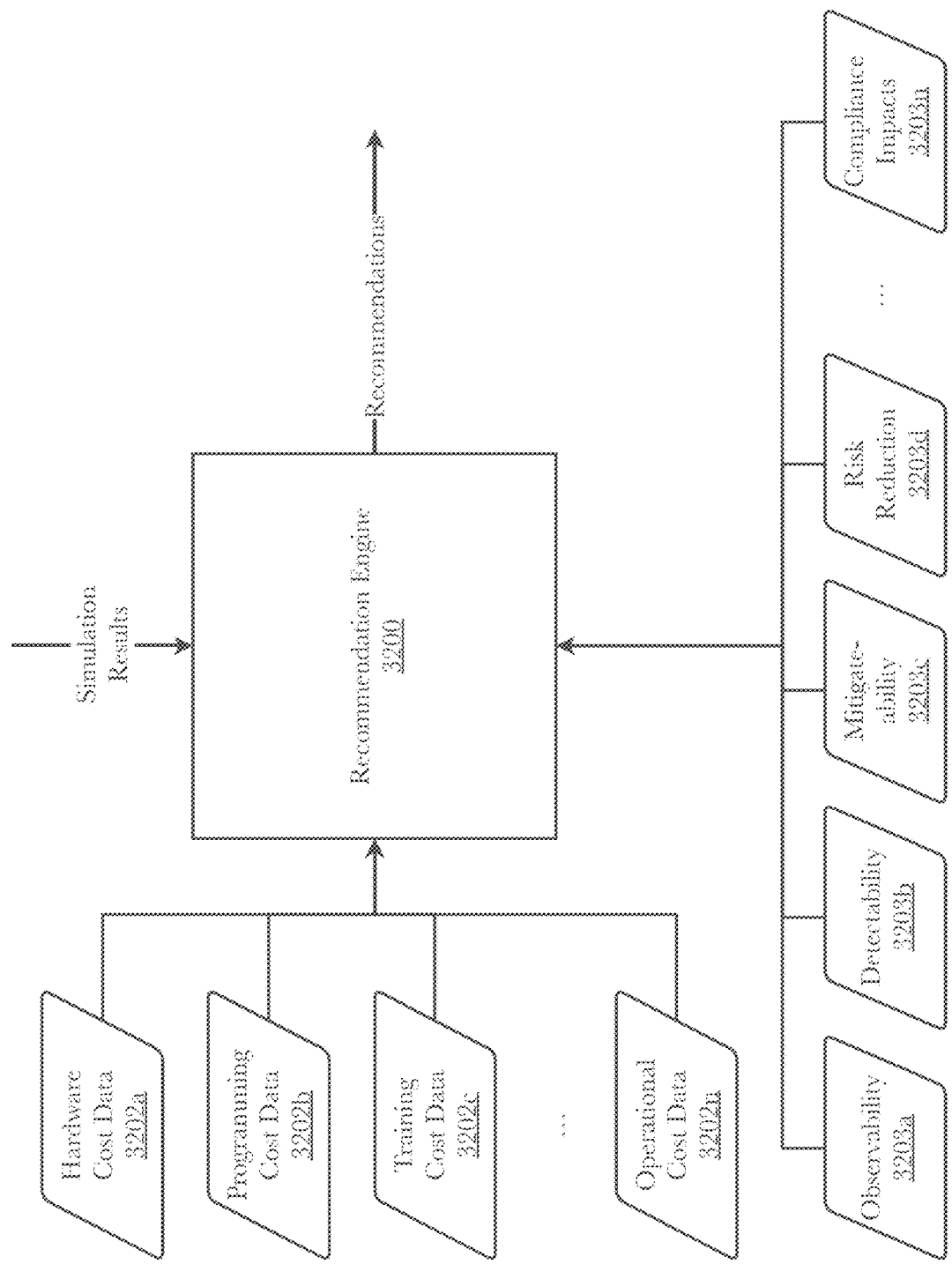
FIG. 32 is a block diagram showing exemplary inputs to a recommendation engine for an automated cybersecurity defensive strategy analysis and recommendation system.

FIG. 32 is a block diagram showing exemplary inputs to a recommendation engine 3200 for an automated cybersecurity defensive strategy analysis and recommendation system. The recommendation engine 3200 receives simulation results, performs a cost/benefit analysis, and makes recommendations as to what security improvements to implement. The simulation results comprise probabilities of the success of attack and defense strategies based on a model of the network under test. However, the probabilities of success are only one factor to be considered in an analysis of which security improvements to implement. The costs of implementation 3202a-n and the technical difficulty and benefits to be gained 3203a-n need to be considered, as well. For example, it may be that a certain attack strategy is very likely to succeed, but a successful attack gains access only to information that is already publicly available, in which case minimal or no expenditures are justified in defending against that attack strategy. Conversely, a certain attack strategy may be very unlikely to succeed, requiring circumvention of a long chain of defenses, but a successful attack would allow the attacker control over the entire network, in which case large expenditures are justified in defending against that attack. A non-limiting list of cost factors to be considered 3202a-n is the cost of replacing or improving hardware components in the network 3202a, the personnel cost to program software or change configurations on the system 3202b to implement certain security measures, the cost to train personnel to change operation procedures 3202c to improve security, and the operational cost (including magnitude) 3202n if a successful attack occurs (e.g., the cost of lost productivity if the internal network is shut down, a distributed denial of service (DDoS) attack occurs preventing external access, the cost of data losses, etc.). A non-limiting list of technical difficulty and benefits 3203a-n is whether or not an attack is theoretically observable 3203a with existing network architecture (which impacts costs of upgrading the network), the limits of detectability (time scale, level of effort, expenditure of computing resources, etc.) of such an attack 3203b if an attack is theoretically observable, the ability of current defensive measures to respond to or mitigate the effects of an attack 3203c, the reduction in risk 3203d gained by implementing defensive measures against such an attack, and compliance impacts 3203n (i.e., does implementation of defensive measures against this attack reduce the effectiveness of defenses against other attacks, increase the risk in other areas, etc.). The weighting of these various factors against the probabilities in the simulation results will differ across organization types and across particular organizations within each type. For example, an organization in a labor-intensive industry like farming will have a substantially different risk profile than an organization in a data-intensive industry like financial services. So, recommendations for a farming organization may differ from recommendations for a financial services organization, even for the same attack strategy.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 33:
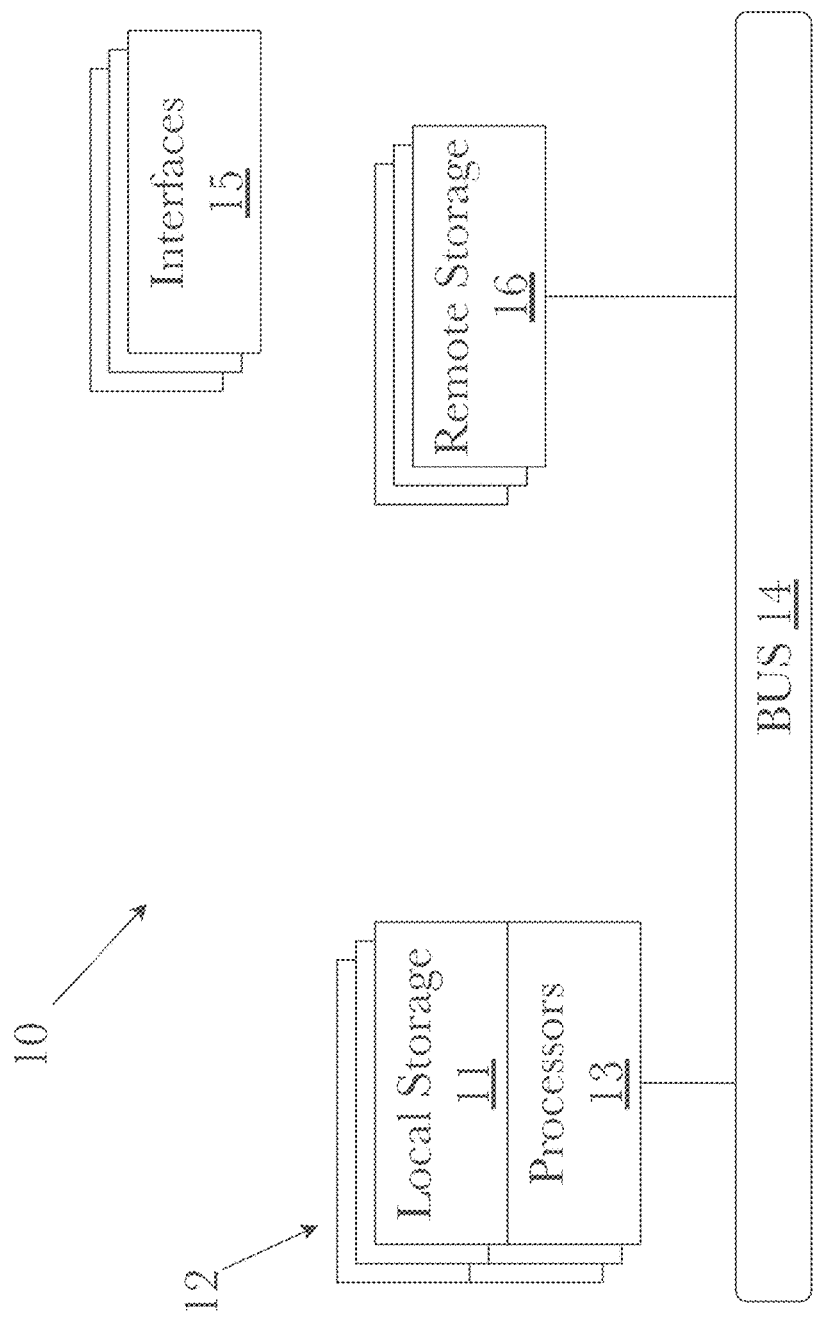
FIG. 33 is a block diagram illustrating an exemplary hardware architecture of a computing device.

Referring now to FIG. 33, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 33 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 34:
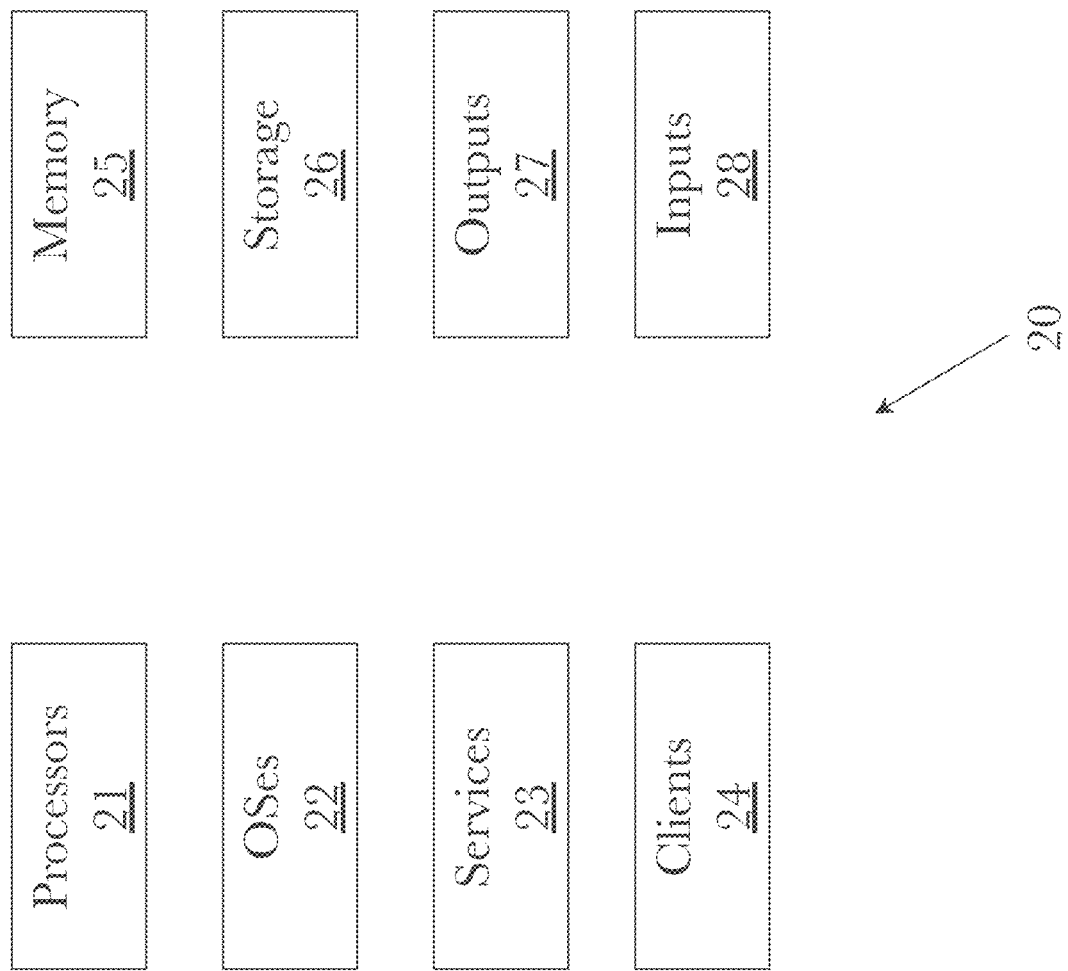
FIG. 34 is a block diagram illustrating an exemplary logical architecture for a client device.

In some aspects, systems may be implemented on a standalone computing system. Referring now to FIG. 34, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 33 FIG. 33). Examples of storage devices 26 include flash memory, magnetic hard drive, CD-ROM, and/or the like.

Figure 35:
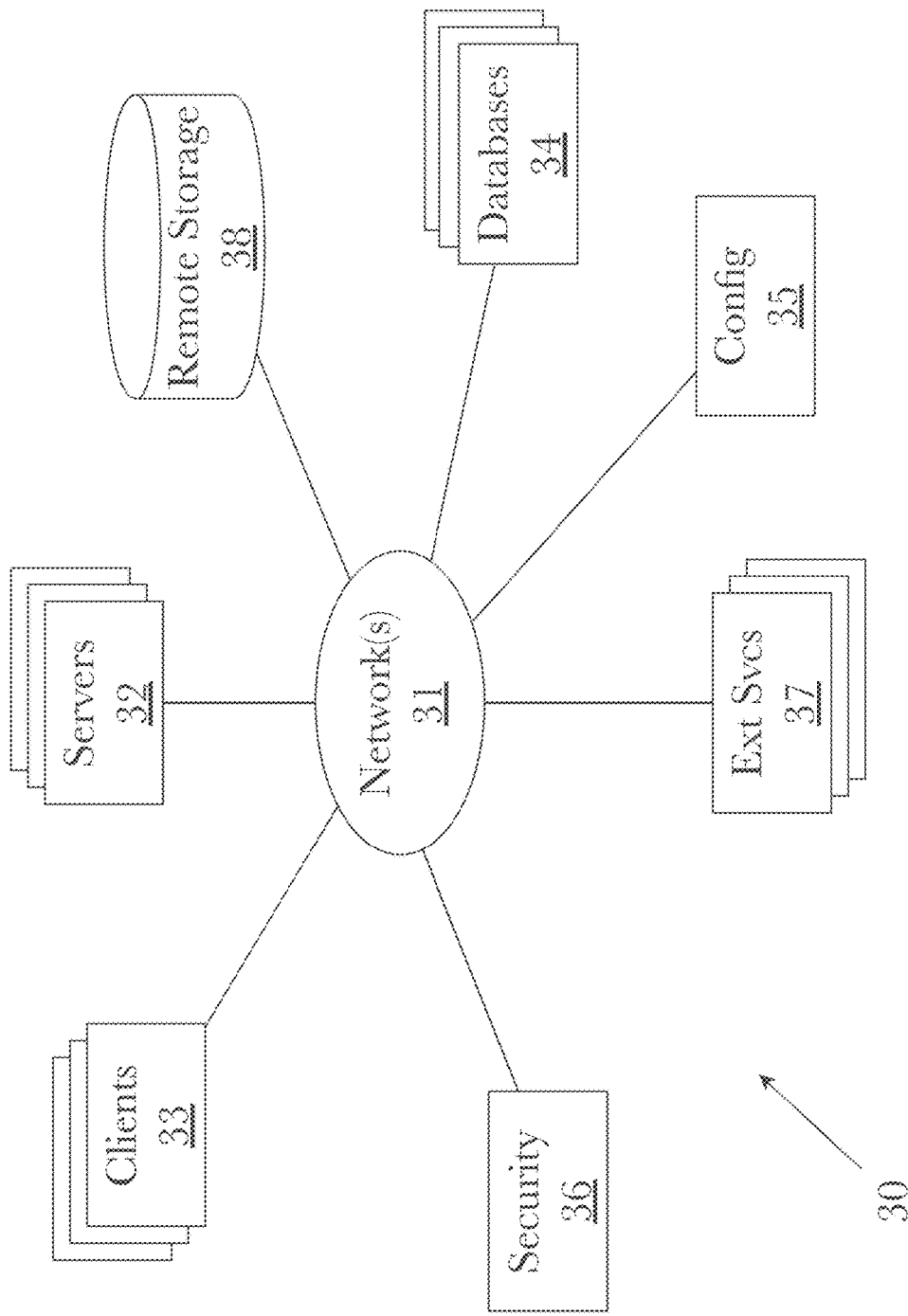
FIG. 35 is a block diagram illustrating an exemplary architectural arrangement of clients, servers, and external services.

In some aspects, systems may be implemented on a distributed computing network, such as one having any number of clients and/or servers. Referring now to FIG. 35, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 34. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 36:
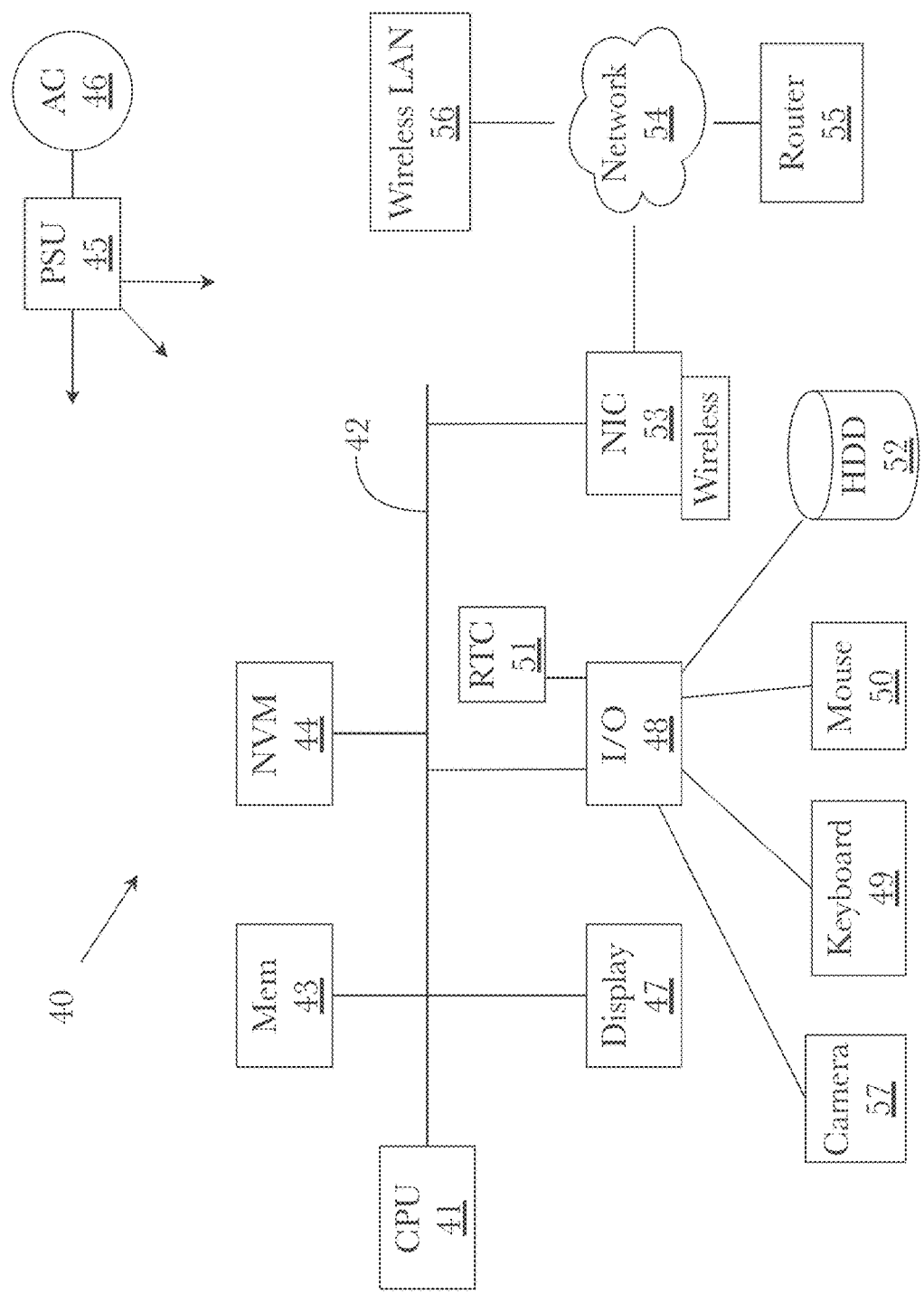
FIG. 36 is another block diagram illustrating an exemplary hardware architecture of a computing device.

FIG. 36 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for automated cybersecurity defensive strategy analysis and recommendations, comprising:
   an attack implementation engine comprising a first plurality of programming instructions stored in a memory of, and operating on a processor of, a computing device, wherein the first plurality of programming instructions, when operating on the processor, cause the computing device to:
     execute a cyberattack on a network under test; and
     gather system information about the operation of the network under test during the cyberattack, the system information comprising information about the sequence of events and response of affected devices during the cyberattack;
   a machine learning simulator comprising a second plurality of programming instructions stored in the memory of, and operating on the processor of, the computing device, wherein the second plurality of programming instructions, when operating on the processor, cause the computing device to:
     use the system information to initiate an iterative simulation of a cyberattack strategy sequence, each iteration comprising a simulated attack on a model of the network under test and a simulated defense against the simulated attack, each simulated attack being generated by a first machine learning algorithm;
     obtain a simulation result comprising the cyberattack strategy sequence and a probability of success of the attack and the defense in each iteration; and
   a recommendation engine comprising a third plurality of programming instructions stored in the memory of, and operating on the processor of, the computing device, wherein the third plurality of programming instructions, when operating on the processor, cause the computing device to:
     compare the simulation result against one or more cost factors and one or more benefit factors; and
     determine a cybersecurity improvement recommendation for the network under test based on the comparison.

2. The system of claim 1, wherein the system information further comprises system logs of one or more of the affected devices.

3. The system of claim 1, wherein the first machine learning algorithm is a reinforcement learning algorithm.

4. The system of claim 1, further comprising a second machine learning algorithm, wherein each simulated defense is generated by the second machine learning algorithm, such that the first and second machine learning algorithms compete against each other in the simulation.

5. The system of claim 4, wherein the second machine learning algorithm is an evolutionary algorithm.

6. The system of claim 5, wherein the machine learning simulation is an online simulation and the evolutionary algorithm is a continual online evolutionary planning algorithm.

7. The system of claim 1, wherein the cybersecurity improvement recommendation is implemented on the network under test.

8. The system of claim 6, wherein the system is run iteratively, with each iteration resulting in a new cybersecurity improvement recommendation, which is implemented on the network under test prior to the next iteration.

9. A method for automated cybersecurity defensive strategy analysis and recommendations, comprising the steps of:
   executing a cyberattack on a network under test;
   gathering system information about the operation of the network under test during the cyberattack, the system information comprising information about the sequence of events and response of affected devices during the cyberattack;
   using the system information to initiate an iterative simulation of a cyberattack strategy sequence, each iteration comprising a simulated attack on a model of the network under test and a simulated defense against the simulated attack, each simulated attack being generated by a first machine learning algorithm;
   obtaining a simulation result comprising the cyberattack strategy sequence and a probability of success of the attack and the defense in each iteration;
   comparing the simulation result against one or more cost factors and one or more benefit factors; and determining a cybersecurity improvement recommendation for the network under test based on the comparison.

10. The method of claim 9, wherein the system information further comprises system logs of one or more of the affected devices.

11. The method of claim 9, wherein the first machine learning algorithm is a reinforcement learning algorithm.

12. The method of claim 9, further comprising a second machine learning algorithm, wherein each simulated defense is generated by the second machine learning algorithm, such that the first and second machine learning algorithms compete against each other in the simulation.

13. The method of claim 12, wherein the second machine learning algorithm is an evolutionary algorithm.

14. The method of claim 13, wherein the machine learning simulation is an online simulation and the evolutionary algorithm is a continual online evolutionary planning algorithm.

15. The method of claim 9, wherein the cybersecurity improvement recommendation is implemented on the network under test.

16. The method of claim 15, wherein the method is run iteratively, with each iteration resulting in a new cybersecurity improvement recommendation, which is implemented on the network under test prior to the next iteration.

* * * * *